(12) United States Patent
Perry et al.

(10) Patent No.: US 9,676,623 B2
(45) Date of Patent: Jun. 13, 2017

(54) PROCESS AND APPARATUS FOR CONDUCTING SIMULTANEOUS ENDOTHERMIC AND EXOTHERMIC REACTIONS

(71) Applicant: Velocys, Inc., Plain City, OH (US)

(72) Inventors: Steven T. Perry, Galloway, OH (US); Ravi Arora, New Albany, OH (US); Martyn Twigg, Cambridge (GB); Bin Yang, Dublin, OH (US); Thomas Yuschak, Lewis Center, OH (US); Kai Tod Paul Jarosch, Abingdon (GB); Eric Hans Drescher, Columbus, OH (US); Franck Letellier, Didcot (GB); Anders Gabrielsson, Cholsey (GB)

(73) Assignee: Velocys, Inc., Plain City, OH (US)

( * ) Notice: Subject to any disclaimer, the term of this patent is extended or adjusted under 35 U.S.C. 154(b) by 0 days.

(21) Appl. No.: 13/802,879

(22) Filed: Mar. 14, 2013

(65) Prior Publication Data

US 2014/0264175 A1     Sep. 18, 2014

(51) Int. Cl.
*C01B 3/24*     (2006.01)
*C01B 3/38*     (2006.01)
*B01J 19/00*     (2006.01)

(52) U.S. Cl.
CPC ........... *C01B 3/384* (2013.01); *B01J 19/0093* (2013.01); *B01J 2219/0086* (2013.01); *B01J 2219/00783* (2013.01); *B01J 2219/00813* (2013.01); *B01J 2219/00817* (2013.01); *B01J 2219/00822* (2013.01); *B01J 2219/00835* (2013.01); *B01J 2219/00842* (2013.01); *B01J 2219/00869* (2013.01); *B01J 2219/00871* (2013.01); *B01J 2219/00873* (2013.01); *B01J 2219/00891* (2013.01); *B01J 2219/00959* (2013.01); *B01J 2219/00961* (2013.01); *B01J 2219/00963* (2013.01); *B01J 2219/00984* (2013.01); *C01B 2203/0233* (2013.01); *C01B 2203/0405* (2013.01); *C01B 2203/062* (2013.01); *C01B 2203/0811* (2013.01); *C01B 2203/0822* (2013.01); *C01B 2203/0827* (2013.01); *C01B 2203/1241* (2013.01); *C01B 2203/142* (2013.01); *C01B 2203/148* (2013.01); *C01B 2203/1604* (2013.01); *Y02P 20/128* (2015.11)

(58) Field of Classification Search
CPC ......................................................... C01B 3/40
USPC ......................................................... 423/650
See application file for complete search history.

(56) References Cited

U.S. PATENT DOCUMENTS

| 3,882,049 A | 5/1975 | Bertolacini et al. |
| 3,972,837 A | 8/1976 | Acres et al. |
| 4,089,810 A | 5/1978 | Diwell et al. |

(Continued)

FOREIGN PATENT DOCUMENTS

| DE | 246257 | 6/1987 |
| DE | 3926466 | 2/1991 |

(Continued)

*Primary Examiner* — Melvin C Mayes
*Assistant Examiner* — Kenneth Vaden
(74) *Attorney, Agent, or Firm* — Renner, Otto, Boisselle & Sklar, LLP

(57) ABSTRACT

This invention relates to a process and an apparatus for conducting simultaneous endothermic and exothermic reactions in a microchannel reactor. A start-up procedure for the microchannel reactor is disclosed.

50 Claims, 26 Drawing Sheets

(56) References Cited

U.S. PATENT DOCUMENTS

| | | | |
|---|---|---|---|
| 4,096,095 A | 6/1978 | Cairns | |
| 4,122,110 A | 10/1978 | Sugier et al. | 260/449.5 |
| 4,130,575 A | 12/1978 | Jorn | 260/449 |
| 4,289,652 A | 9/1981 | Hunter et al. | |
| 4,298,354 A | 11/1981 | Hardman et al. | 44/56 |
| 4,342,643 A | 8/1982 | Kyan | 208/134 |
| 4,348,487 A | 9/1982 | Goldstein et al. | 518/704 |
| 4,423,272 A | 12/1983 | Forbus et al. | 585/640 |
| 4,492,773 A | 1/1985 | Ball et al. | 518/713 |
| 4,525,482 A | 6/1985 | Ohsaki et al. | 518/707 |
| 4,540,714 A | 9/1985 | Pedersen et al. | 518/714 |
| 4,588,560 A | 5/1986 | Degnan et al. | 422/211 |
| 4,675,344 A | 6/1987 | Conway et al. | 518/714 |
| 4,752,622 A | 6/1988 | Stevens | 518/714 |
| 4,752,623 A | 6/1988 | Stevens et al. | 518/714 |
| 4,762,858 A | 8/1988 | Hucul et al. | 518/714 |
| 4,788,371 A | 11/1988 | Imai et al. | 585/443 |
| 4,795,841 A | 1/1989 | Elliott et al. | 585/240 |
| 4,843,101 A | 6/1989 | Klier et al. | 518/713 |
| 5,180,868 A | 1/1993 | Baker et al. | 585/240 |
| 5,248,251 A | 9/1993 | Dalla Betta et al. | |
| 5,492,617 A | 2/1996 | Trimble et al. | 208/148 |
| 5,525,311 A | 6/1996 | Girod et al. | 422/200 |
| 5,538,700 A | 7/1996 | Koves | 422/200 |
| 5,540,899 A | 7/1996 | Koves | 422/200 |
| 5,600,053 A | 2/1997 | Girod et al. | 585/654 |
| 5,660,715 A | 8/1997 | Trimble et al. | 208/148 |
| 5,703,133 A | 12/1997 | Vanderspurt et al. | 518/707 |
| 5,948,240 A | 9/1999 | Mulvaney, III et al. | 208/79 |
| 6,040,266 A | 3/2000 | Fay, III et al. | |
| 6,159,358 A | 12/2000 | Mulvaney, III et al. | 208/46 |
| 6,200,536 B1 | 3/2001 | Tonkovich et al. | 422/177 |
| 6,220,497 B1 | 4/2001 | Benz et al. | |
| 6,248,796 B1 | 6/2001 | Jackson et al. | 518/714 |
| 6,274,101 B1 | 8/2001 | Sechrist | 422/198 |
| 6,312,586 B1 | 11/2001 | Kalnes et al. | 208/130 |
| 6,326,326 B1 | 12/2001 | Feng et al. | 502/62 |
| 6,334,994 B1 | 1/2002 | Wendelbo et al. | 423/718 |
| 6,409,072 B1 | 6/2002 | Breuer et al. | 228/111.5 |
| 6,432,369 B1 | 8/2002 | Mulvaney, III et al. | 422/213 |
| 6,440,895 B1 | 8/2002 | Tonkovich et al. | 502/439 |
| 6,488,838 B1 | 12/2002 | Tonkovich et al. | 208/108 |
| 6,531,224 B1 | 3/2003 | Fryxell et al. | 428/405 |
| 6,534,677 B1 | 3/2003 | White et al. | 562/486 |
| 6,555,723 B1 | 4/2003 | Wittenbrink et al. | 585/734 |
| 6,570,047 B1 | 5/2003 | Mart et al. | 585/899 |
| 6,579,343 B2 | 6/2003 | Brennecke et al. | 95/51 |
| 6,620,398 B2 | 9/2003 | Kindig et al. | 423/359 |
| 6,663,681 B2 | 12/2003 | Kindig et al. | 48/127.5 |
| 6,682,714 B2 | 1/2004 | Kindig et al. | 423/657 |
| 6,685,754 B2 | 2/2004 | Kindig et al. | 48/210 |
| 6,703,429 B2 | 3/2004 | O'Rear et al. | 518/706 |
| 6,713,036 B1 | 3/2004 | Vanden Bussche | 423/584 |
| 6,733,835 B2 | 5/2004 | Fryxell et al. | 427/299 |
| 6,743,962 B2 | 6/2004 | O'Rear et al. | 585/717 |
| 6,753,038 B2 | 6/2004 | Fryxell et al. | 427/337 |
| 6,768,035 B2 | 7/2004 | O'Rear et al. | 585/331 |
| 6,846,554 B2 | 1/2005 | Fryxell et al. | 428/307.3 |
| 6,969,506 B2 | 11/2005 | Tonkovich et al. | 423/659 |
| 7,012,104 B2 | 3/2006 | Espinoza et al. | 518/715 |
| 7,019,038 B2 | 3/2006 | Espinoza et al. | 518/700 |
| 7,045,114 B2 | 5/2006 | Tonkovich et al. | 423/659 |
| 7,067,560 B2 | 6/2006 | Bowe | 518/700 |
| 7,067,561 B2 | 6/2006 | Bowe | 518/700 |
| 7,071,239 B2 | 7/2006 | Ortego, Jr. et al. | 518/715 |
| 7,084,180 B2 | 8/2006 | Wang et al. | 518/712 |
| 7,087,651 B2 | 8/2006 | Lee-Tuffnell et al. | 518/700 |
| 7,108,070 B2 | 9/2006 | Hall et al. | 166/357 |
| 7,109,248 B2 | 9/2006 | Bowe | 518/700 |
| 7,122,106 B2 | 10/2006 | Lin et al. | 205/109 |
| 7,163,663 B2 | 1/2007 | Carlow et al. | 422/186.04 |
| 7,183,329 B2 | 2/2007 | Green et al. | 518/715 |
| 7,186,388 B2 | 3/2007 | Bowe et al. | 422/190 |
| 7,189,271 B2 | 3/2007 | Maude | 48/197 |
| 7,201,883 B2 | 4/2007 | Bowe et al. | 422/190 |
| 7,217,741 B2 | 5/2007 | Bowe et al. | 518/706 |
| 7,223,373 B2 | 5/2007 | Maude | 422/190 |
| 7,232,472 B2 | 6/2007 | Kindig et al. | 48/127.5 |
| 7,235,218 B2 | 6/2007 | Bowe | 422/211 |
| 7,250,151 B2 | 7/2007 | Tonkovich et al. | 423/659 |
| 7,294,734 B2 | 11/2007 | Brophy et al. | 558/317 |
| 7,300,635 B2 | 11/2007 | Bowe et al. | 422/190 |
| 7,304,012 B2 | 12/2007 | Green et al. | 502/180 |
| 7,351,750 B2 | 4/2008 | Bowe | 518/700 |
| 7,445,650 B2 * | 11/2008 | Weil et al. | 48/198.1 |
| 7,501,456 B2 | 3/2009 | West et al. | 518/705 |
| 7,754,930 B2 * | 7/2010 | Iaccino | 585/24 |
| 8,262,754 B2 | 9/2012 | West et al. | 48/127.9 |
| 2002/0028164 A1 | 3/2002 | Schutte et al. | 422/198 |
| 2002/0192118 A1 | 12/2002 | Zech et al. | 422/99 |
| 2003/0007904 A1 | 1/2003 | Tonkovich et al. | 422/180 |
| 2003/0225169 A1 | 12/2003 | Yetman | 518/726 |
| 2004/0034111 A1 | 2/2004 | Tonkovich et al. | 518/726 |
| 2004/0091418 A1 | 5/2004 | Carlow et al. | 423/650 |
| 2004/0099712 A1 | 5/2004 | Tonkovich et al. | |
| 2004/0134660 A1 | 7/2004 | Hall et al. | 166/357 |
| 2004/0188326 A1 | 9/2004 | Tonkovich et al. | 208/139 |
| 2004/0229752 A1 | 11/2004 | Long et al. | 502/303 |
| 2005/0087767 A1 | 4/2005 | Fitzgerald et al. | |
| 2005/0163701 A1 | 7/2005 | Tonkovich et al. | 423/584 |
| 2005/0165121 A1 | 7/2005 | Wang et al. | 518/726 |
| 2005/0176832 A1 | 8/2005 | Tonkovich et al. | 518/726 |
| 2005/0282918 A1 | 12/2005 | Bowe | 518/726 |
| 2006/0020155 A1 | 1/2006 | Beech, Jr. et al. | 585/639 |
| 2006/0036106 A1 | 2/2006 | Mazanec et al. | 549/533 |
| 2006/0041029 A1 | 2/2006 | Bowe et al. | 518/700 |
| 2006/0074134 A1 | 4/2006 | O'Rear et al. | 518/726 |
| 2006/0076127 A1 | 4/2006 | Bowe et al. | 165/166 |
| 2006/0135630 A1 | 6/2006 | Bowe | 518/702 |
| 2006/0142400 A1 | 6/2006 | Bowe | 518/703 |
| 2006/0251552 A1 | 11/2006 | Wang et al. | 422/190 |
| 2006/0251558 A1 | 11/2006 | Chinn et al. | 423/230 |
| 2007/0004810 A1 | 1/2007 | Wang et al. | 518/718 |
| 2007/0029264 A1 | 2/2007 | Bowe | 210/748 |
| 2007/0197801 A1 | 8/2007 | Bolk et al. | 549/229 |
| 2007/0197808 A1 | 8/2007 | Bolk et al. | 549/536 |
| 2007/0232482 A1 | 10/2007 | Bowe et al. | 502/150 |
| 2007/0244000 A1 | 10/2007 | Molinier et al. | 502/300 |
| 2007/0258872 A1 | 11/2007 | West et al. | 422/222 |
| 2007/0258883 A1 | 11/2007 | West et al. | 423/652 |
| 2008/0025884 A1* | 1/2008 | Tonkovich et al. | 422/188 |
| 2008/0131341 A1 | 6/2008 | Bowe et al. | 422/211 |
| 2008/0148635 A1 | 6/2008 | Bowe | 48/127.7 |
| 2008/0166276 A1 | 7/2008 | Bowe | 422/196 |
| 2008/0187468 A1 | 8/2008 | Bowe et al. | 422/211 |
| 2008/0193346 A1 | 8/2008 | Vitucvi et al. | 422/197 |
| 2008/0193347 A1 | 8/2008 | Lee-Tuffnell | 422/197 |
| 2008/0194712 A1 | 8/2008 | Bowe et al. | 518/702 |
| 2008/0226517 A1 | 9/2008 | Vitucci et al. | 422/197 |
| 2008/0227874 A1 | 9/2008 | Bowe et al. | 518/708 |
| 2010/0068132 A1 | 3/2010 | Vencill et al. | |
| 2014/0140896 A1 | 5/2014 | Moon et al. | |

FOREIGN PATENT DOCUMENTS

| | | |
|---|---|---|
| EP | 1 434 652 B1 | 2/2005 |
| EP | 1 248 675 B1 | 8/2005 |
| EP | 1 559 475 A1 | 8/2005 |
| EP | 1 567 616 B1 | 8/2006 |
| EP | 1102628 | 11/2006 |
| EP | 2168673 | 3/2010 |
| GB | 1531134 | 11/1978 |
| GB | 2077136 | 12/1981 |
| GB | 2 441 509 | 3/2008 |
| WO | 9421372 | 9/1994 |
| WO | 9700442 | 1/1997 |
| WO | 9828073 | 7/1998 |
| WO | 9838147 | 9/1998 |
| WO | 9916542 | 4/1999 |
| WO | 0006301 | 2/2000 |
| WO | 01/93976 | 12/2001 |
| WO | 02/16046 A1 | 2/2002 |
| WO | 02/34863 | 5/2002 |
| WO | 02/064248 | 8/2002 |

(56) References Cited

FOREIGN PATENT DOCUMENTS

| | | |
|---|---|---|
| WO | 02/064248 A2 | 8/2002 |
| WO | 03006149 | 1/2003 |
| WO | 03/049835 | 6/2003 |
| WO | 03/048035 | 12/2003 |
| WO | 03/106386 | 12/2003 |
| WO | 03106386 | 12/2003 |
| WO | 2004/037418 | 5/2004 |
| WO | 2004/091771 | 10/2004 |
| WO | 2004/096952 | 11/2004 |
| WO | 2005/003025 | 1/2005 |
| WO | 2005/003632 | 1/2005 |
| WO | 2005/102511 | 3/2005 |
| WO | 2005/090521 | 9/2005 |
| WO | 2005/090522 | 9/2005 |
| WO | 2005/123883 | 12/2005 |
| WO | 2006/033025 | 3/2006 |
| WO | 2006/079848 | 3/2006 |
| WO | 2006/043111 | 4/2006 |
| WO | 2006052615 | 5/2006 |
| WO | 2006065387 | 6/2006 |
| WO | 2006/075130 | 7/2006 |
| WO | 2006/075193 | 7/2006 |
| WO | 2006/090189 | 8/2006 |
| WO | 2006/095204 | 9/2006 |
| WO | 2006/127889 | 11/2006 |
| WO | 2007/008495 | 1/2007 |
| WO | 2007/071737 | 6/2007 |
| WO | 2007/071741 | 6/2007 |
| WO | 2007/071744 | 6/2007 |
| WO | 2007/076393 | 7/2007 |
| WO | 2007/076394 | 7/2007 |
| WO | 2007/076395 | 7/2007 |
| WO | 2007/076397 | 7/2007 |
| WO | 2007/076400 | 7/2007 |
| WO | 2007/076402 | 7/2007 |
| WO | 2007/076404 | 7/2007 |
| WO | 2007/076406 | 7/2007 |
| WO | 2007/027767 | 8/2007 |
| WO | 2008/030467 | 3/2008 |
| WO | 2008/104793 | 4/2008 |
| WO | 2009/044198 A1 | 4/2009 |
| WO | 2009/081175 A1 | 7/2009 |
| WO | 2009/101434 A2 | 8/2009 |
| WO | 2011109567 | 9/2011 |
| ZA | 855317 | 7/1985 |

\* cited by examiner

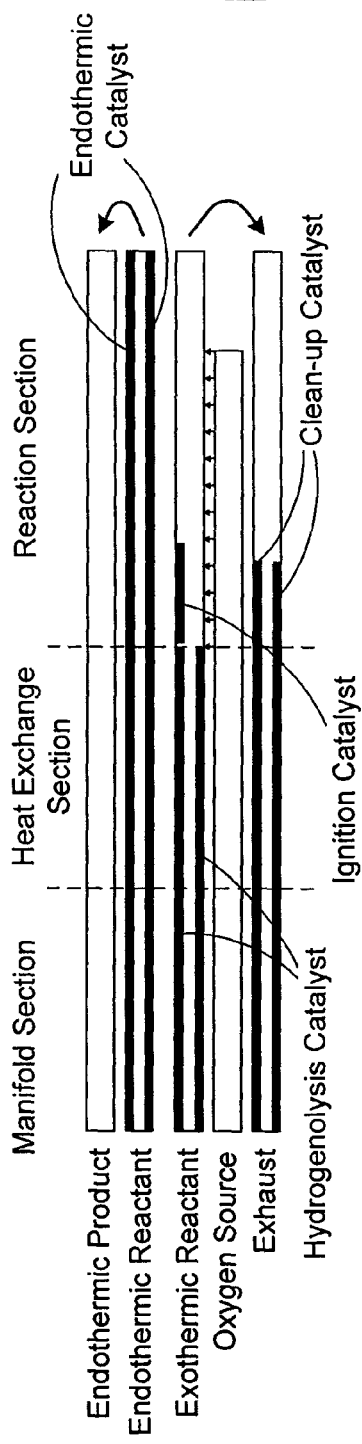
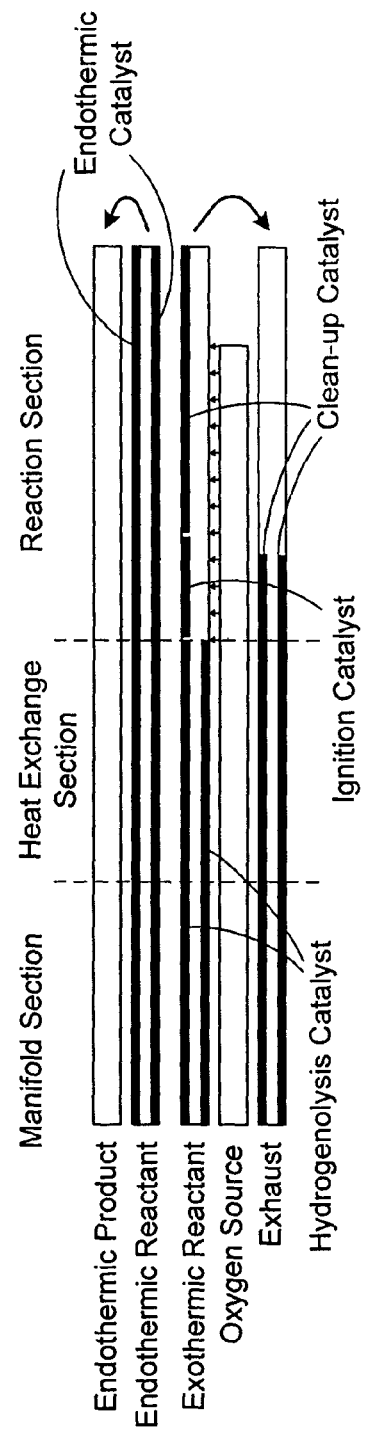
FIG. 7G
FIG. 7H

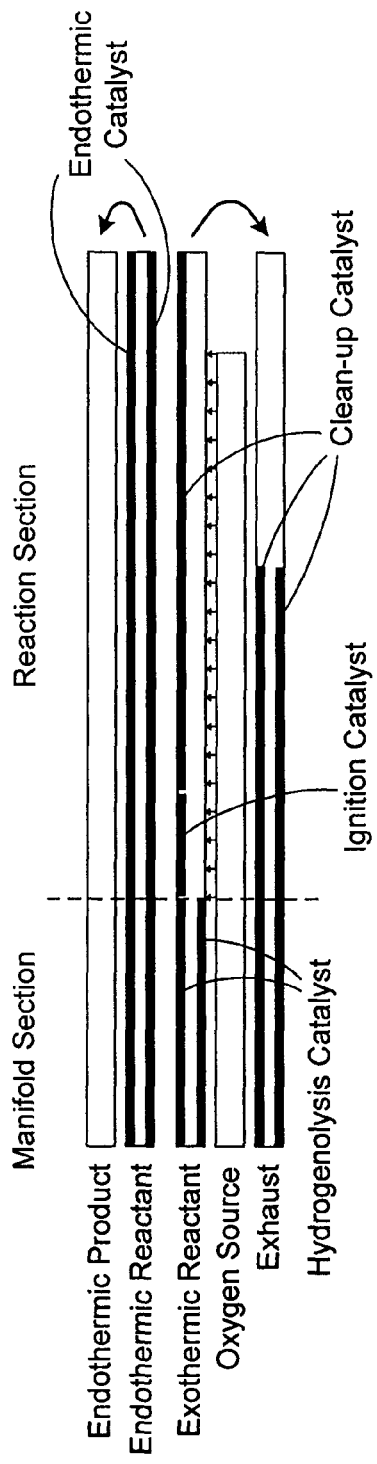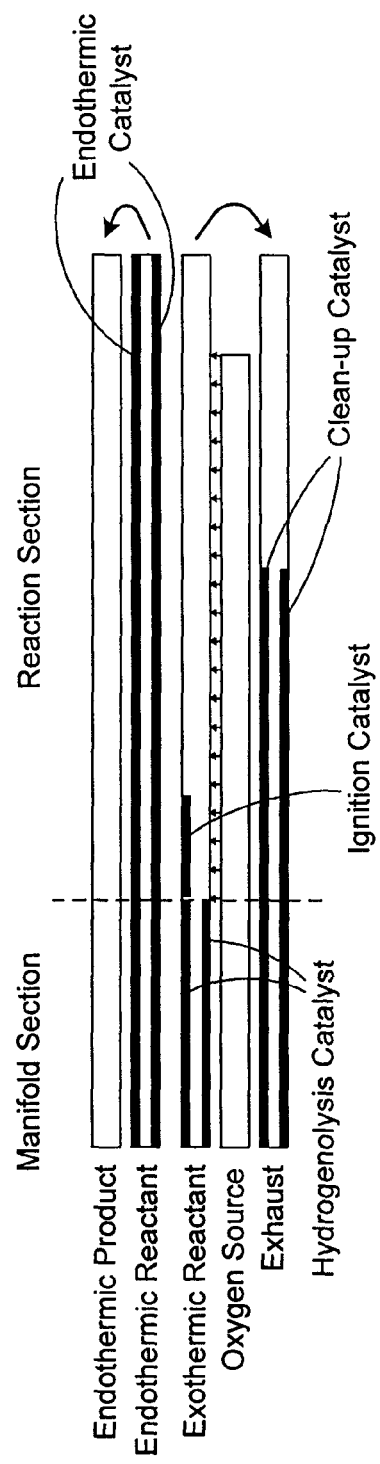

PROCESS AND APPARATUS FOR CONDUCTING SIMULTANEOUS ENDOTHERMIC AND EXOTHERMIC REACTIONS

TECHNICAL FIELD

This invention relates to a process and an apparatus for conducting simultaneous endothermic and exothermic reactions. The apparatus may comprise a microchannel reactor.

BACKGROUND

Processes for conducting steam methane reforming reactions (SMR) and combustion reactions in integrated reactors have been disclosed.

SUMMARY

This invention relates to a start-up procedure that may be used for microchannel reactors wherein simultaneous endothermic and exothermic reactions are conducted. This start-up procedure is particularly suitable for SMR microchannel reactors. SMR microchannel reactors may be used on off-shore drilling platforms, and the like, for converting methane to synthesis gas. The synthesis gas may subsequently be converted to liquefied hydrocarbons such as diesel fuel. This invention provides for a modified microchannel reactor which can operate more efficiently as a result of strategic positioning of catalysts within the microchannel reactor.

This invention relates to a process for conducting simultaneous endothermic and exothermic reactions in a microchannel reactor, the microchannel reactor comprising a process layer and a heat exchange layer, the process layer containing a catalyst, the process including a start-up procedure comprising: (A) increasing the temperature in the process layer from ambient temperature to an intermediate temperature; (B) flowing a first process reactant in the process layer; (C) flowing a second process reactant in the process layer, the second process reactant comprising a hydrocarbon; (D) activating the catalyst by contacting the catalyst with the second process reactant; and (E) increasing the temperature in the process layer to a desired operating temperature. In an embodiment, the first process reactant comprises steam. In an embodiment, the second process reactant comprises methane, natural gas, a pre-reformer gas comprising $H_2$, CO and $CH_4$, or a mixture of two or more thereof. In an embodiment, the first process reactant comprises steam and the second process reactant comprises methane. The catalyst may be partially activated or reduced prior to this start-up procedure, with full activation then being achieved using this procedure. Alternatively, the catalyst may not be partially activated prior to using this start-up procedure, and the start-up procedure may be used to achieve sufficient or full activation for subsequent operation.

An advantage of this start-up procedure is that the catalyst in the process layer is activated or reduced by contacting it with the hydrocarbon from the second reactant. For example, if the reactor being started is a SMR microchannel reactor iii and the reactants are steam and methane, the catalyst is activated during step (D) by contacting it with the methane. This distinguishes this procedure from prior art methods wherein the catalysts are activated using $H_2$. This advantage is significant when the microchannel reactor is to be used in remote locations, such as on off-shore drilling platforms, and the like, due to the fact that large quantities of $H_2$ do not have to be stored at or transported to the remote location. Thus, a significant problem relating to the start-up of SMR microchannel reactors used in remote locations is solved with this invention.

In any of the above-indicated embodiments, a fluid flows in the heat exchange layer during step (A).

In any of the above-indicated embodiments, a fluid flows in the process layer during step (A). The fluid flowing in the process layer during step (A) may comprise an inert gas such as nitrogen.

In any of the above-indicated embodiments, an exothermic reaction is conducted in the heat exchange layer to provide heat for heating the process layer.

In any of the above-indicated embodiments, one or more exothermic reactants and/or inert fluids flow in the heat exchange layer during step (A) to provide heat for heating the process layer to the intermediate temperature, the flow rate of the exothermic reactants in the heat exchange layer being increased during steps (B), (C), (D) and/or (E) to provide additional heat for heating the process layer.

In any of the above-indicated embodiments, during step (D) and/or step (E) the ratio of the first process reactant to the second process reactant is adjusted to provide a desired ratio for operation subsequent to step (E).

In any of the above-indicated embodiments, a mixture of the first reactant and the second reactant is formed during step (C), and during step (B) of the process comprises flowing nitrogen in the process layer and heating the process layer until the temperature in the process layer exceeds the dew point of the mixture of the first reactant and the second reactant from step (C) at the pressure within the process layer, then replacing the nitrogen in the process layer with steam.

In any of the above-indicated embodiments, exothermic reactants react in an exothermic reaction in the heat exchange layer, the exothermic reactants comprising an oxygen source, the oxygen source being heated to a temperature of at least about 200° C., or at least about 300°, before entering the heat exchange layer.

In any of the above-indicated embodiments, exothermic reactants react in an exothermic reaction in the heat exchange layer, the exothermic reactants comprising an oxygen source and a fuel, the oxygen source being heated to a temperature of at least about 200° C., or at least about 300° C., to form a heated oxygen source, the heated oxygen source being mixed with the fuel.

In any of the above-indicated embodiments, the start-up procedure is conducted without pre-heating the oxygen source, the start-up procedure comprising conducting an exothermic reaction in the heat exchange layer using hydrogen as a fuel.

In any of the above-indicated embodiments, the reactor is heated to the intermediate temperature using an inert gas (e.g., nitrogen).

In any of the above-indicated embodiments, a recycle or process stream is used to heat the reactor to the intermediate temperature. The recycle or process stream may be taken from a separator (e.g., a hydrogen separator) positioned downstream of the microchannel reactor, or from a pre-reformer positioned upstream from the microchannel reactor.

In any of the above-indicated embodiments, the reactor is heated to the intermediate temperature using a pre-heated oxygen source (e.g., air), the flow rate of the oxygen source being subsequently decreased and stopped before the desired operating temperature for the reactor is achieved.

In any of the above-indicated embodiments, the oxygen source comprises air, oxygen, oxygen enriched air, or a mixture of two or more thereof. The oxygen source preferably comprises air.

In any of the above-identified embodiments, steps (A), (B), (C), (D) and (E) may be conducted sequentially. Steps (A), (B) and, optionally (C), may be conducted concurrently. Steps (B) and (C) may be conducted concurrently. Steps (C) and (D) may be conducted concurrently. In an embodiment, step (C) is conducted prior to step (B), and the intermediate temperature is below about 300° C.

This invention relates to a process for conducting simultaneous steam reforming and oxidation reactions in a microchannel reactor, the microchannel reactor comprising a process layer and a heat exchange layer, the process being conducted in a facility where a hydrogen enriched stream comprising hydrogen is produced downstream of the microchannel reactor, the process including a start-up procedure comprising: (A) transferring heat from the heat exchange layer to the process layer to increase the temperature in the process layer; (B) flowing one or more process reactants in the process layer and conducting a steam reforming reaction to produce a synthesis gas product comprising hydrogen; (C) using at least a portion of the synthesis gas product and/or separating part of the hydrogen from the synthesis gas product downstream of the microchannel reactor to provide the hydrogen enriched stream; (D) conducting an oxidation reaction in the heat exchange layer to produce heat using a heat exchange reactant mixture comprising an oxygen source and part or all of the hydrogen enriched stream; and (E) wherein the flow of hydrogen in the hydrogen enriched stream used in the oxidation reaction increases during the start-up procedure. During step (A) the heat in the heat exchange layer may be provided by feeding a gas stream comprising air, $CO_2$, nitrogen, one or more other inert gases, or a mixture of two or more thereof, to the heat exchange layer, the gas stream being pre-heated to a temperature that is higher than the temperature in the process layer. During step (A) the heat in the heat exchange layer may be provided by feeding a fuel and an oxygen source (e.g., air) to the heat exchange layer and conducting a combustion reaction to generate heat for increasing the temperature in the process layer. The hydrogen enriched stream may be produced by flowing synthesis gas produced in the microchannel reactor through a separator (e.g., a membrane separator) positioned downstream from the microchannel reactor. At the beginning of the start-up procedure, the heat exchange reactant mixture for the oxidation reaction may contain little or no hydrogen. At the end of the start-up procedure, there may be little or no hydrocarbons in the heat exchange reactant mixture. The ratio of the oxygen source to the other components in the heat exchange layer may change over the course of the start-up procedure in order to control the outlet composition (e.g., exhaust gas) of hydrocarbons (e.g., methane) produced in the heat exchange layer. The outlet composition for the heat exchange layer (e.g., exhaust gas) may have a hydrocarbon (e.g., methane) content of less than about 5%, or less than about 4%, or less than about 3%, or less than about 2% by volume.

In any of the above-indicated embodiments, the intermediate temperature is in the range from about 150 to about 600° C., or about 150° C. to about 500° C., or about 200 to about 400° C., or about 200 to about 350° C. In any of the above-indicated embodiments, the intermediate temperature is in the range from the dew point of the mixture of the first reactant and the second reactant in the process layer at the pressure in the process layer up to about 600° C., or up to about 500° C., or up to about 400° C., or up to about 350° C. In any of the above-indicated embodiments, the desired operating temperature is in the range from about 600 to about 1000° C., or about 650 to about 950° C., or about 650° C. to about 750° C., or about 800° C. to about 950° C.

In any of the above-identified embodiments, subsequent to completion of the start-up procedure, an endothermic reaction process is conducted in the process layer, and an exothermic reaction process is conducted in the heat exchange layer. The endothermic reaction process may comprise a steam reforming reaction. The steam reforming reaction may comprise a steam methane reforming reaction. The exothermic reaction may comprise a combustion reaction or a partial oxidation reaction.

In any of the above-indicated embodiments, an endothermic reaction is conducted in the process layer and an exothermic reaction is conducted in the heat exchange layer, the endothermic reaction comprising a steam methane reforming reaction, and the exothermic reaction comprising a combustion or partial oxidation reaction.

In any of the above-indicated embodiments, an exothermic reaction is conducted in the heat exchange layer, the exothermic reaction comprising the reaction of a fuel with an oxygen source. The fuel may comprise hydrogen, natural gas, methane, a $C_2^+$ alkane, liquefied petroleum gas, an oxygenate, or a mixture of two or more thereof. The oxygen source may comprise air, oxygen, oxygen enriched air, or a mixture of two or more thereof.

In any of the above-indicated embodiments, a product is formed in the process layer, and part of the product formed in the process layer is used as an exothermic reactant in the heat exchange layer.

In any of the above-indicated embodiments, synthesis gas is formed in the process layer, the synthesis gas comprising CO and $H_2$, part of the $H_2$ being separated from the synthesis gas, the separated $H_2$ flowing into the heat exchange layer as an exothermic reactant.

In any of the above-indicated embodiments, an endothermic reaction catalyst is positioned in the process layer. The endothermic reaction catalyst may comprise a steam reforming catalyst. The steam reforming catalyst may comprise a steam methane reforming (SMR) catalyst.

In any of the above-indicated embodiments, one or more catalysts are positioned in the heat exchange layer. The one or more catalysts in the heat exchange layer may comprise a combustion catalyst, partial oxidation catalyst, ignition catalyst, hydrogenolysis catalyst, clean-up catalyst, or a combination of two or more of these catalysts.

In any of the above-indicated embodiments, the process layer comprises a process heat exchange section and a process reaction section, the process reaction section being downstream of the process heat exchange section, and the endothermic reaction catalyst in the process layer is positioned in the process reaction section. The process reaction section may be operated (after start-up is completed) at a temperature in the range from about 350° C. to about 1000° C., or from about 600° C. to about 900° C., while the process heat exchange section may be operated at a temperature in the range from about 200° C. to about 600° C., or about 300° C. to about 500° C.

In an embodiment, the heat exchange layer comprises a heat exchange layer heat exchange section and a heat exchange layer reaction section, the heat exchange layer reaction section being downstream from the heat exchange layer heat exchange section, and an exothermic reaction catalyst is positioned in the heat exchange layer reaction section. The heat exchange layer reaction section may be operated (after start-up is completed) at a temperature in the range from about 300° C. to about 1000° C., or from about 450° C. to about 950° C., while the heat exchange layer heat exchange section may be operated at a temperature in the range from ambient temperature to about 750° C., or about 100° C. to about 600° C.

In any of the above-indicated embodiments, a clean-up catalyst may be used in the heat exchange layer or downstream of the heat exchange layer to control the emissions in the exhaust gas and thereby promote desired and/or safe operating limits for the exhaust gas emissions. For example, the hydrocarbon (e.g., methane) or hydrogen content in the dry exhaust gas may be maintained below about 5% by volume, or below about 4% by volume, or below about 3% by volume, or below about 2% by volume to avoid the formation of flammable or explosive conditions in the exhaust gas. When operating the reactor at temperatures below the desired operating temperature (e.g., at the intermediate temperature), it is possible to maintain a hydrocarbon (e.g., methane) and/or hydrogen content in the exhaust gas at the above-indicated levels by diluting the heat exchange layer inlet with nitrogen or air and thereby diluting the outlet dry hydrocarbons (e.g., methane) or hydrogen in the exhaust gas emissions.

In any of the above-indicated embodiments, the process layer comprises a process reactant layer, a process product layer positioned adjacent to the process reactant layer, and a process u-turn positioned at an end of the process reactant layer and at an end of the process product layer to allow for the flow of fluid from the process reactant layer to the process product layer, the process heat exchange section and the process reaction section being positioned in the process reactant layer.

In any of the above-indicated embodiments, the heat exchange layer comprises an exothermic reactant layer, oxygen source layer, exhaust layer, and a heat exchange u-turn positioned at an end of the exothermic reactant layer and at an end of the exhaust layer to allow for the flow of fluid from the exothermic reactant layer to the exhaust layer, the exothermic reactant layer having a heat exchange section and a reaction section.

In any of the above-indicated embodiments, the heat exchange layer comprises a exothermic reactant layer, the exothermic reactant layer including an exothermic reactant rich section and an exothermic reactant lean section, the exothermic reactant rich section being upstream from the exothermic reactant lean section, and an ignition catalyst positioned in the exothermic reactant rich section. The exothermic reactant lean section may or may not contain a catalyst. A clean up catalyst may be positioned in the exothermic reactant lean section and/or downstream of the exothermic reactant lean section. The exothermic reactant rich section may be operated at a temperature in the range from about 200° C. to about 900° C. The exothermic reactant lean section may be operated at a temperature in the range from about 200° C. to about 1000° C., or about 300° C. to about 1000° C., or about 600° C. to about 1000° C.

In any of the above-indicated embodiments, an exothermic reaction is conducted in the heat exchange layer to produce heat and a dry exhaust gas, the dry exhaust gas containing no more than about 5% by volume, or no more than about 4% by volume, or no more than about 3% by volume, or no more than about 2% by volume of hydrogen or methane to avoid the formation of flammable or explosive conditions in the exhaust gas.

In any of the above-indicated embodiments, an exothermic reaction is conducted in the heat exchange layer, the exothermic reaction comprising the reaction of a fuel with an oxygen source, a dry exhaust being produced in the heat exchange layer, the amount of oxygen in the dry exhaust while operating at or about the intermediate temperature being in the range from about 10 to about 21% by volume.

In any of the above-indicated embodiments, an exothermic reaction is conducted in the heat exchange layer, the exothermic reaction comprising the reaction of a fuel with an oxygen source, a dry exhaust being produced in the heat exchange layer, the amount of oxygen in the dry exhaust while operating at the desired operating temperature being in the range from about 2 to about 10% by volume, or from about 3 to about 6% by volume, or from about 3% to about 5% by volume.

In any of the above-indicated embodiments, subsequent to step (E), a steam methane reforming reaction is conducted in the process layer to form synthesis gas; and a combustion reaction is conducted in the heat exchange layer to provide heat for the process layer. The approach to equilibrium for the steam methane reforming reaction may be at least about 80%. The contact time for the steam methane reforming reaction may be up to about one second. The microchannel reactor may comprise a plurality of plates in a stack, the steam methane reforming reaction being conducted for at least about 2000 hours without metal dusting pits forming on surfaces of the plates. The pressure drop in the process layer after conducting the steam methane reforming reaction for at least about 2000 hours may increase by less than about 20% of the pressure drop at the start of the process.

The invention relates to an apparatus, comprising: a microchannel reactor, the microchannel reactor comprising an endothermic process layer and an exothermic heat exchange layer; the endothermic process layer comprising a process manifold section and a process reaction section, the process reaction section being downstream of the process manifold section, and an endothermic reaction catalyst positioned in the process reaction section; and the heat exchange layer comprising an exothermic manifold section and an exothermic reaction section, the exothermic reaction section being downstream of the exothermic manifold section, the exothermic reaction section having a first part and a second part, the second part of the exothermic reaction section being downstream from the first part of the exothermic reaction section, an ignition catalyst positioned in the first part of the exothermic reaction section, and a clean-up catalyst is positioned downstream from the exothermic reaction section. In an embodiment, a hydrogenolysis catalyst is positioned in the manifold section of the heat exchange layer. In any of the above-indicated embodiments, a process heat exchange section is positioned between the process manifold section and the process reaction section, and an exothermic heat exchange section is positioned between the exothermic manifold section and the exothermic reaction section. In an embodiment, a hydrogenolysis catalyst is positioned in the heat exchange section of the exothermic reactant layer. In any of the above-indicated embodiments, the endothermic process layer comprises a process reactant layer, a process product layer positioned adjacent to the process reactant layer, and a process u-turn positioned at an end of the process reactant layer and at an end of the process product layer to allow for the flow of fluid from the process reactant layer to the process product layer, the process reaction section being positioned in the process reactant layer. In any of the above-indicated embodiments, the heat exchange layer comprises an exothermic reactant layer, oxygen source layer, exhaust layer, and a heat exchange u-turn positioned at an end of the exothermic reactant layer and at an end of the exhaust layer to allow for the flow of fluid from the exothermic reactant layer to the exhaust layer, the clean-up catalyst being positioned in the exhaust layer.

This invention relates to an apparatus, comprising: a microchannel reactor comprising an endothermic process layer and an adjacent exothermic heat exchange layer; the endothermic process layer comprising a process heat exchange section and a process reaction section, the process reaction section being downstream from the process heat exchange section, a pre-reforming catalyst positioned in the process heat exchange section, and an endothermic reaction catalyst positioned in the process reaction section; and the heat exchange layer comprising an exothermic heat exchange section and an exothermic reaction section, the exothermic reaction section being downstream from the exothermic heat exchange section. In an embodiment, a combustion catalyst and/or partial oxidation catalyst is positioned in the exothermic reaction section. In an embodiment, an ignition catalyst is positioned in the exothermic heat exchange section and/or exothermic reaction section. In an embodiment, a clean-up catalyst is positioned in the exothermic reaction section and/or downstream of the exothermic reaction section. In an embodiment, the endothermic process layer comprises a process reactant layer, a process product layer positioned adjacent to the process reactant layer, and a process u-turn positioned at an end of the process reactant layer and at an end of the process product layer to allow for the flow of fluid from the process reactant layer to the process product layer, the process heat exchange section and the process reaction section being positioned in the process reactant layer. In an embodiment, the heat exchange layer comprises an exothermic reactant layer, oxygen source layer, exhaust layer, and a heat exchange u-turn positioned at an end of the exothermic reactant layer and at an end of the exhaust layer to allow for the flow of fluid from the exothermic reactant layer to the exhaust layer, the exothermic reaction section and exothermic heat exchange section being positioned in the exothermic reactant layer.

In any of the above-indicated embodiments, the microchannel reactor comprises a stack of plates defining the process layer and heat exchange layer, wherein the stack is positioned in a containment vessel, the stack being adapted to operate at an internal pressure above atmospheric pressure, the containment vessel being adapted to operate at an internal pressure above atmospheric pressure and provide for the application of pressure to the exterior surface of the stack.

In any of the above-indicated embodiments, the microchannel reactor comprises a stack of plates defining the process layer and heat exchange layer, wherein an exoskeleton is mounted on the exterior of the stack to provide structural support for the stack.

In any of the above-indicated embodiments, the microchannel reactor comprises a stack of plates defining the process layer and heat exchange layer, wherein end plates are attached to each side of the stack to provide structural support for the stack.

In any of the above-indicated embodiments, the peripheral edge of each plate may be welded to the peripheral edge of the next adjacent plate to form the stack. Alternatively or additionally, the stack may be formed using bonding and/or brazing.

In any of the above-indicated embodiments, the apparatus may comprise a sufficient number of plates to provide for one or a plurality of process layers, for example, from 1 to about 1000, or from 1 to about 100, or from about 4 to about 30 process layers; and one or a plurality of heat exchange layers, for example, from 1 to about 1000, or from 1 to about 100, or from about 4 to about 30 heat exchange layers. The plates may be aligned horizontally and stacked one above another, aligned vertically and positioned side-by-side, or they may be aligned at an angle to the horizontal. The process layers and heat exchange layers may be aligned in alternating sequence with a process layer adjacent to a heat exchange layer, which in turn is adjacent to another process layer, which in turn is adjacent to another heat exchange layer, etc. Alternatively, two or more process layers and/or two or more heat exchange layers may be positioned adjacent to one another. In an embodiment, a process layer may be welded to a heat exchange layer to provide an endothermic/exothermic process repeat unit.

In any of the above-indicated embodiments, the apparatus may comprise one or plurality of repeat units, wherein each repeat unit is the same and each comprises one or more process layers and one or more heat exchange layers. For example, a repeat unit may comprise from 1 to about 10, or from 1 to about 5, or from 1 to about 3, or about 2 process layers; and from 1 to about 10, or from 1 to about 5, or from 1 to about 3, or about 2 heat exchange layers. The repeat units may be aligned horizontally and stacked one above another, aligned vertically and positioned side-by-side, or they may be aligned at an angle to the horizontal. Within each repeat unit the process layers and heat exchange layers may be aligned in alternating sequence with a process layer adjacent to a heat exchange layer, which in turn is adjacent to another process layer, which in turn is adjacent to another heat exchange layer, etc. Alternatively, two or more process layers and/or two or more heat exchange layers may be positioned adjacent to one another. The stack of plates may comprise any number of repeat units, for example, from 1 to about 1000, or from 1 to about 500, or from 1 to about 100, or from 1 to about 50, or from 1 to about 20, or from 1 to about 10 repeat units.

In any of the above-indicated embodiments, the apparatus may further comprise: an inlet process manifold welded to the stack to provide for the flow of fluid into the process layer; an outlet process manifold welded to the stack to provide for the flow of fluid out of the process layer; at least one inlet heat exchange manifold welded to the stack to provide for the flow of fluid into the heat exchange layer; and a heat exchange outlet to provide for the flow of fluid out of the heat exchange layer. The heat exchange outlet may comprise an exhaust outlet welded to an end of the stack and adapted to provide for the flow of exhaust gas from the heat exchange layer.

In any of the above-indicated embodiments, the stack, which may be referred to as a core assembly, may be placed in a containment vessel or have mechanical braces placed around the core assembly to withstand pressure during operation. The stack may be adapted to operate at an internal pressure above atmospheric pressure, for example, a gauge pressure up to about 15 MPa, or in the range from about 0.1 to about 15 MPa, or in the range from about 0.1 to about 5 MPa. The internal pressure within the stack may be generated by process activity in the process layer and/or heat exchange activity in the heat exchange layer. There may be two or more internal pressures within the stack as a result of operating an endothermic reaction at a first pressure in the process layer and an exothermic reaction at a second pressure in the heat exchange layer. For example, a relatively high pressure may result from a high pressure reaction, such as an SMR reaction, in the process layer and a relatively low pressure reaction, such as a combustion reaction in the heat exchange layer. The difference in pressure between the internal pressure in the process layer and the internal pressure in the heat exchange layer may be up to about 10 MPa, or in the range from about 0.1 to about 10 MPa, or from about 0.2 to about 5 MPa. The containment vessel may also be adapted to operate at an internal pressure above atmospheric pressure, for example, a gauge pressure up to about 10 MPa, or in the range from about 0.1 to about 10 MPa, or in the range from about 0.1 to about 5 MPa. The internal pressure within the containment vessel may be maintained using a containment gas. The containment gas may be an inert gas such as nitrogen. The internal pressure within the containment vessel may be used to provide pressure against the exterior surface of the stack, and thereby provide structural support for the stack.

In any of the above-indicated embodiments, any of the catalysts in the process layer and/or heat exchange layer may be applied to one or more plates in the stack ex-situ prior to forming the stack. In any of the above-indicated embodiments, the one or more of the plates may have an anti-corrosion layer, anti-sticking layer, metal dust resistant layer, and/or surface protection layer applied to its surface.

BRIEF DESCRIPTION OF THE DRAWINGS

In the annexed drawings, like parts and features are accorded like designations.

FIGS. 7A to 7J are schematic illustrations of repeat units for the microchannel reactor wherein different positions for the catalysts are shown.

DETAILED DESCRIPTION

Figure 1:
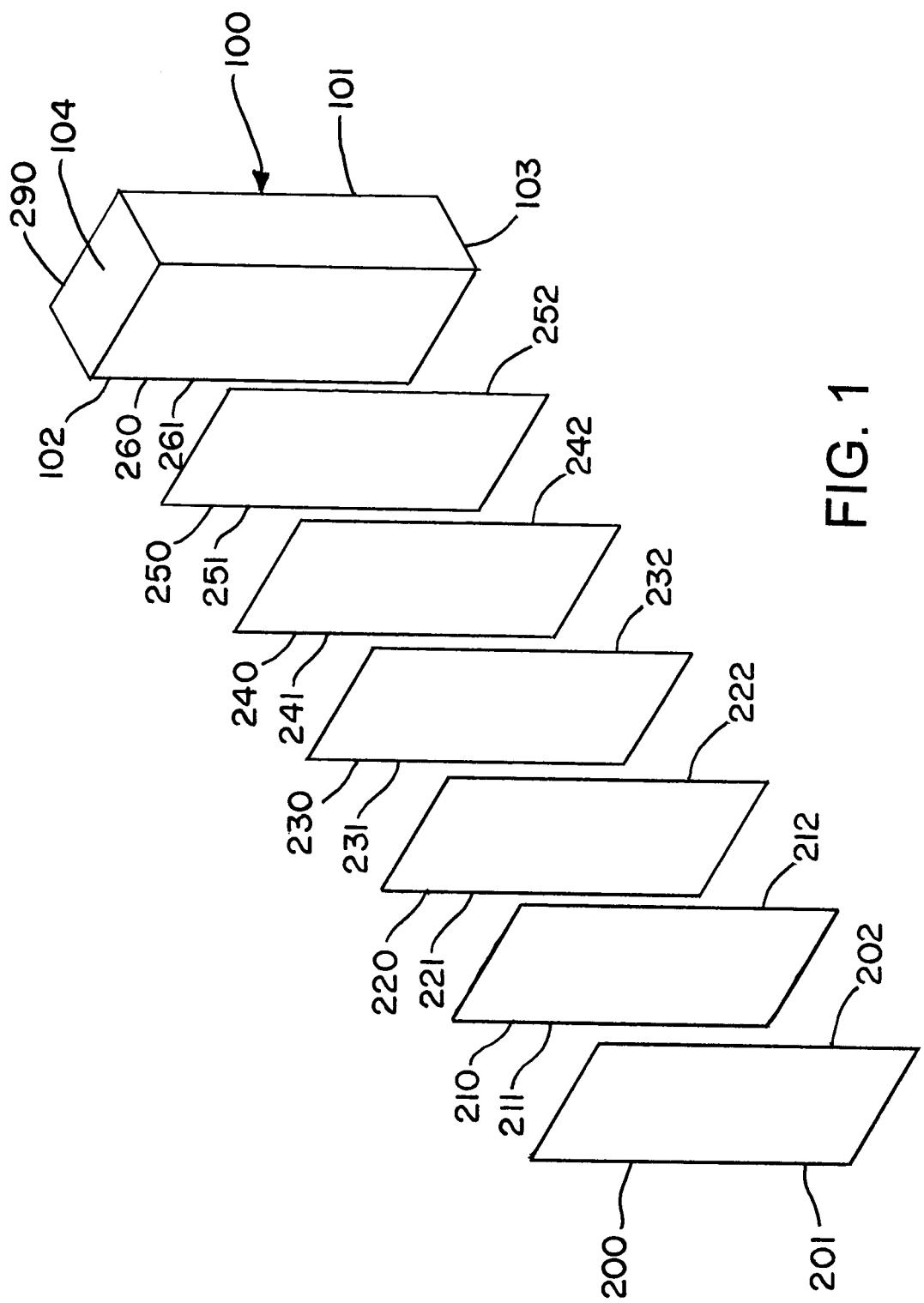
FIG. 1 is a schematic illustration showing a stack of plates used to form the inventive apparatus. For purposes of illustration, some of the plates are stacked together, and others are shown as separated from the stack.

All ranges and ratio limits disclosed in the specification and claims may be combined in any manner. It is to be understood that unless specifically stated otherwise, references to "a," "an," and/or "the" may include one or more than one, and that reference to an item in the singular may also include the item in the plural. All combinations specified in the claims may be combined in any manner.

The phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The word "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or may refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The transitional words or phrases, such as "comprising," "including," "carrying," "having," "containing," "involving," "holding," and the like, are to be understood to be open-ended, i.e., to mean including but not limited to.

The term "microchannel" refers to a channel having at least one internal dimension of height or width of up to about 10 millimeters (mm), or up to about 5 mm, or up to about 2 mm. The microchannel may have a height, width and length. Both the height and width may be perpendicular to the bulk flow direction of the flow of fluid in the microchannel. The microchannel may comprise at least one inlet and at least one outlet wherein the at least one inlet is distinct from the at least one outlet. The microchannel may not be merely an orifice. The microchannel may not be merely a channel through a zeolite or a mesoporous material. The length of the microchannel may be at least about two times the height or width, or at least about five times the height or width, or at least about ten times the height or width. The height or width may be referred to as the gap between opposed internal walls of the microchannel. The internal height or width of the microchannel may be in the range of about 0.05 to about 10 mm, or from about 0.05 to about 5 mm, or from about 0.05 to about 2 mm, or from about 0.1 to about 2 mm, or from about 0.5 to about 2 mm, or from about 0.5 to about 1.5 mm, or from about 0.08 to about 1.2 mm. The other internal dimension of height or width may be of any dimension, for example, up to about 10 centimeters (cm), or from about 0.1 to about 10 cm, or from about 0.5 to about 10 cm, or from about 0.5 to about 5 cm. The length of the microchannel may be of any dimension, for example, up to about 250 cm, or from about 5 to about 250 cm, or from about 10 to about 100 cm, or from about 10 to about 75 cm, or from about 10 to about 60 cm. The microchannel may have a cross section having any shape, for example, a square, rectangle, circle, semi-circle, trapezoid, etc. The shape and/or size of the cross section of the microchannel may vary over its length. For example, the height or width may taper from a relatively large dimension to a relatively small dimension, or vice versa, over the length of the microchannel.

The term "process layer" refers to a layer in a microchannel reactor wherein a process is conducted. The process may comprise an endothermic reaction process such as a steam reforming reaction process, for example, a steam methane reforming (SMR) reaction process. The term "process microchannel" refers to a microchannel positioned in a process layer of a microchannel reactor.

The term "heat exchange layer" refers to a layer in a microchannel reactor used to provide heat for transfer to one or more process layers in the microchannel reactor. An exothermic process may be conducted in the heat exchange layer. The exothermic process may be conducted in the presence of an exothermic reaction catalyst. The exothermic process may comprise a combustion reaction or a partial oxidation reaction.

The term "heat exchange channel" refers to a channel positioned in a heat exchange layer of a microchannel reactor. The heat exchange channel may be a microchannel.

The term "heat exchange fluid" refers to a fluid that gives off heat.

The term "heat transfer wall" refers to a common wall between a process layer or microchannel and an adjacent heat exchange layer or channel where heat transfers from the heat exchange layer or channel to the process layer or channel through the common wall.

The term "microchannel reactor" refers to an apparatus comprising one or more process layers and one or more heat exchange layers, wherein the process layers comprise one or more process microchannels. A process may be conducted in the process layer. The process may be conducted in each of the process microchannels. The process may comprise an endothermic chemical reaction process, such as a steam reforming reaction process, for example, a SMR reaction process. When two or more process microchannels are used, the process microchannels may be operated in parallel. The microchannel reactor may include one or more internal manifolds for providing for the flow of reactants into the one or more process microchannels, and one or more internal manifolds providing for the flow of product out of the one or more process microchannels. The one or more heat exchange layers may be adjacent to or in thermal contact with the one or more the process layers. The one or more heat exchange layers may provide heating for the fluids in the one or more process layers. The heat exchange layer may comprise one or more heat exchange channels. The heat exchange channels may be microchannels. An exothermic reaction process such as a combustion reaction or a partial oxidative reaction process may be conducted in the one or more heat exchange layers. The microchannel reactor may include one or more internal manifolds for providing for the flow of fluid into the heat exchange channels, and one or more manifolds providing for the flow of fluid out of the heat exchange channels. The microchannel reactor may also include one or more exhaust layers comprising one or more exhaust channels (e.g., microchannels) and an exhaust outlet providing for the flow of exhaust out of the microchannel reactor when a combustion or partial oxidation reaction is conducted in the one or more heat exchange layers.

The term "welding" refers to a fabrication process that joins materials, usually metals or thermoplastics, by causing coalescence. This may be done by melting the workpieces and/or by adding a filler material to form a pool of molten material (the weld pool) that cools to become a strong joint, with pressure sometimes used in conjunction with heat, or by itself, to produce the weld.

The term "brazing" refers to a metal-joining process whereby a filler material is heated above its melting point and distributed between two or more close-fitting parts by capillary action. The filler metal is brought slightly above its melting temperature while protected by a suitable atmosphere, usually a flux. The filler metal flows over the base metal (known as wetting) and is cooled to join the workpieces together.

The term "diffusion bonding" refers to a process wherein metal parts are held together under an applied force and heated in a vacuum furnace, causing atoms from each part to diffuse to the other. Unlike brazing, no filler alloy is used.

The term "reaction chamber volume" refers to the internal volume of a reaction chamber within which a reaction occurs (e.g. endothermic or exothermic), including the volume of the catalyst (both solid and porous portions), the open flow volume, and metal support ribs or fins (if present). This volume does not include the reaction chamber walls. The reaction chamber may contain a catalyst.

The term "contact time" refers to the reaction chamber volume divided by the volumetric inlet flow rate of the reactants at standard conditions (i.e., a temperature of 273° K and an absolute pressure of one atmosphere) into the reaction chamber.

The term "adjacent" when referring to the position of one channel relative to the position of another channel means directly adjacent such that a wall or walls separate the two channels. The two channels may have a common wall. The common wall may vary in thickness. However, "adjacent" channels may not be separated by an intervening channel that interferes with heat transfer between the channels. One channel may be adjacent to another channel over only part of the channel.

The term "thermal contact" refers to two bodies, for example, two channels, that may or may not be in physical contact with each other or adjacent to each other but still exchange heat with each other. One body in thermal contact with another body may heat or cool the other body.

The term "fluid" refers to a gas, a liquid, a mixture of a gas and a liquid, or a gas or a liquid containing dispersed solids, liquid droplets and/or gaseous bubbles. The droplets and/or bubbles may be irregularly or regularly shaped and may be of similar or different sizes.

The terms "gas" and "vapor" have the same meaning and may be used interchangeably.

The term "residence time" or "average residence time" refers to the internal volume of a space within a channel occupied by a fluid flowing in the space divided by the average volumetric flow rate for the fluid flowing in the space at the average temperature and pressure being used.

The term "surface feature" refers to a depression or a projection in a channel wall and/or internal channel structure that disrupts flow within the channel.

The term "capillary feature" refers to a depression or a projection in a channel wall and/or internal channel structure that does not disrupt flow within the channel when the flow is in the laminar flow regime. For example, a capillary feature may be a depression in a wall that is substantially perpendicular to the flow direction. Capillary features may be cross hatched or have other non-regular shapes such as those produced by surface roughening. In general, flow may be substantially stagnant in a capillary feature and this stagnant flow region may enable an enhanced reaction rate by creating a safe harbor for reactants to continue to contact the catalyst before diffusing back into fast moving flow stream adjacent to the capillary features.

The term "bulk flow direction" refers to the vector through which fluid may travel in an open path in a channel.

The term "bulk flow region" refers to open areas within a channel (e.g., a microchannel). A contiguous bulk flow region may allow rapid fluid flow through a channel without significant pressure drop. The flow in the bulk flow region may be laminar or turbulent. A bulk flow region may comprise at least about 5% of the internal volume and/or cross-sectional area of a channel, or from about 5% to about 100%, or from about 5% to about 99%, or from about 5% to about 95%, or from about 5% to about 90%, or from about 30% to about 80% of the internal volume and/or cross-sectional area of the channel.

The term "cross-sectional area" of a channel (e.g., a microchannel) refers to an area measured perpendicular to the direction of the bulk flow of fluid in the channel and may include all areas within the channel including any surface features that may be present, but does not include the channel walls. For channels that curve along their length, the cross-sectional area may be measured perpendicular to the direction of bulk flow at a selected point along a line that parallels the length and is at the center (by area) of the channel. Dimensions of height and width may be measured from one interior channel wall to the opposite interior channel wall. These dimensions may be average values that account for variations caused by surface features, surface roughness, and the like.

The term "process fluid" refers to reactants, product, diluent and/or other fluid that enters, flows in and/or flows out of the process layer of the microchannel reactor.

The term "reactants" refers to reactants used in a chemical reaction. For an SMR reaction, the reactants may comprise steam and methane. For a combustion reaction, the reactants may comprise a fuel (e.g., hydrogen, hydrocarbon such as methane, etc.) and an oxygen source (e.g., air).

The term "reaction zone" refers to the space within a channel wherein a chemical reaction occurs or wherein a chemical conversion of at least one species occurs. The reaction zone may contain one or more catalysts.

The term "conversion of reactant" refers to the reactant mole change between a fluid flowing into a reactor and a fluid flowing out of the reactor divided by the moles of reactant in the fluid flowing into the reactor.

The term "substantially uniform flow" refers to a flow distribution that may not be perfect but the amount of flow non-uniformity may not substantially degrade the process performance in that the performance of a device with more than two channels may be within about 95% of the performance of a single channel device of equal channel design (length, width, height, and catalyst location).

The term "mm" may refer to millimeter. The term "nm" may refer to nanometer. The term "ms" may refer to millisecond. The term "ps" may refer to microsecond. The term "μm" may refer to micron or micrometer. The terms "micron" and "micrometer" have the same meaning and may be used interchangeably. The term m/s may refer to meters per second. The term "kg" refers to kilograms. Unless otherwise indicated, all pressures are expressed in terms of absolute pressure.

The microchannel reactor may comprise one or more process layers and one or more heat exchange layers. The microchannel reactor may be used for conducting simultaneous endothermic and exothermic chemical reactions. The endothermic reaction may be conducted in the one or more process layers and may comprise a steam reforming reaction (e.g., a steam methane reforming reaction). The exothermic reaction may be conducted in the one or more heat exchange layers and may comprise a combustion reaction or a partial oxidation reaction. Exothermic heat may transfer from the one or more heat exchange layers to the one or more process layers. When more than one process layer and more than one heat exchange layer are used, they may be aligned in alternating sequence, or two or more process layers and/or two or more heat exchange layers may be positioned adjacent to each other.

Referring to the drawings, and initially to FIGS. 1 to 4, the microchannel reactor may comprise a stack of plates 100. The stack 100 may be used as the core assembly for the microchannel reactor. The stack 100 may comprise one or more process layers and one or more heat exchange layers positioned adjacent one another or in thermal contact with one another. The stack 100 may comprise, for example, from 1 to about 1,000, or from 1 to about 500, or from 1 to about 200, or from 1 to about 100, or from 1 to about 50, or from 1 to about 30, or from 1 to about 20 process layers, and corresponding heat exchange layers adjacent to or in thermal contact with the process layers. The stack 100 may include sides 101, 102, 103 and 104 formed by the peripheral edges of the plates. The peripheral edge of each plate on each of the sides 101, 102, 103 and 104 may be welded to the peripheral edge of the next adjacent plate. In this way, the stack 100 may have a perimeter seal on each of the sides 101, 102, 103 and 104 formed by the welds. The welds may also be used to provide structural integrity for the stack 100. Openings in the perimeter seal may be provided to allow for fluids to flow into and out of the stack.

The stack 100 may be oriented with the plates aligned vertically and positioned side-by-side to facilitate flow of the process and heat exchange fluids. Alternatively, the stack 100 may be aligned in such a manner to provide for the plates being oriented horizontally, or at an angle to the horizontal. The stack 100 may have welded to its sides manifolds 150, 160, 170 and 180. These manifolds may be used to provide for the flow of endothermic reactants into the stack 100, and endothermic products out of the stack 100. Two of the manifolds may be used to provide for the flow of exothermic reactants (e.g., a fuel and an oxygen source) into the stack 100 when a combustion reaction or a partial oxidation reaction is conducted in the heat exchange layer. Exhaust outlet 190 may be welded to the top of the stack 100 for removing exhaust when a combustion reaction or a partial oxidation reaction is conducted in the heat exchange layer.

The stack 100, with the manifolds 150, 160, 170 and 180 welded to is sides, and exhaust outlet 190 welded to its top end, may be referred to as microchannel reactor 192. Referring to FIGS. 2-4 and 5A, microchannel reactor 192 may be positioned in containment vessel 193. The containment vessel 193 may include top head 194, containment section 195, support legs 196, containment gas inlet 197, temperature control port 198, and a drain port (not shown in the drawings) at the bottom of the containment section 195. Inlet and outlet pipes 151, 161, 171 and 181 extend from corresponding manifolds 150, 160, 170 and 180, and project through the top head 194. Similarly, exhaust outlet opening 191 extends from exhaust outlet 190 through the top head 194. The containment vessel 193 may include appropriate insulation within its interior and/or on its exterior surface, and may be constructed using any material that can provide structural integrity for the desired end use. These materials may include: steel (e.g., stainless steel, carbon steel, and the like); aluminum; titanium; nickel; platinum; rhodium; copper; chromium; alloys containing any of the foregoing metals; monel; inconel; brass; polymers (e.g., thermoset resins); ceramics; glass; composites comprising one or more polymers (e.g., thermoset resins) and fiberglass; quartz; silicon; or a combination of two or more thereof. The containment vessel may be constructed of carbon steel and rated to 450 psig (3.10 MPa) at 260° C. The outside diameter (OD) of the containment vessel 193 may be of any desired dimension for the intended use. For example, for an SMR reactor, the OD of the containment vessel may be about 30 inches (76.2 cm), or about 32 inches (81.3 cm), or about 36 inches (91.4 cm). The height of the containment vessel may be from about 24 to about 200 inches (about 61 to about 508 cm), or from about 48 to about 72 inches (about 122 to about 183 cm), or about 60 inches (about 152 cm). The containment vessel may include a control mechanism to maintain the pressure within the containment vessel at a level at least as high as the internal pressure within the stack.

Figure 5B:
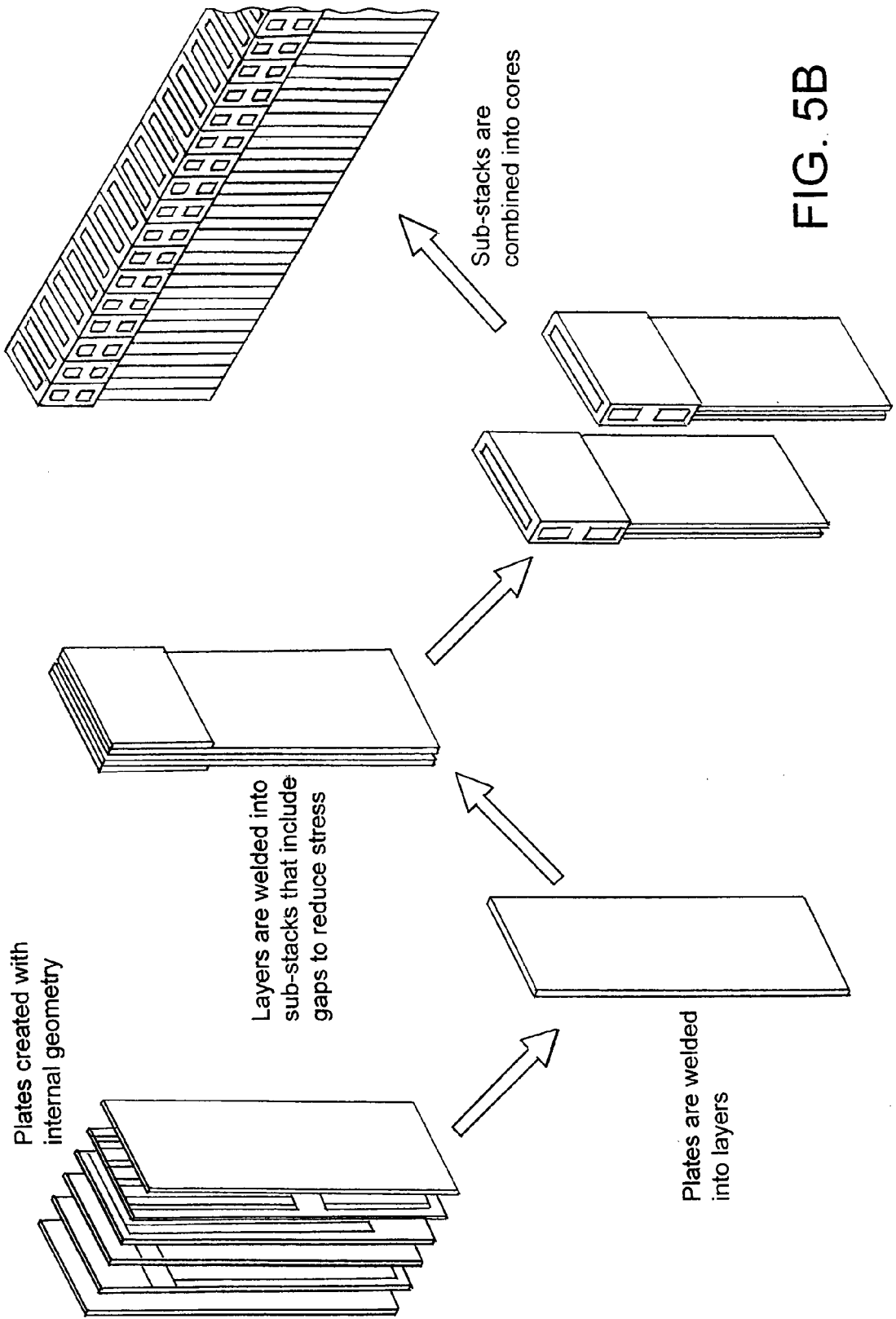
FIG. 5B is a schematic illustration showing the stacking of multiple repeat units.
Figure 5C:
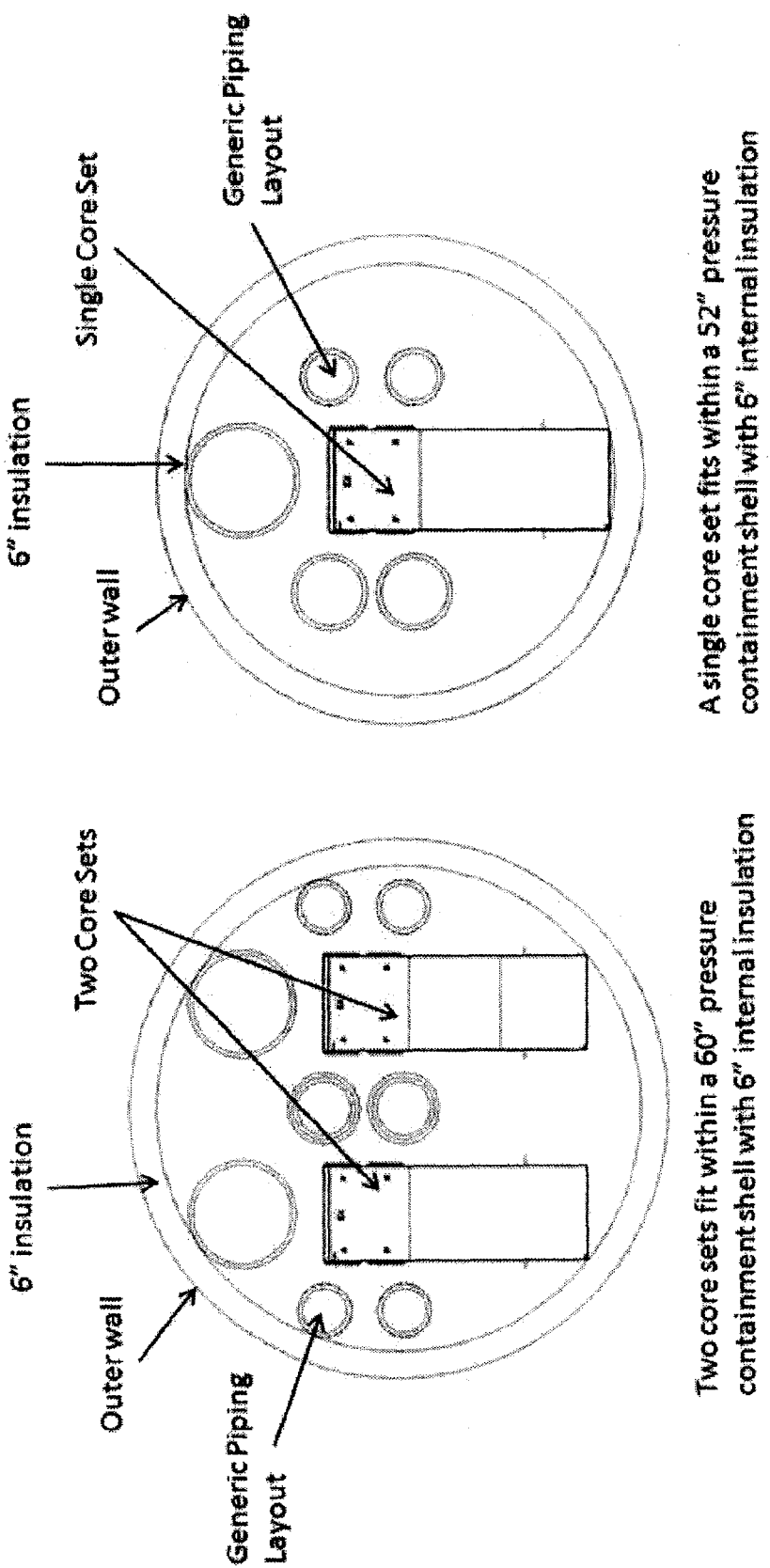
FIG. 5C is a schematic illustration showing an arrangement of stacks of multiple repeat units within a pressurized containment vessel with piping for fuel, air, exhaust, process reactant and process product.
Figure 5D:
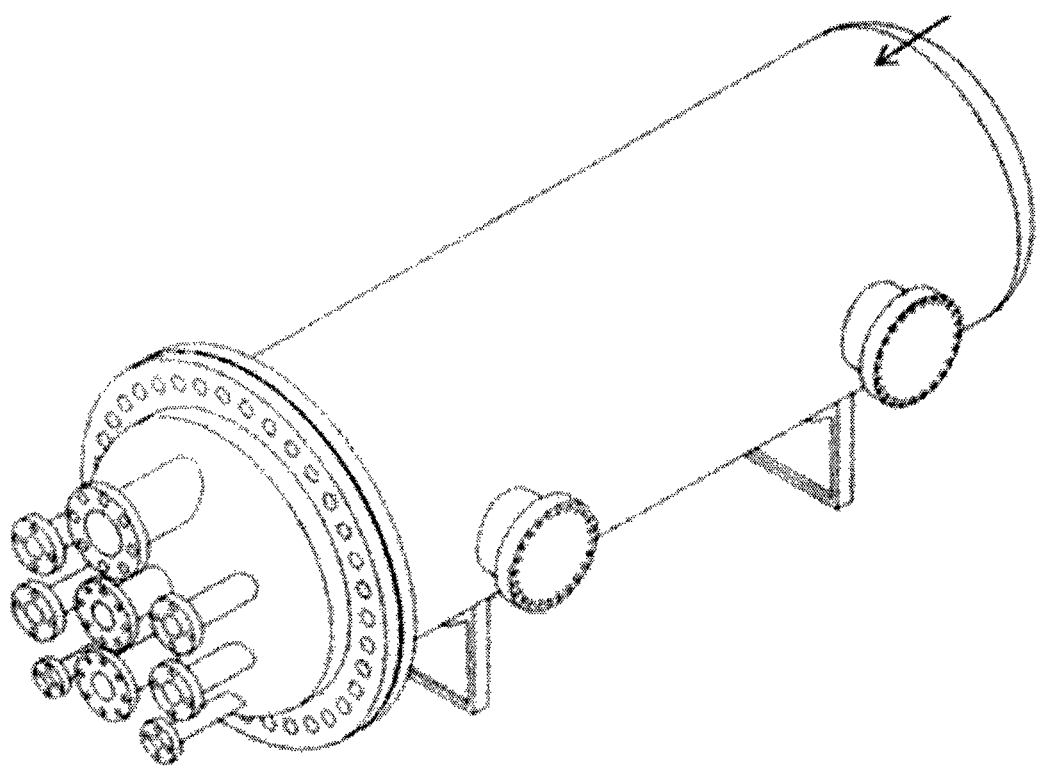
FIG. 5D is a schematic illustration of an assembled SMR microchannel reactor.

The stacks 100 may be comprise a plurality of process layers and adjacent heat exchange layers. These stacks may be assembled and positioned within a pressurized containment vessel as shown in FIGS. 5B, 5C and 5D. The pressurized containment vessel may contain from 1 to about 1000 stacks, or from 1 to about 500, or from 1 to about 50 stacks. The containment vessel may be constructed using any suitable material sufficient for operating under the pressures and temperatures required for the vessel. For example, the shell of the vessel may be constructed of cast steel. The flanges, couplings and pipes may be constructed of 316 stainless steel. The containment vessel may have any desired diameter, for example, from about 10 to about 1000 cm, or from about 50 to about 300 cm. The axial length of the containment vessel may be of any desired value, for example, from about 0.5 to about 50 meters, or from about 1 to about 20 meters.

The stack 100 may comprise one or plurality of repeat units, wherein each repeat unit is the same and each comprises one or more process layers and one or more heat exchange layers. For example, a repeat unit may comprise from 1 to about 100, or from 1 to about 20, or from 1 to about 10, or from 1 to about 5, or from 1 to about 3, or about 2 process layers; and from 1 to about 100, or from 1 to about 20, or from 1 to about 10, or from 1 to about 5, or from 1 to about 3, or about 2 heat exchange layers. A spacer plate may be positioned between each repeat unit. The repeat units may be aligned horizontally and stacked one above another, aligned vertically and positioned side-by-side, or they may be aligned at an angle to the horizontal. Within each repeat unit the process layers and heat exchange layers may be aligned in alternating sequence with a process layer adjacent to a heat exchange layer, which in turn is adjacent to another process layer, which in turn is adjacent to another heat exchange layer, etc. Alternatively, two or more process layers and/or two or more heat exchange layers may be positioned adjacent to one another.

Figure 6A:
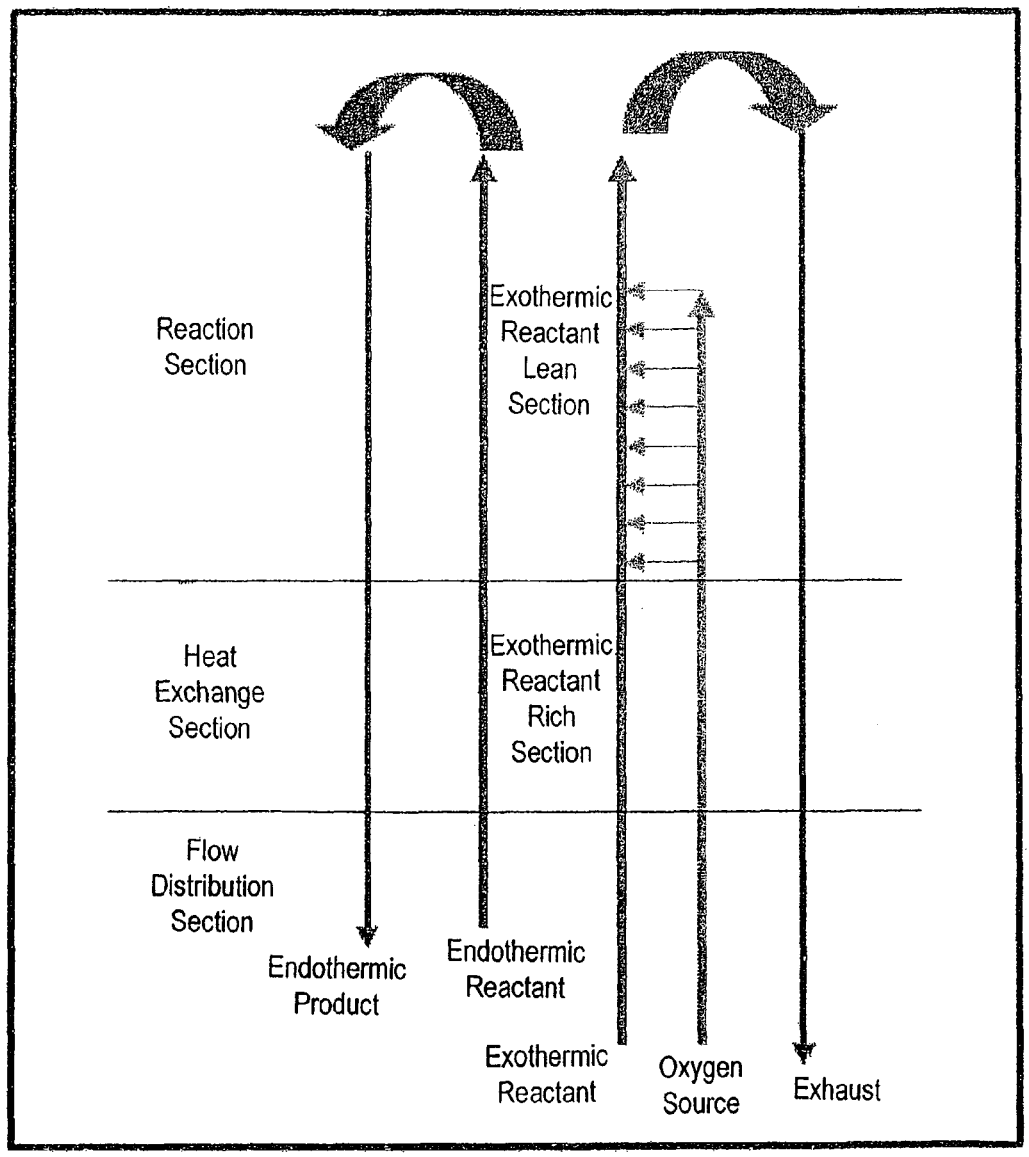
FIGS. 6A, 6B and 6C are schematic illustrations showing the flow of endothermic reactants and product in the process layer of the microchannel reactor, and the flow of an exothermic reactant (e.g., a fuel), an oxygen source (e.g., air), and an exhaust in the heat exchange layer of the microchannel reactor.
Figure 6B:
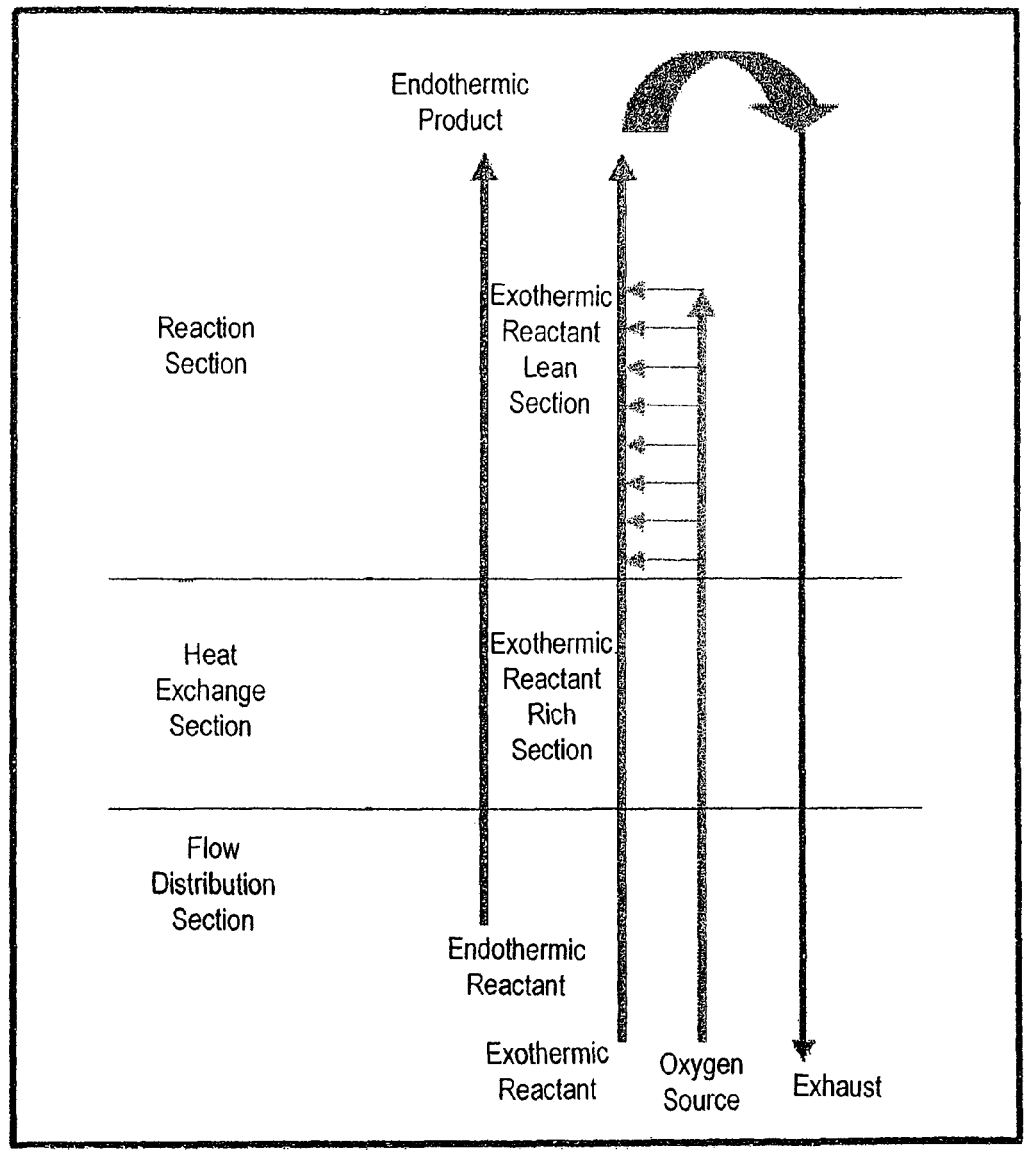
Figure 6C:
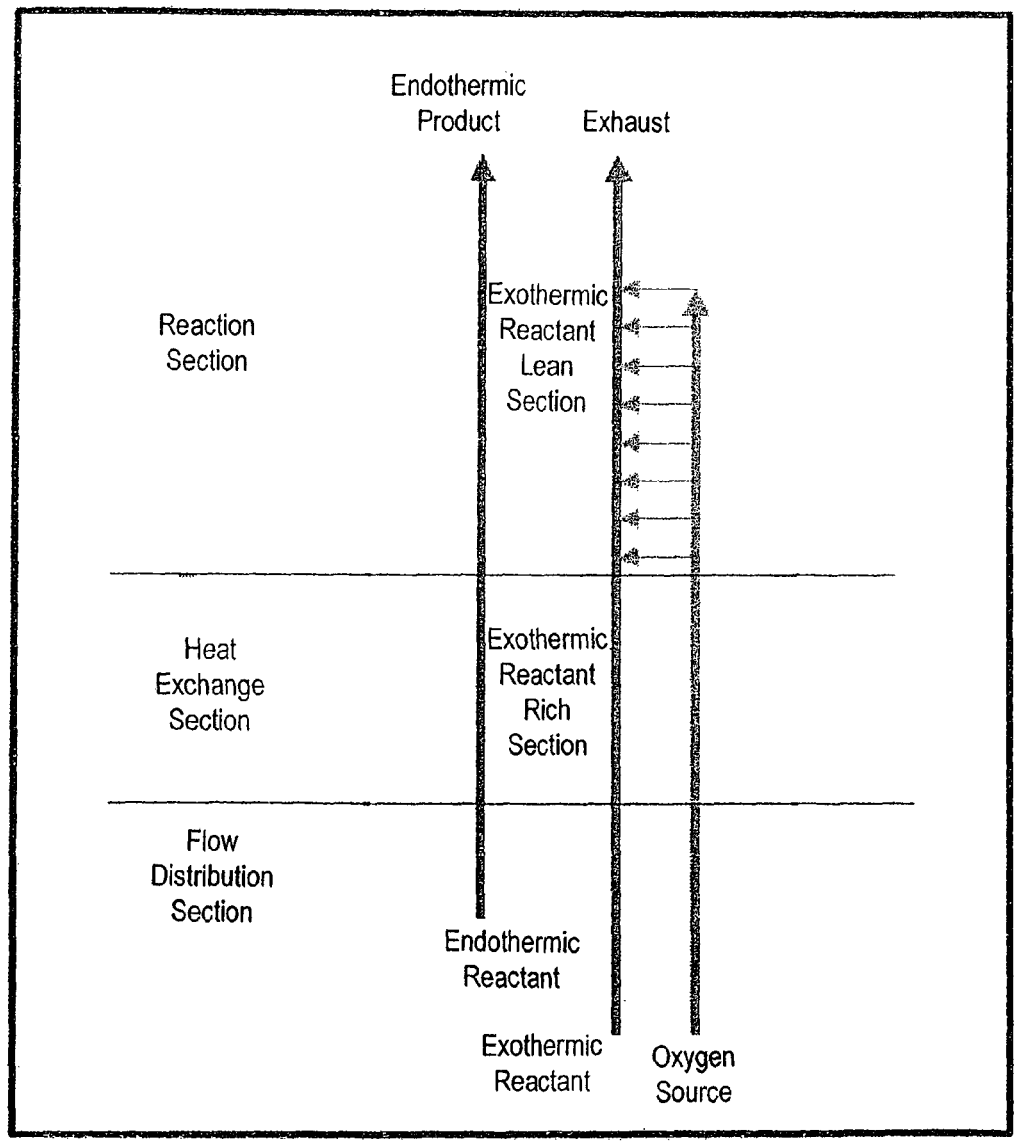

Each of the process layers and heat exchange layer may include a flow distribution or manifold section, a heat exchange section and a reaction section. This is shown in FIGS. 6A-6C. Referring to FIG. 6A, the process layer may comprise an endothermic reactant layer, an endothermic product layer, and a process u-turn positioned at an end of the endothermic reactant layer and endothermic product layer to allow for the flow of fluid from the endothermic reactant layer to the endothermic product layer. The endothermic reactant layer may be positioned adjacent to the endothermic product layer. Alternatively, the process layer shown in FIGS. 6B and 6C is a straight flow through process layer that does not require separate endothermic reactant and product layers and a connecting u-turn. In the process layer, the endothermic reactants contact the catalyst and react to form the endothermic product, with the endothermic product then flowing out of the process layer.

The heat exchange layer, as shown in FIGS. 6A and 6B, may comprise an exothermic reactant (e.g., fuel) layer, an oxygen source (e.g., air) layer positioned adjacent to the endothermic reactant layer, a common wall positioned between the exothermic reactant layer and the oxygen source layer, a plurality of openings or jets in the common wall to allow for the flow of the oxygen source from the oxygen source layer into the exothermic reactant layer, a catalyst (e.g., a combustion or partial oxidation catalyst) positioned in the exothermic reactant layer, an exhaust layer, and a heat exchange u-turn positioned at an end of the exothermic reactant layer and an end of the exhaust layer to allow for the flow of exhaust from the exothermic reactant layer to the exhaust layer. Alternatively, the heat exchange layer shown in FIG. 6C is a straight flow through process layer that does not require a separate exhaust layer.

The flow distribution section includes one or more internal manifolds to provide for a substantially uniform flow of reactants and product into and out of the microchannels in the process layer and the channels in the heat exchange layer. The reaction section of the heat exchange layer is the section of the heat exchange layer wherein the oxygen source flows from the oxygen source layer through the common wall into the exothermic reactant layer. The reaction section of the process layer is the section of the process layer adjacent to reaction section of the heat exchange layer.

The heat exchange section of the heat exchange layer is upstream (for the flow of reactants into the heat exchange layer) of the reaction section of the heat exchange layer. The heat exchange section of the process layer is adjacent to the heat exchange section of the heat exchange layer.

The reaction sections of the process layer and the heat exchange layer may be operated at higher temperatures than the heat exchange sections of the process layer and the heat exchange layer. For example, for a SMR reaction conducted in the process layer that is heated with a combustion reaction conducted in the heat exchange layer, the operating temperature (after start up is completed) in the reaction section of each layer may be in the range from about 350° C. to about 1000° C., or about 600° C. to about 900° C., while the operating temperature in the heat exchange section of each layer may be in the range from about ambient temperature to about 750° C., or about 100° C. to about 600° C. The heat exchange section of each layer may be referred to as a "cool zone" or "cool section."

The reaction section of the exothermic reactant layer, wherein the oxygen source is added to the exothermic reactant, may be referred to as an exothermic reactant lean section. The heat exchange section of the exothermic reactant layer upstream from the reaction section of the exothermic reactant layer may be referred to as an exothermic reactant rich section. In the exothermic lean section, the oxygen added to the exothermic reactant (or fuel) may exceed the stoichiometric ratio requirement for the exothermic reaction. In an embodiment, an ignition catalyst may be positioned in the exothermic reactant rich section. In an embodiment, a clean up catalyst may be positioned in the exothermic reactant lean section, or downstream of the exothermic reactant lean section.

Figure 7A:
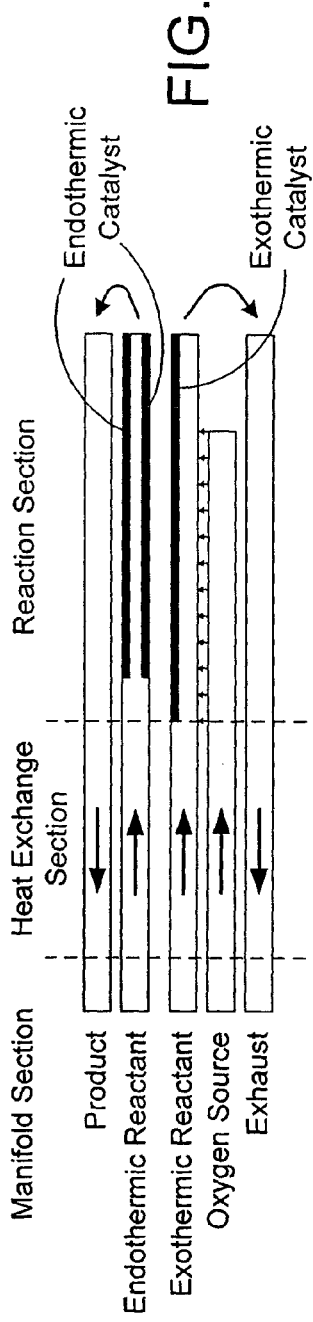

Ten alternate embodiments for the placement of the catalysts in repeat units containing a process layer and a heat exchange layer are shown in FIGS. 7A-7J. Referring to FIG. 7A, the endothermic process layer comprises a process reactant layer, a process product layer positioned adjacent to the process reactant layer, and a process u-turn positioned at an end of the process reactant layer and at an end of the process product layer to allow for the flow of fluid from the process reactant layer to the process product layer. The process reactant layer includes a manifold or flow distribution section, process heat exchange section and process reaction section. The process reaction section is downstream (relative to the direction of flow of the endothermic reactants in the process reactant layer) of the process heat exchange section. An endothermic reaction catalyst is positioned in the process layer reaction section. The catalyst may be a SMR catalyst. The heat exchange layer comprises an exothermic reactant layer, oxygen source layer, exhaust layer, and a heat exchange u-turn positioned at an end of the exothermic reactant layer and at an end of the exhaust layer to allow for the flow of fluid from the exothermic reactant layer to the exhaust layer. The exothermic reactant layer has a manifold or flow distribution section, a heat exchange section and reaction section. The reaction section of the exothermic reactant layer is downstream of the heat exchange section of the exothermic reactant layer. An exothermic reaction catalyst is positioned in the reaction section of the exothermic reactant layer. The exothermic reaction catalyst may be a combustion catalyst or a partial oxidation catalyst.

Figure 7B:
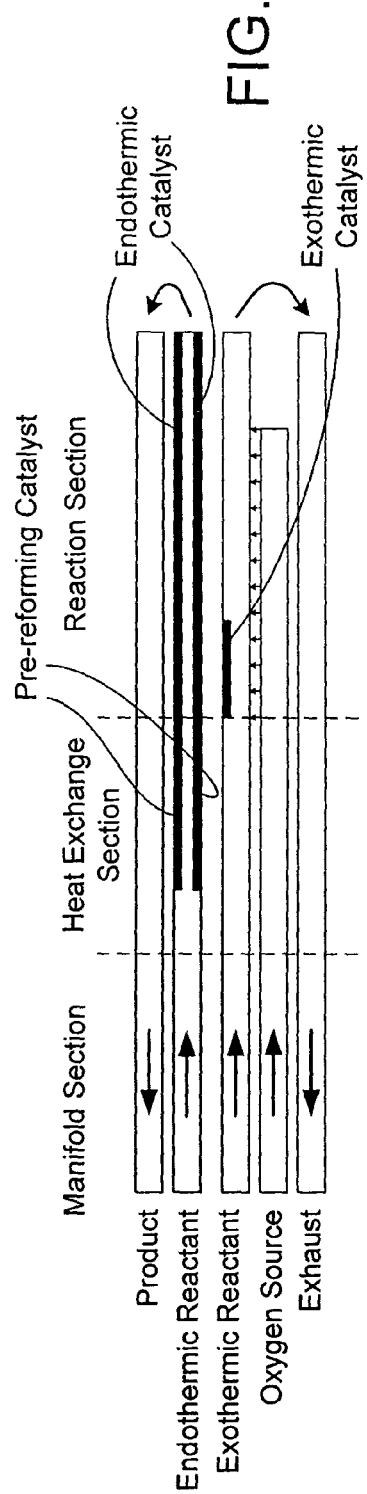

The repeat unit shown in FIG. 7B is the same as the repeat unit shown in FIG. 7A except that a pre-reforming catalyst is positioned in the heat exchange section of the process reactant layer. Also, the exothermic reaction catalyst, which may be a combustion or partial oxidation catalyst, is positioned in only part of the reaction section of the exothermic reactant layer, as compared to FIG. 7A wherein the exothermic reaction catalyst extends over the entire length of the reaction section of the exothermic reactant layer.

Figure 7C:
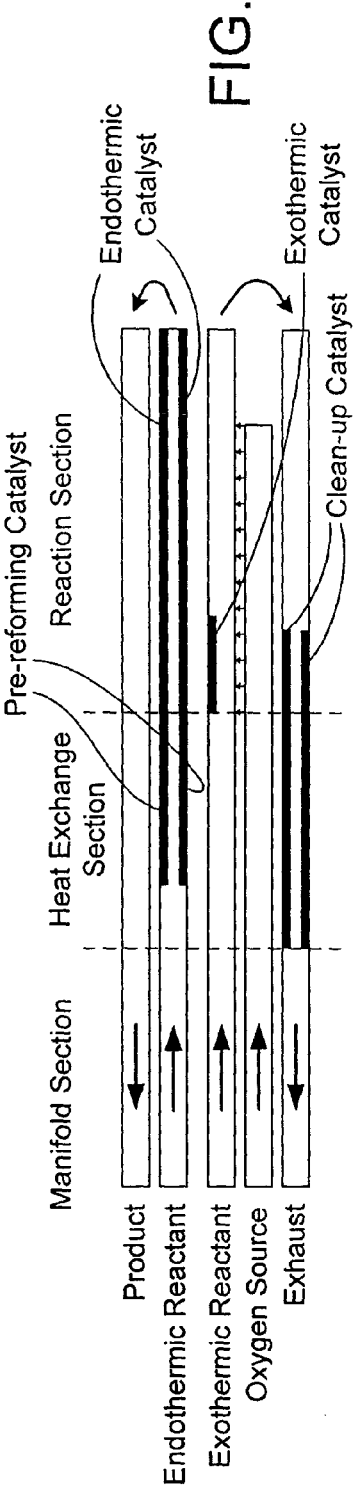

The repeat unit shown in FIG. 7C is the same as the repeat unit shown in FIG. 7B except that a clean-up catalyst is positioned in the exhaust layer.

Figures 7D, 7E, 7F:
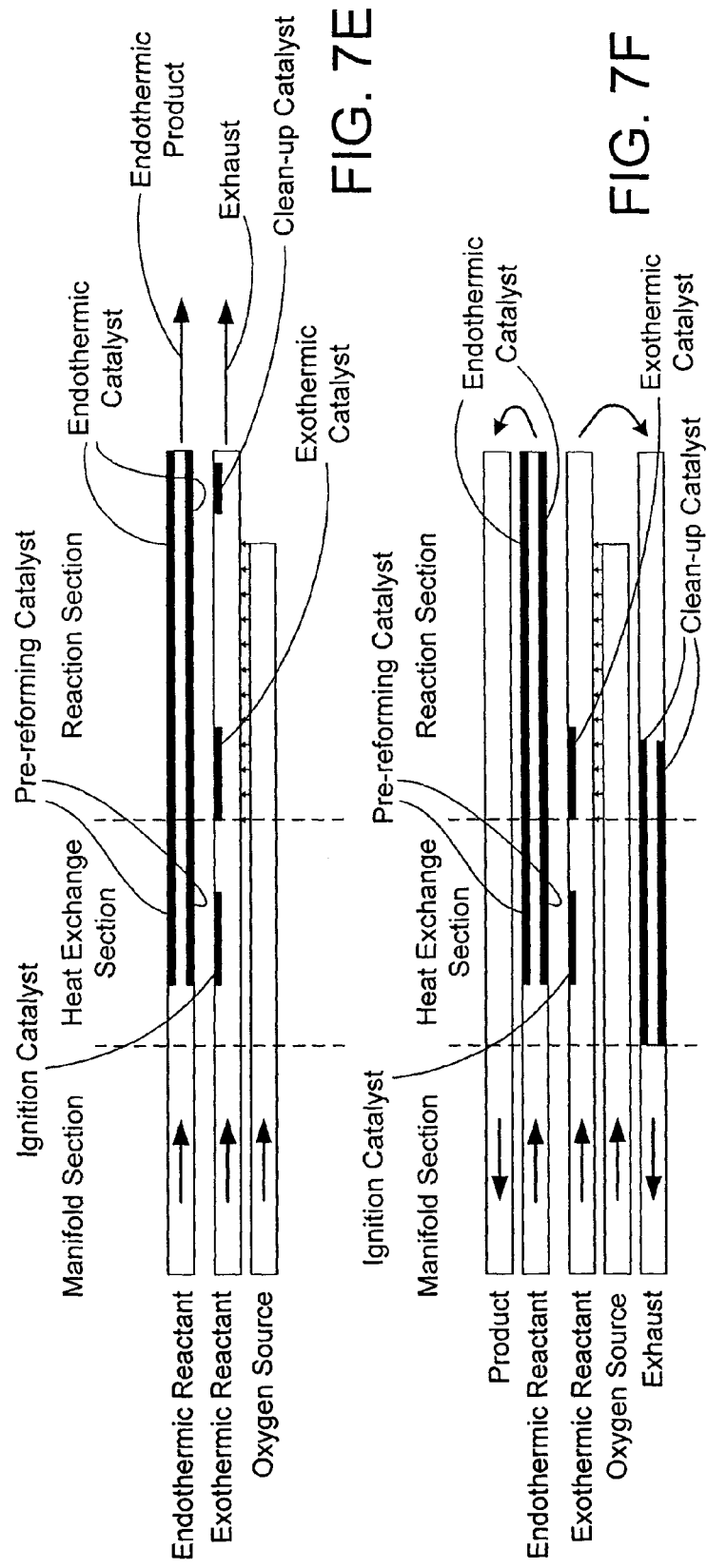

The repeat unit shown in FIG. 7D is the same as the repeat unit shown in FIG. 7A, except that in FIG. 7D the process layer and the heat exchange layer are straight flow through layers. Separate endothermic process and product layers, and separate exothermic reactant and exhaust layers, which are shown in FIG. 7A, are not required in FIG. 7D.

The repeat unit shown in FIG. 7E contains straight flow through process and heat exchange layers. Each layer includes a manifold or flow distribution section, a heat exchange section and a reaction section. A pre-reforming catalyst is positioned in the heat exchange section of the process layer. An endothermic reaction catalyst (e.g., a SMR catalyst) is positioned in the reaction section of the process layer. An ignition catalyst is positioned in the heat exchange section of the heat exchange layer. An exothermic reaction catalyst (e.g., combustion or partial oxidation catalyst) is positioned in the reaction section of the heat exchange layer. A clean-up catalyst is positioned in the heat exchange layer downstream of the reaction section of the heat exchange layer.

The repeat unit shown in FIG. 7F includes an endothermic process layer which comprises a process reactant layer, a process product layer positioned adjacent to the process reactant layer, and a process u-turn positioned at an end of the process reactant layer and at an end of the process product layer to allow for the flow of fluid from the process reactant layer to the process product layer. The process reactant layer includes a manifold or flow distribution section, process heat exchange section and process reaction section. The process reaction section is downstream (relative to the direction of flow of the endothermic reactants in the process reactant layer) of the process heat exchange section. A pre-reforming catalyst is positioned in the heat exchange section of the endothermic reactant layer. An endothermic reaction catalyst (e.g., SMR catalyst) is positioned in the reaction section of the endothermic reactant layer. The heat exchange layer comprises an exothermic reactant layer, oxygen source layer, exhaust layer, and a heat exchange u-turn positioned at an end of the exothermic reactant layer and at an end of the exhaust layer to allow for the flow of fluid from the exothermic reactant layer to the exhaust layer. The exothermic reactant layer has a manifold or flow distribution section, a heat exchange section and reaction section. The reaction section of the exothermic reactant layer is downstream of the heat exchange section of the exothermic reactant layer. An ignition catalyst is positioned in the heat exchange section of endothermic reactant layer. An exothermic reaction catalyst (e.g., a combustion or partial oxidation catalyst) is positioned in the reaction section of the exothermic reactant layer. Alternatively, the exothermic reaction catalyst could be eliminated, and the ignition catalyst could be positioned in the heat exchange reaction section. A clean-up catalyst is positioned in the exhaust layer.

The repeat unit shown in FIG. 7G includes an endothermic process layer which comprises a process reactant layer, a process product layer positioned adjacent to the process reactant layer, and a process u-turn positioned at an end of the process reactant layer and at an end of the process product layer to allow for the flow of fluid from the process reactant layer to the process product layer. The process reactant layer includes a manifold or flow distribution section, process heat exchange section and process reaction section. The process reaction section is downstream (relative to the direction of flow of the endothermic reactants in the process reactant layer) of the process heat exchange section. An endothermic reaction catalyst (e.g., SMR catalyst) is positioned in the manifold, heat exchange and reaction sections of the endothermic reactant layer. The heat exchange layer comprises an exothermic reactant layer, oxygen source layer, exhaust layer, and a heat exchange u-turn positioned at an end of the exothermic reactant layer and at an end of the exhaust layer to allow for the flow of fluid from the exothermic reactant layer to the exhaust layer. The exothermic reactant layer has a manifold or flow distribution section, a heat exchange section and reaction section. The reaction section of the exothermic reactant layer is downstream of the heat exchange section of the exothermic reactant layer. A hydrogenolysis catalyst is positioned in the manifold and heat exchange sections of the exothermic reactant layer. An ignition catalyst is positioned in the heat exchange section of the exothermic reactant layer. A cleanup catalyst is positioned in the exhaust layer.

The repeat unit shown in FIG. 7H is the same as the repeat unit shown in FIG. 7G except that the repeat unit shown in FIG. 7H has a clean-up catalyst positioned in the reaction section of the exothermic reactant layer downstream of the ignition catalyst.

The repeat unit shown in FIG. 7I is the same as the repeat unit shown in FIG. 7G except that the repeat unit shown in FIG. 7I does not have heat exchange section, but instead has a manifold section and a reaction section, the reaction section extending from the manifold section. The hydrogenolysis catalyst is positioned in the manifold section of the exothermic reactant layer. A clean-up catalyst is positioned in the reaction section of the exothermic reactant layer downstream of the ignition catalyst which is also positioned in the reaction section of the exothermic reactant layer. Also, a clean-up catalyst is positioned in the exhaust layer.

The repeat unit shown in FIG. 7J is the same as the repeat unit shown in FIG. 7I except that the repeat unit shown in FIG. 7J does not have a clean-up catalyst in the reaction section of the exothermic reactant layer.

Figure 8:
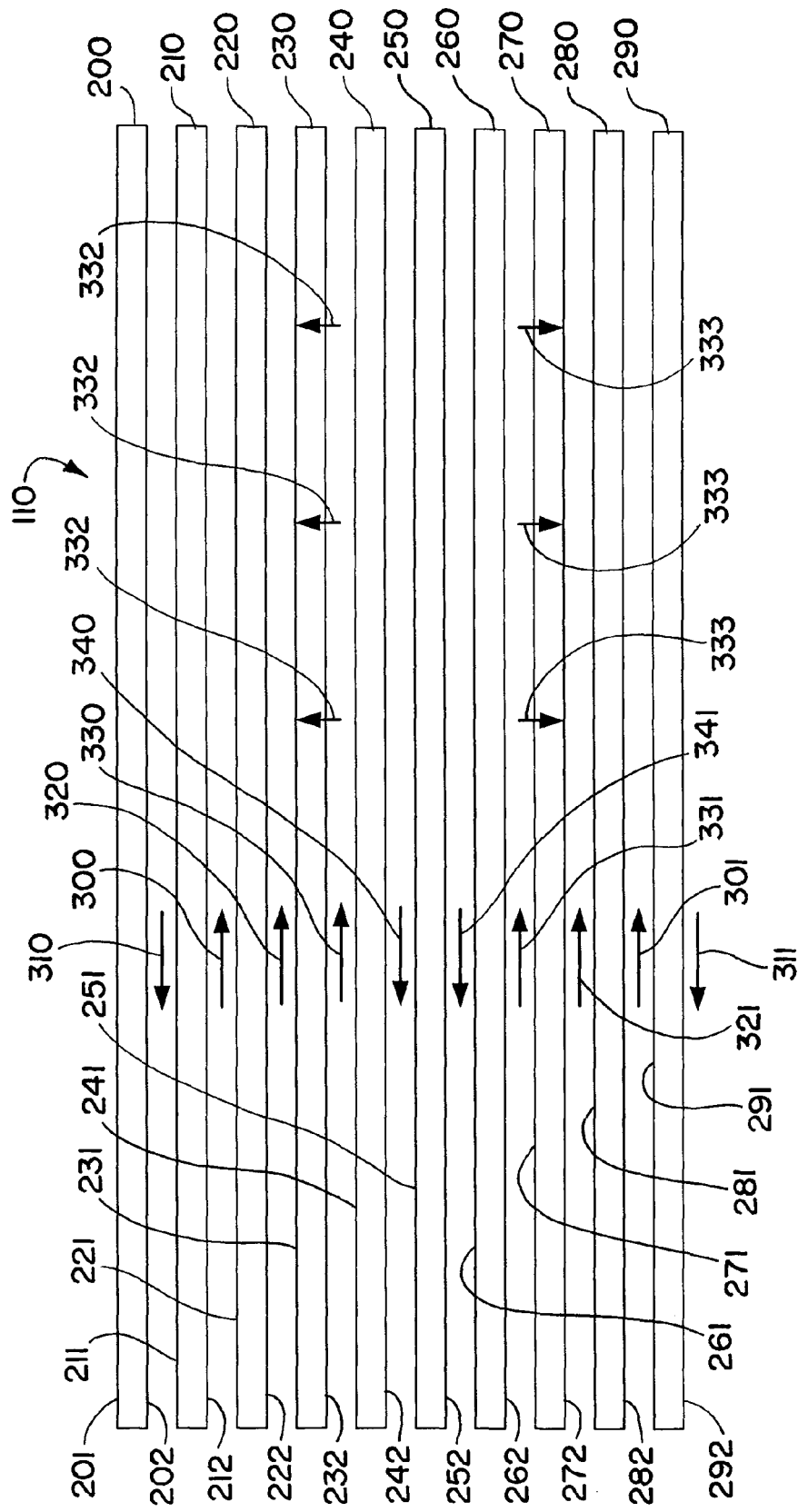
FIG. 8 is a schematic illustration of a repeat unit comprising a stack of plates used in the microchannel reactor.

The stack 100 may be comprised of one or more of the repeat units 110 shown in FIG. 8 to construct the stack. As shown in FIG. 8. The repeat unit 110 contains two heat exchange layers positioned adjacent to each other, and a SMR process layer positioned on each side of the heat exchange layers. The repeat unit 110 contains 10 plates which are shown in FIG. 8 as being separated from each other for purposes of illustration, but in actual use the plates would be in contact with each other. The peripheral edge of each plate may be welded to the peripheral edge of the next adjacent plate to provide a peripheral seal for the stack. The repeat unit 110 contains plates 200, 210, 220, 230, 240, 250, 260, 270, 280 and 290. Each side of each plate may contain microchannels, internal manifolds, capillary features and/or surface features formed on its surface; and each plate may contain oxygen source or air openings or jets, and/or u-turn or openings or slots projecting through the plate to provide for the functioning of two SMR process layers and two combustion layers. Each of the plates may be fabricated using known techniques including wire electrodischarge machining, conventional machining, laser cutting, photochemical machining, electrochemical machining, stamping, etching (for example, chemical, photochemical or plasma etching) and combinations thereof.

In the following discussion relative to the alignment of the plates 200, 210, 220, 230, 240, 250, 260, 270, 280 and 290, reference is made to the top surface and bottom surface of each plate as depicted in FIG. 8, although as indicated above, when positioned in the stack 100, the plates 200, 210, 220, 230, 240, 250, 260, 270, 280 and 290 may be vertically aligned, not horizontally aligned as shown in FIG. 8.

Referring to FIG. 8, plate 200 has a top surface 201 and a bottom surface 202. Plate 210 has a top surface 211 and a bottom surface 212. Plate 220 has a top surface 221 and a bottom surface 222. Plate 230 has a top surface 231 and a bottom surface 232. Plate 240 has a top surface 241 and a bottom surface 242. Plate 250 has a top surface 251 and a bottom surface 252. Plate 260 has a top surface 261 and a bottom surface 262. Plate 270 has a top surface 271 and a bottom surface 272. Plate 280 has a top surface 281 and a bottom surface 282. Plate 290 has a top surface 291 and a bottom surface 292. In operation, product from the reaction conducted in the process layer flows from right to left (as illustrated in FIG. 8) as shown by arrows 310 and 311. The endothermic reactants used in the reaction conducted in the process layer flow from left to right as shown by arrows 300 and 301. Exothermic reactant (or fuel) flows from left to right in the direction indicated by arrows 320 and 321. Oxygen source (or air) flows from left to right in the direction indicated by arrows 330 and 331. In each case, the wall separating the oxygen source layer and exothermic reactant layer contains openings or jets 332 or 333 to allow the oxygen source to flow from the oxygen source layer into the endothermic reaction layer, combine with the exothermic reactant to form an exothermic reactant/oxygen source mixture (or a fuel-air mixture), and then undergo combustion. Exhaust from the combustion reaction flows from right to left as indicated by arrows 340 and 341. Endothermic reaction catalysts and exothermic reaction catalyst layers may be provided in the process and heat exchange layers as shown in FIGS. 7A-7F.

The plates 200, 210, 220, 230, 240, 250, 260, 270, 280 and 290 may have a common length and width in order to provide the repeat unit 110 with even or planar sides as well as even or planar tops and bottoms. The lengths of each plate may be, for example, in the range from about 30 to about 250 centimeters, or from about 45 to about 150 centimeters, or about 29 inches (73.66 cm). The width of each of the plates may be in the range from about 15 to about 90 cm, or from about 20 to about 40 cm, or about 10.74 inches (27.28 cm). The height or thickness of each plate can be the same or different, but for facilitated manufacturing purposes, it is advantageous for each of the plates to have the same height or thickness. The height or thickness of each of the plates may range from about 0.8 to about 25 mm, or from about 1.5 to about 10 mm, or about 0.125 inch (3.175 mm). The overall height of the repeat unit 110 may be from about 0.1 to about 5 inches (about 0.254 to about 12.7 cm), or from about 0.5 to about 3 inches (about 1.27 to about 7.62 cm), or from about 0.75 to about 2.5 inches (about 1.91 to about 6.35 cm), or from about 1 to about 1.5 inches (about 2.54 to about 3.81 cm), or about 1.25 inches (3.175 cm). The overall height of the stack 100 may be from about 1 to about 50 inches (about 2.54 to about 127 cm), or from about 3 to about 24 inches (about 7.62 to about 60.96 cm), or from about 7 to about 15 inches (about 17.78 to about 38.1 cm), or about 10.125 inches (25.72 cm). With one exception, each of the plates 200, 210, 220, 230, 240, 250, 260, 270, 280 and 290 has microchannels, internal manifolds, capillary features, and/or surface features formed on the plate surfaces, and/or openings or jets, or u-turn openings or slots projecting through the plates to provide for the flow of reactants, product, fuel, air and exhaust. The one exception is the top 201 of plate 200 which is blank due to the fact that plate 200 may be used as an end plate for the stack 100.

In the discussion that follows, the use terms "air," "air layer," "air channel," and the like, may be used to refer to air as a component in the combustion reaction or partial oxidation conducted in the heat exchange layer. However, as indicated above, the combustion or partial oxidation reaction may employ, as an alternative to or in addition to air, oxygen sources such as pure oxygen, oxygen enriched air or gaseous mixture comprising oxygen and an inert gas. Thus, when an air layer, air channel, and the like, are referenced in terms of the structure of the microchannel reactor, it is to be understood that any of the foregoing alternative terms may be substituted for the air. Also, the term "fuel" may be used in the discussion below to refer to the exothermic reactant used in the heat exchange layer. Thus, when a fuel layer, fuel channel, etc. are referenced in terms of the structure of the microchannel reactor, it is to be understood that the fuel layer, fuel channel, etc., could be referred to as an exothermic reactant layer, exothermic reactant channel, etc.

The depth of each microchannel may be in the range of about 0.05 to about 10 mm, or from about 0.05 to about 5 mm, or from about 0.05 to about 2 mm, or from about 0.1 to about 2 mm, or from about 0.5 to about 2 mm, or from about 0.5 to about 1.5 mm, or from about 0.08 to about 1.2 mm. The width of each microchannel may be up to about 10 cm, or from about 0.1 to about 10 cm, or from about 0.5 to about 10 cm, or from about 0.5 to about 5 cm.

The internal manifolds may be used to provide for a uniform distribution of mass flow into or out of the microchannels. Each internal manifold may be used to provide for the flow of fluid into or out of from about 2 to about 1000 microchannels, or from 2 to about 100 microchannels, or from about 2 to about 50 microchannels, or from about 2 to about 10, or from 2 to about 6, or about 4 microchannels. The depth of each manifold may correspond to the depth of the microchannels connected to the manifold. The width of each manifold may correspond to the combined widths of the microchannels connected to manifold, or from about 1 to about 99 percent, or from about 1 to about 90 percent, of the combined widths to provide for desired flow resistance into or out of the microchannels. The uniformity of the mass flow distribution between the microchannels may be defined by the Quality Index Factor (Q-factor) indicated below. A Q-factor of 0% means absolute uniform distribution.

$$Q = \frac{\dot{m}_{max} - \dot{m}_{min}}{\dot{m}_{max}} \times 100$$

In the above formula "m" refers to mass flow. A change in the cross-sectional area may result in a difference in shear stress on the wall. In one embodiment, the Q-factor for the inventive microchannel processor may be less than about 50%, or less than about 20%, or less than about 5%, or less than about 1%. The surface features and/or capillary features may comprise depressions in and/or projections from one or more of the plate surfaces. The surface features may be in the form of circles, spheres, hemispheres, frustrums, oblongs, squares, rectangles, angled rectangles, checks, chevrons, vanes, air foils, wavy shapes, and the like. Combinations of two or more of the foregoing may be used. The surface features may contain subfeatures where the major walls of the surface features further contain smaller surface features that may take the form of notches, waves, indents, holes, burrs, checks, scallops, and the like. The surface features may be referred to as passive surface features or passive mixing features. The surface features may be used to disrupt flow (for example, disrupt laminar flow streamlines) and create advective flow at an angle to the bulk flow direction. The depth or height of each surface feature may be in the range of about 0.05 to about 5 mm, or from about 0.1 to about 5 mm, or from about 0.1 to about 3 mm, or from about 0.1 to about 2 mm, or from about 0.4 to about 2 mm, or from about 0.5 to about 1.5 mm, or from about 0.08 to about 1.2 mm.

In the heat exchange layers, the plates separating the oxygen source layers from the exothermic reactant layers may include openings or jets 332 or 333 to allow for the flow of the oxygen source from the oxygen source layers into the exothermic reactant layers. These openings or jets may have average diameters in the range from about 0.1 to about 10 mm, or from about 0.1 to about 5 mm, or from about 0.1 to about 2.5 mm, or from about 0.25 to about 1.25 mm, or from about 0.25 to about 0.75 mm, or about 0.015 inch (0.381 mm). Multiple openings or jets, for example, from about 2 to about 10, or from about 2 to about 5, or from 2 to about 4, or about 3, openings or jets may be provided in parallel at each location to control flow distribution and prevent diffusion of flame into the oxygen source channels. Alternatively, the jets may be offset axially or laterally along the length of the reaction channel. The number of openings or jets that may be used may be in the range from about 0.1 to about 12 openings or jets per cm$^2$, or from about 0.1 to about 5 openings or jets per cm$^2$.

A number of the plates include u-turn openings or slots to allow for the flow of fluid from one plate surface to another, or from one layer to another layer (e.g., from an endothermic reactant layer to an endothermic product layer). The gap or width of each u-turn opening or slot may be in the range from about 0.25 to about 5 mm, or from about 0.5 to about 2.5 mm, or about 0.04 inch (1.02 mm).

Each plate has a peripheral edge on each of its sides, and a border adjacent each peripheral edge. Each border may have a thickness in the range from about 1 to about 100 mm, or from about 1 to about 75 mm, or from about 5 to about 50 mm, or from about 10 to about 30 mm. The borders may have openings to allow for the flow of fluid into and out of the process layers and heat exchange layers.

The plates 200, 210, 220, 230, 240, 250, 260, 270, 280 and 290 may be constructed of any metal or metal alloy having the required properties for structural integrity to operate at the temperatures and pressures intended for the desired end use. The metals and metal alloys may include: steel (e.g., stainless steel, carbon steel, and the like); aluminum; titanium; nickel; platinum; rhodium; copper; chromium; alloys containing any of the foregoing metals; monel; inconel; brass; or a combination of two or more thereof. Inconel 617 (a metal alloy containing Ni, Cr, Co, Mo and Al) may be used.

Figure 9:
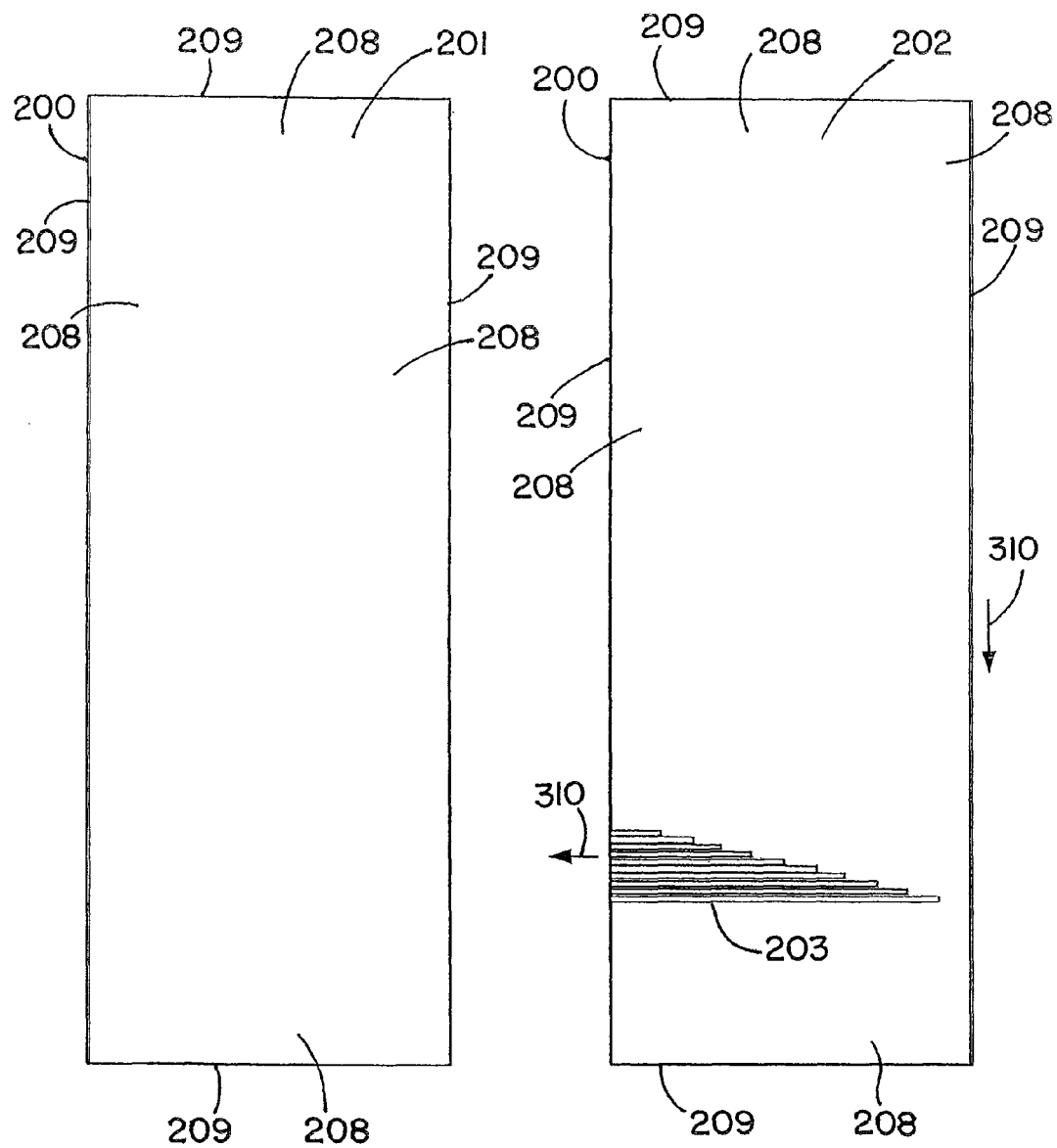
FIGS. 9-18 are schematic illustrations showing the top and bottom surfaces of each of the plates illustrated in FIG. 8.

The top and bottom of each of plates 200, 210, 220, 230, 240, 250, 260, 270, 280 and 290 are illustrated in FIGS. 9-18, respectively. Referring to FIG. 9, plate 200 has top surface 201 which is blank due to the fact that this surface may be used as the exterior surface of an end plate for the stack 100. The bottom surface 202 includes internal manifold 203 which may be used to provide for the flow of product from the endothermic reaction out of the stack 100 as indicated by arrows 310. Each side of the plate 200, that is plate surfaces 201 and 202, has a border 208. The plate 200 includes a peripheral edge 209 on each of the four sides of the plate. In the formation of the stack 100, or of the repeat unit 110, each of the peripheral edges 209 has a welding material applied to it. When the welding material is applied, it will typically penetrate beyond the peripheral edge 209 in contact with a portion of the border 208 on at least the surface 202 of plate 200. A portion of the border may be open to allow for the flow of fluid through the border during operation of the microchannel reactor. The microchannel reactor may be refurbished after being used for a desired time, and during refurbishment, the welding material may be removed, for example, by milling, grinding and/or cutting, from the peripheral edges 209 and as a result part of the border 208 may also be removed.

Figure 10:
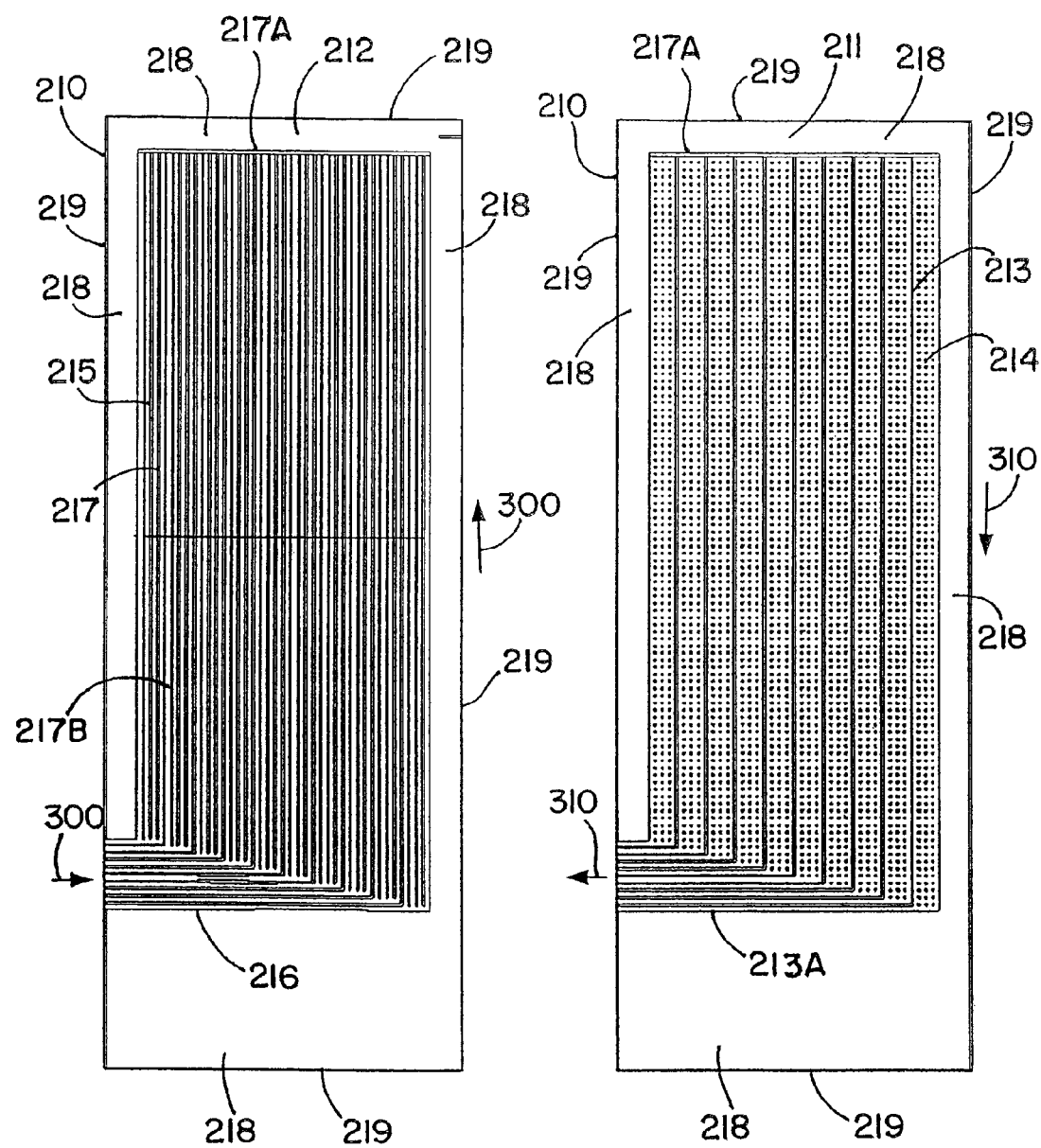

Plate 210 is illustrated in FIG. 10. The top surface 211 includes microchannels 213 and internal manifold 213A which may be used to provide for the flow of product from the endothermic reaction in the direction indicated by arrow 310. The microchannels 213 include surface features 214 which may be used to disrupt the flow of product flowing through the process microchannels 213. The bottom surface 212 includes microchannels 215 and internal manifold 216 which may be used to provide for the flow of the endothermic reactants in the direction indicated by arrows 300. The microchannels 215 include reaction section 217 wherein a catalyst for the endothermic reaction is coated on the microchannels, and a heat exchange section 2178. The reactants flow through the heat exchange section 2178, and then reaction section 217, contact the catalyst and react to form product. The plate 210 includes u-turn opening 217A to provide for the flow of product from the process microchannels 215 to the process microchannels 213. Each side of the plate 210, that is plate surfaces 211 and 212, has a border 218. The plate 210 includes a peripheral edge 219 on each of the four sides of the plate. In the formation of the stack 100, or of the repeat unit 110, each of the peripheral edges 219 has a welding material applied to it. When the welding material is applied, it will typically penetrate beyond the peripheral edge 219 in contact with a portion of the border 218 on each side of the plate 210. During refurbishing, the microchannel reactor, the welding material may be removed, for example, by milling, grinding and/or cutting, from the peripheral edges 219 and as a result part of the border 218 may also be removed.

Figure 11:
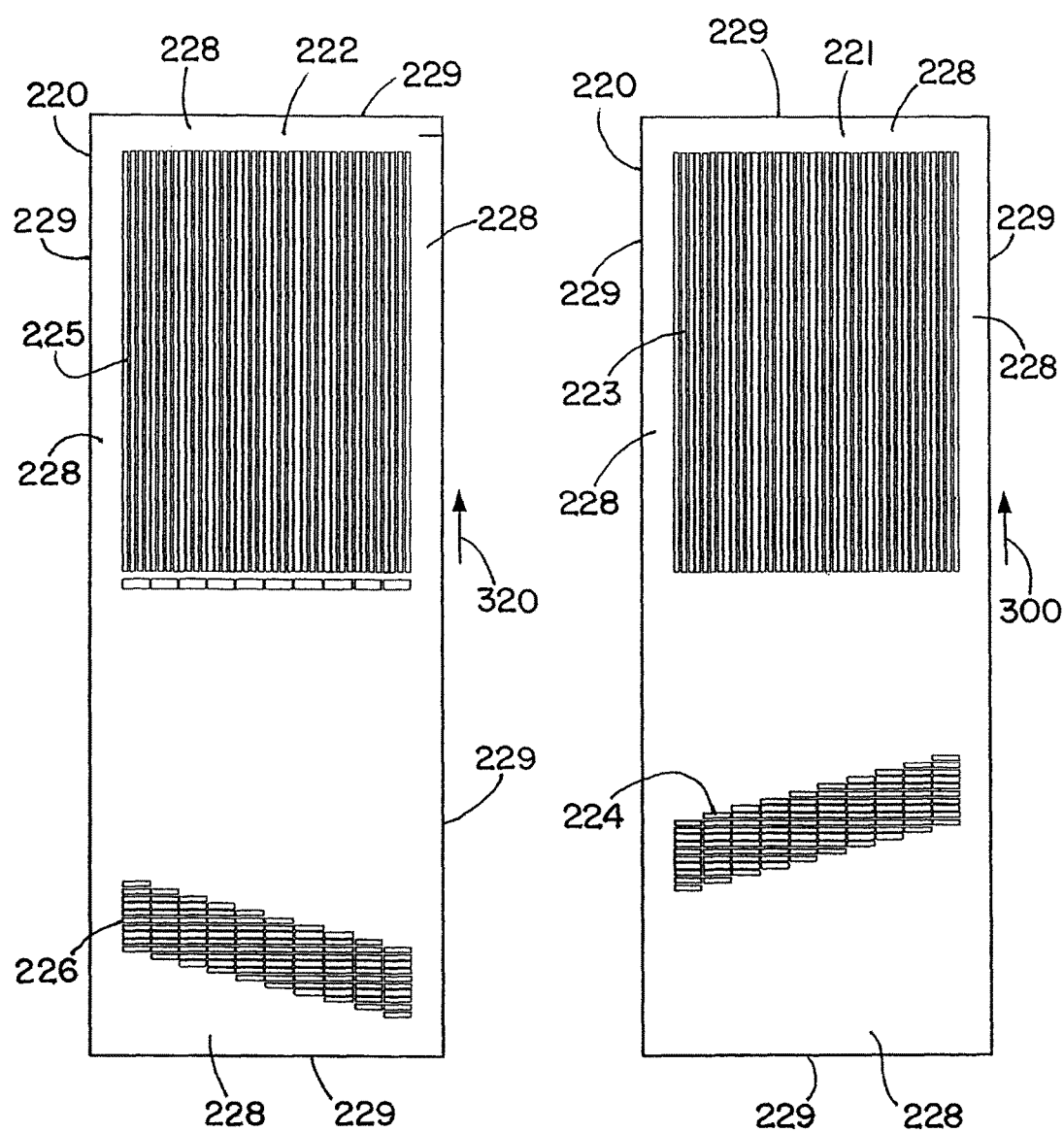

Plate 220 is illustrated in FIG. 11. The top surface 221 includes process microchannels 223, which are coated with an endothermic reaction catalyst, and surface features 224 for redistributing flow of the endothermic reactants and/or retaining coated catalyst in the channels. The bottom surface 222 includes microchannels 225, which are coated with an exothermic reaction catalyst, and surface features or capillary surface features 226 for redistributing flow of the exothermic reactant and/or retaining coated catalyst in the channels. Each side of the plate 220, that is plate surfaces 221 and 222, has a border 228. The plate 220 includes a peripheral edge 229 on each of the four sides of the plate. In the formation of the stack 100, or of the repeat unit 110, each of the peripheral edges 229 has a welding material applied to it. When the welding material is applied, it will typically penetrate beyond the peripheral edge 229 in contact with a portion of the border 228 on each side of the plate 220. During refurbishing, the welding material may be removed, for example, by milling, grinding and/or cutting, from the peripheral edges 229 and as a result part of the border 228 may also be removed.

Figure 12:
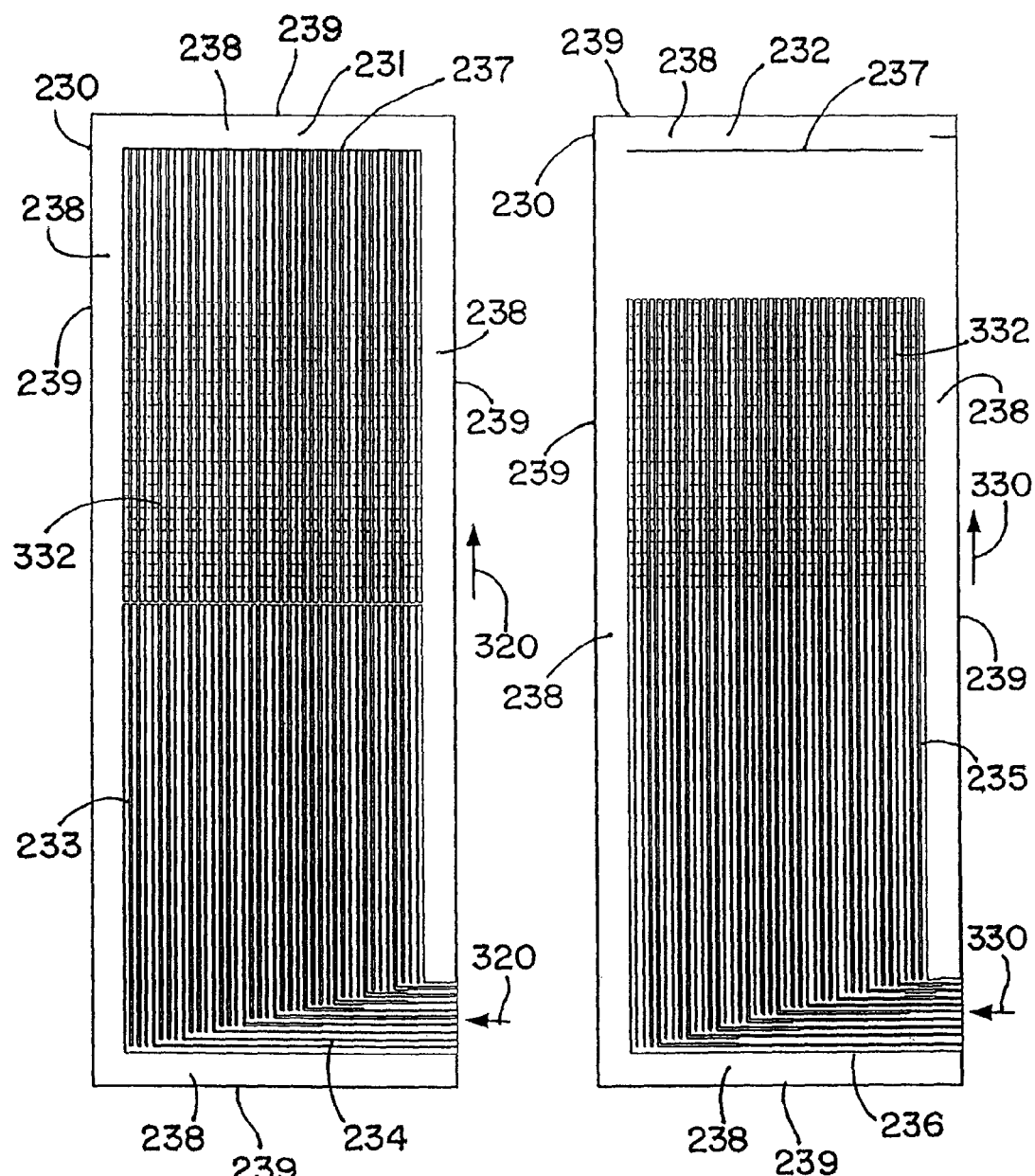

Plate 230 is illustrated in FIG. 12. The top surface 231 includes microchannels 233 and internal manifold 234 which are used to provide for the flow of exothermic reactant in the direction indicated by arrows 320. The bottom surface 232 includes microchannels 235 and internal manifold 236 which are used to provide for the flow of air in the direction indicated by arrows 330. The plate includes openings or jets 332 to provide for the flow of the oxygen source from the microchannels 235 through the plate into the microchannels 233 where it may combine with the exothermic reactant to form a exothermic reactant/oxygen source mixture. The plate 230 includes opening or slot 237 to provide a u-turn for the flow of exhaust from the microchannels 233. Each side of the plate 230, that is plate surfaces 231 and 232, has a border 238. The plate 230 includes a peripheral edge 239 on each of the four sides of the plate. In the formation of the stack 100, or of the repeat unit 110, each of the peripheral edges 239 has a welding material applied to it. When the welding material is applied, it will typically penetrate beyond the peripheral edge 239 in contact with a portion of the border 238 on each side of the plate 210. During refurbishing of the microchannel reactor, the welding material may be removed, for example, by milling, grinding and/or cutting, from the peripheral edges 239 and as a result part of the border 238 may also be removed.

Figure 13:
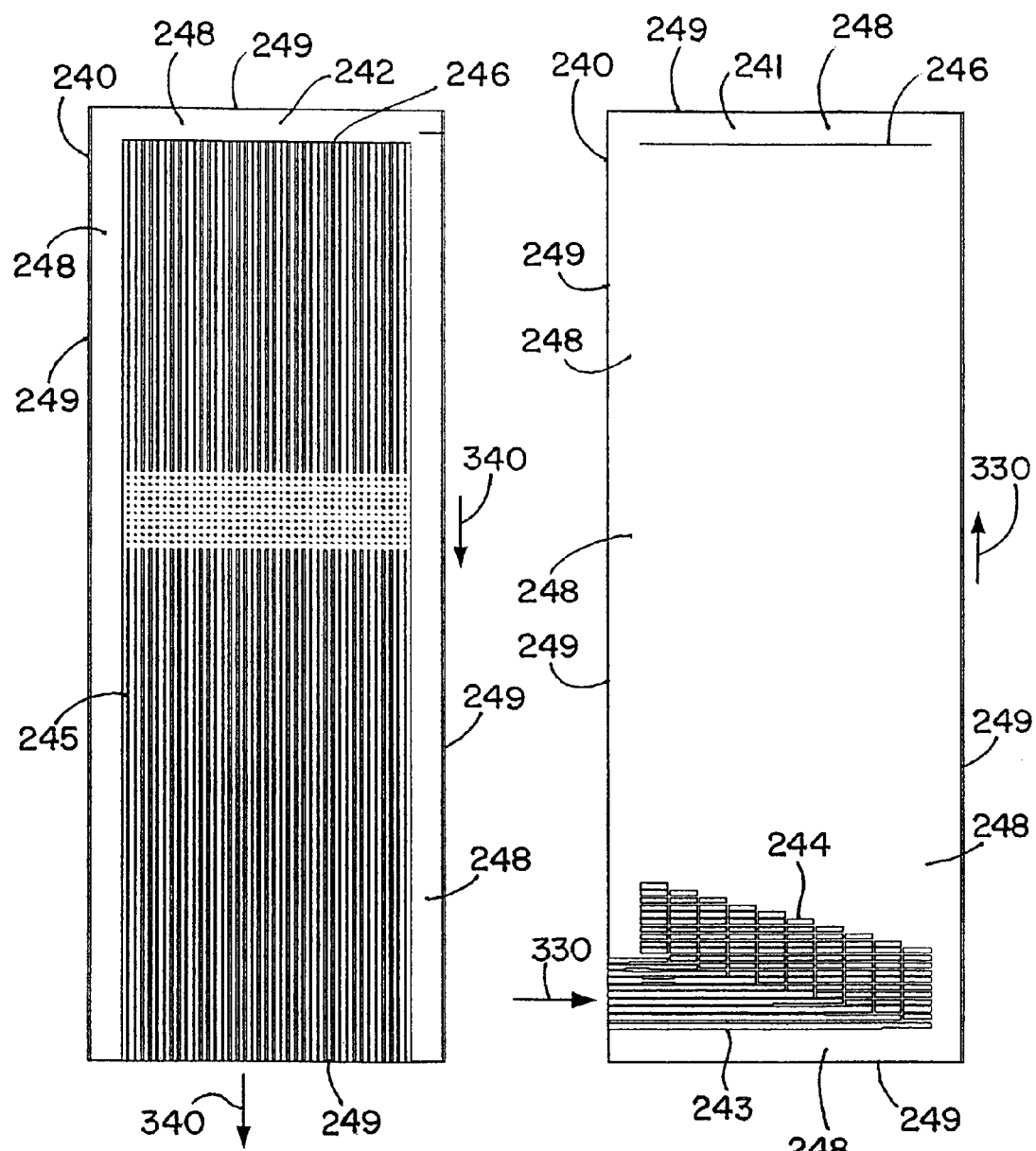

Plate 240 is illustrated in FIG. 13. The top surface 241 includes internal manifold 243 which is used to provide for the flow of the oxygen source in the direction indicated by arrow 330. The top surface 241 may also include surface features 244 to provide for redistribution of the flow of the oxygen source. The bottom surface 242 includes microchannels 245 which are used to provide for the flow of exhaust in the direction indicated by arrows 340. The plate 240 includes opening or slot 246 to provide a u-turn for the flow of exhaust from the microchannels 233 of plate 230 to microchannels 253 of plate 250. Each side of the plate 240, that is plate surfaces 241 and 242, has a border 248. The plate 240 includes a peripheral edge 249 on each of the four sides of the plate. In the formation of the stack 100, or of the repeat unit 110, each of the peripheral edges 249 has a welding material applied to it. When the welding material is applied, it will typically penetrate beyond the peripheral edge 249 in contact with a portion of the border 248 on each side of the plate 240. During refurbishing of the microchannel reactor, the welding material may be removed, for example, by milling, grinding and/or cutting, from the peripheral edges 249 and as a result part of the border 248 may also be removed.

Figure 14:
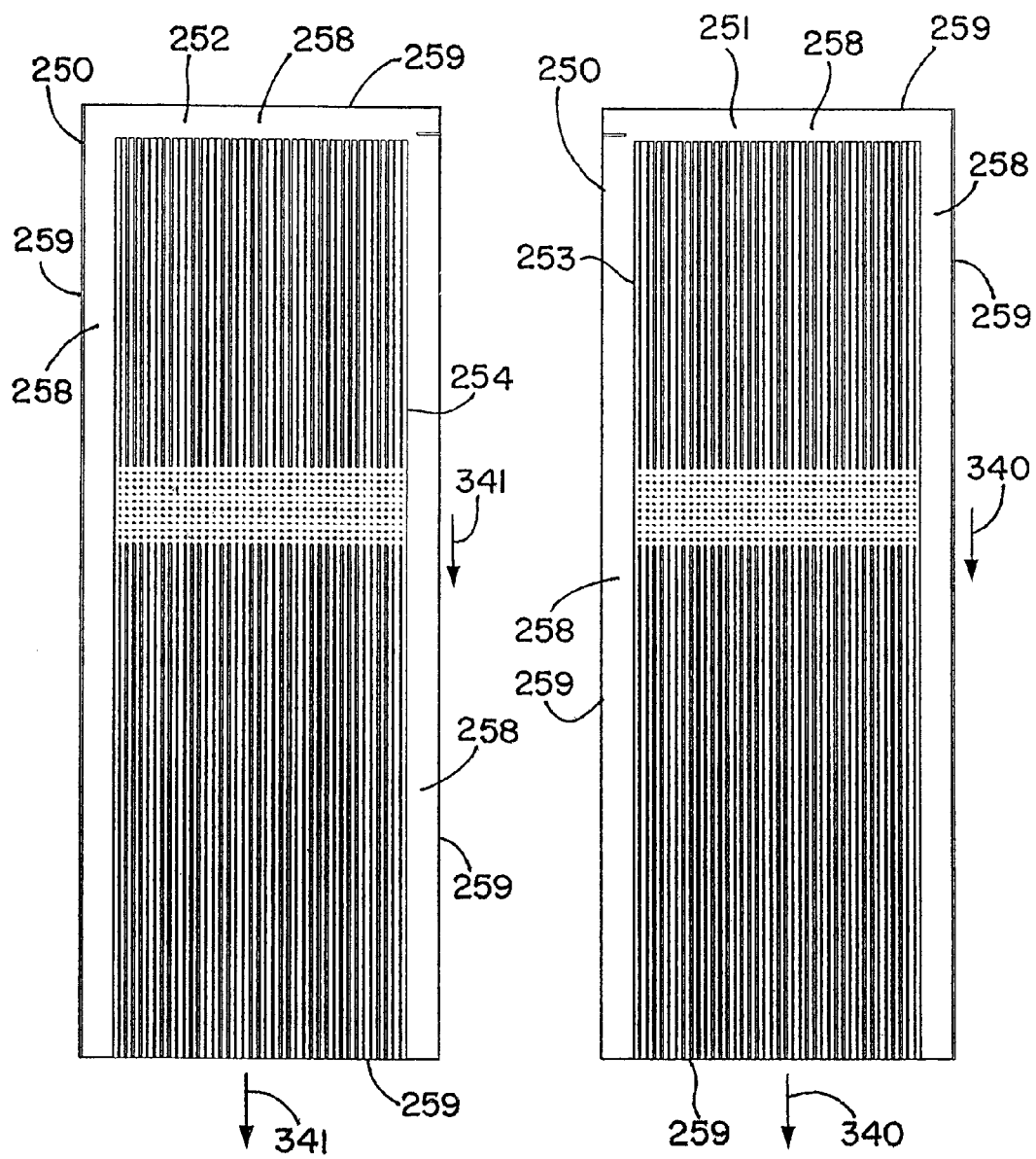

Plate 250 is illustrated in FIG. 14. The top surface 251 includes microchannels 253 which are used to provide for the flow of exhaust in the direction indicated by arrow 340. The bottom surface 252 includes microchannels 254 which are used to provide for the flow of exhaust in the direction indicated by arrows 341. Each side of the plate 250, that is plate surfaces 251 and 252, has a border 258. The plate 250 includes a peripheral edge 259 on each of the four sides of the plate. In the formation of the stack 100, or of the repeat unit 110, each of the peripheral edges 259 has a welding material applied to it. When the welding material is applied, it will typically penetrate beyond the peripheral edge 259 in contact with a portion of the border 258 on each side of the plate 250. During refurbishing of the microchannel reactor, the welding material may be removed, for example, by milling, grinding and/or cutting, from the peripheral edges 259 and as a result part of the border 258 may also be removed.

Figure 15:
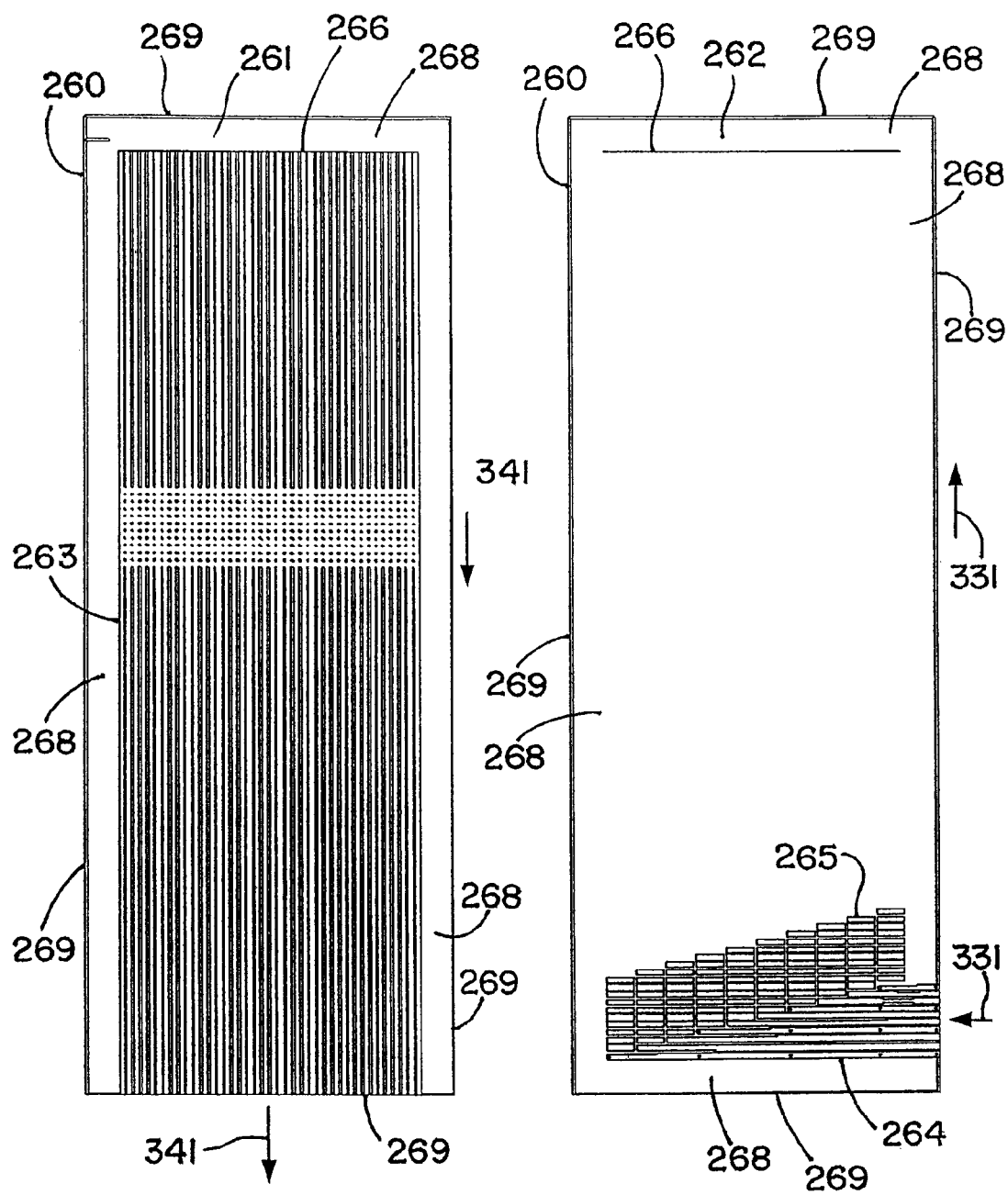

Plate 260 is illustrated in FIG. 15. The top surface 261 includes microchannels 263 which are used to provide for the flow of exhaust in the direction indicated by arrows 341. The bottom surface 262 includes internal manifold 264 which is used to provide for the flow of the oxygen source in the direction indicated by arrow 331. The bottom surface 262 also includes surface features 265 to provide for redistribution of the flow of the oxygen source. The plate 260 includes opening or slot 266 to provide a u-turn for the flow of exhaust from the microchannels 283 of plate 280 to microchannels 254 of plate 250. Each side of the plate 260, that is plate surfaces 261 and 262, has a border 268. The plate 260 includes a peripheral edge 269 on each of the four sides of the plate. In the formation of the stack 100, or of the repeat unit 110, each of the peripheral edges 269 has a welding material applied to it. When the welding material is applied, it will typically penetrate beyond the peripheral edge 269 in contact with a portion of the border 268 on each side of the plate 260. During refurbishing of the microchannel reactor, the welding material may be removed, for example, by milling, grinding and/or cutting, from the peripheral edges 269 and as a result part of the border 268 may also be removed.

Figure 16:
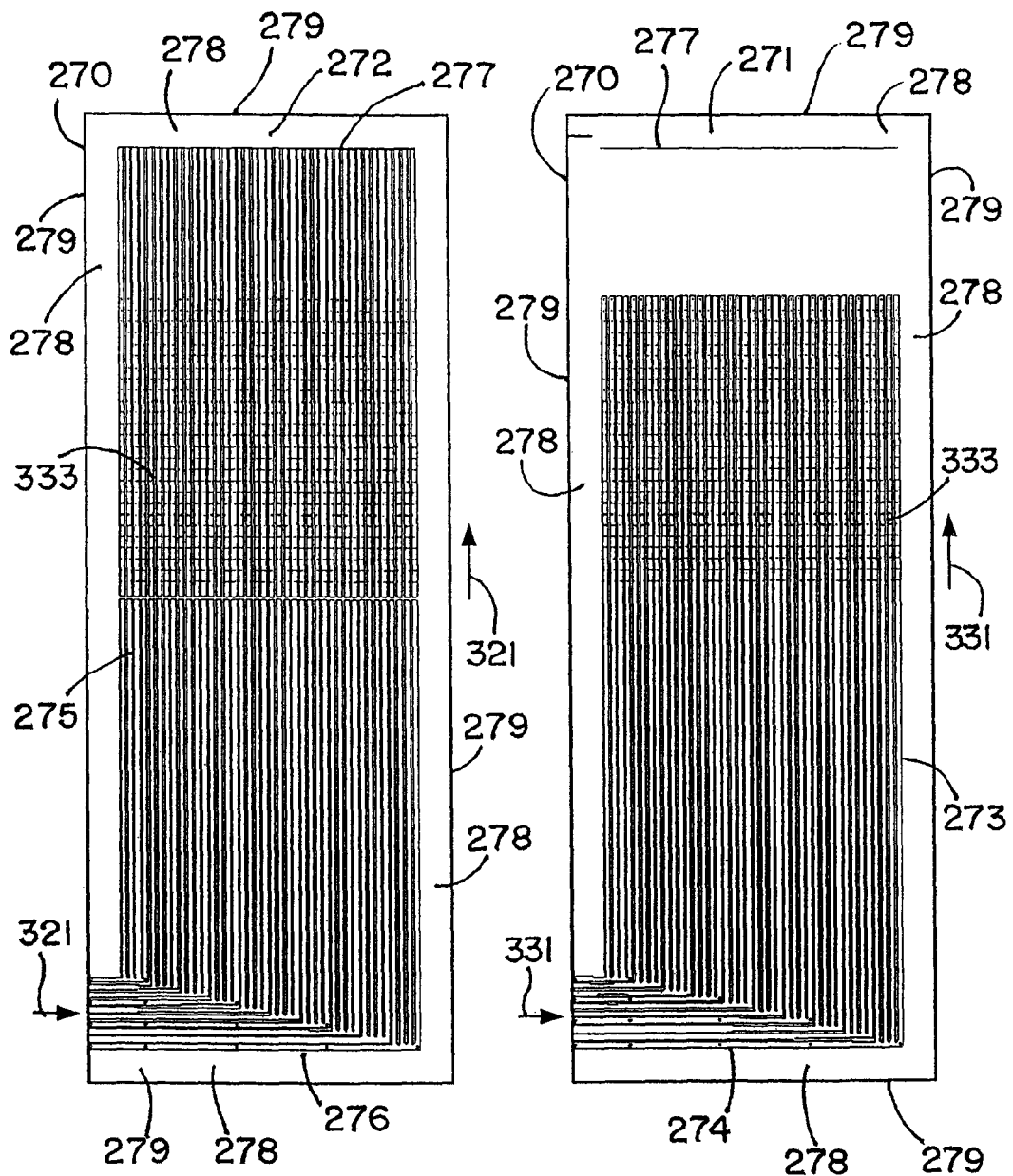

Plate 270 is illustrated in FIG. 16. The top surface 271 includes microchannels 273 and internal manifold 274 which are used to provide for the flow of the oxygen source in the direction indicated by arrows 331. The bottom surface 272 includes microchannels 275 and internal manifold 276 which are used to provide for the flow of the exothermic reactant in the direction indicated by arrows 321. The plate includes openings or jets 333 to provide for the flow of the oxygen source from the microchannels 273 through the plate 270 into the microchannels 275 where the oxygen source may combine with the exothermic reactant to form an exothermic reactant/oxygen source mixture. The plate 270 includes opening or slot 277 to provide a u-turn for the flow of exhaust from the microchannels 275. Each side of the plate 270, that is plate surfaces 271 and 272, has a border 278. The plate 270 includes a peripheral edge 279 on each of the four sides of the plate. In the formation of the stack 100, or of the repeat unit 110, each of the peripheral edges 279 has a welding material applied to it. When the welding material is applied, it will typically penetrate beyond the peripheral edge 279 in contact with a portion of the border 278 on each side of the plate 270. During refurbishing of the microchannel reactor, the welding material may be removed, for example, by milling, grinding and/or cutting, from the peripheral edges 279 and as a result part of the border 278 may also be removed.

Figure 17:
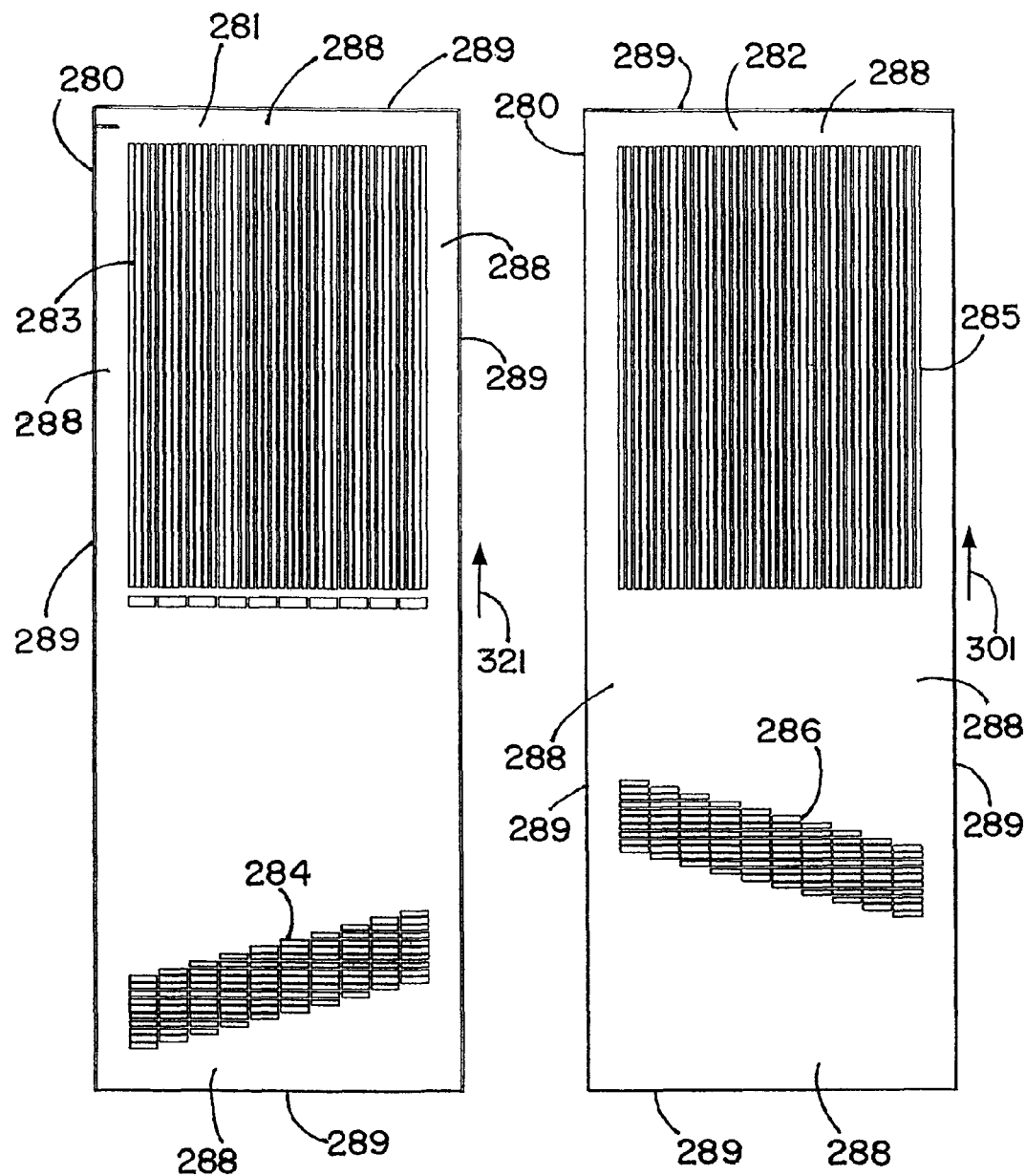

Plate 280 is illustrated in FIG. 17. The top surface 281 includes process microchannels 283, which are coated with the exothermic reaction catalyst, and surface features 284 for redistributing flow of the exothermic reactant. The bottom surface 282 includes microchannels 285, which are coated with an endothermic reaction catalyst, and surface features 286 for redistributing flow of the endothermic reactants. Each side of the plate 280, that is plate surfaces 281 and 282, has a border 288. The plate 280 includes a peripheral edge 289 on each of the four sides of the plate. In the formation of the stack 100, or of the repeat unit 110, each of the peripheral edges 289 has a welding material applied to it. When the welding material is applied, it will typically penetrate beyond the peripheral edge 289 in contact with a portion of the border 288 on each side of the plate 280. During refurbishing of the microchannel reactor, the welding material may be removed, for example, by milling, grinding and/or cutting from the peripheral edges 289 and as a result part of the border 288 may also be removed.

Figure 18:
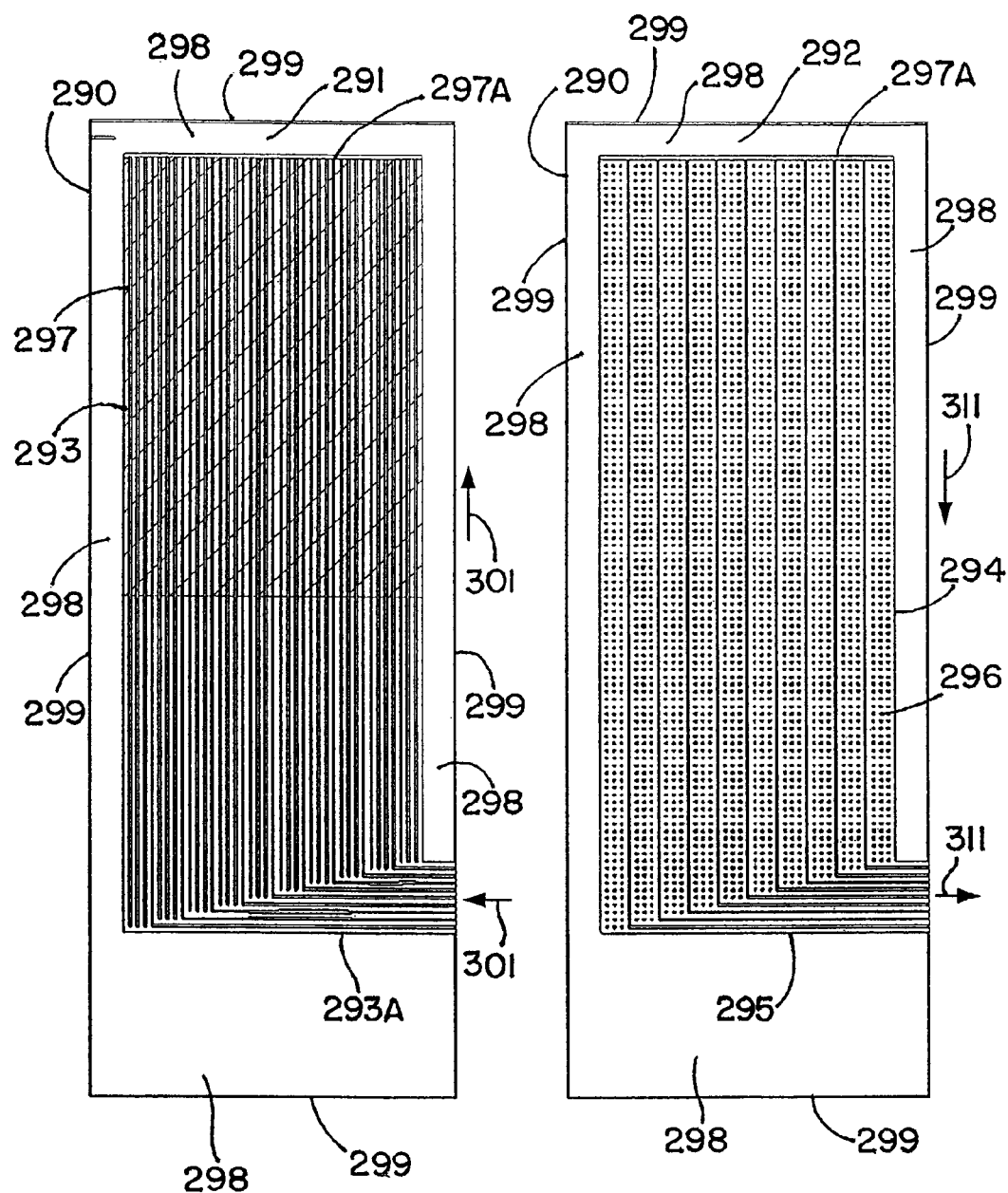

Plate 290 is illustrated in FIG. 18. The top surface 291 includes microchannels 293 and internal manifold 293A which may be used to provide for the flow of the endothermic reactants in the direction indicated by arrows 301. The bottom surface 292 includes microchannels 294 and internal manifold 295 which may be used to provide for the flow of the endothermic product in the direction indicated by arrows 311. The microchannels 294 include surface features 296 which may be used to disrupt the flow of product flowing through the process microchannels 294. The microchannels 293 include reaction section 297 wherein a catalyst for the endothermic reaction is coated on the microchannels. The endothermic reactants flow through the reaction section 297, contact the catalyst and react to form the endothermic reaction product. The plate 290 includes u-turn opening 297A to provide for the flow of product from the process microchannels 297 to the process microchannels 294. Each side of the plate 290, that is plate surfaces 291 and 292, has a border 298. The plate 290 includes a peripheral edge 299 on each of the four sides of the plate. In the formation of the stack 100, or of the repeat unit 110, each of the peripheral edges 299 has a welding material applied to it. When the welding material is applied, it will typically penetrate beyond the peripheral edge 299 in contact with a portion of the border 298 on each side of the plate 290. During refurbishing of the microchannel reactor, the welding material may be removed, for example, by milling, grinding and/or cutting, from the peripheral edges 299 and as a result part of the border 298 may also be removed.

Figure 20:
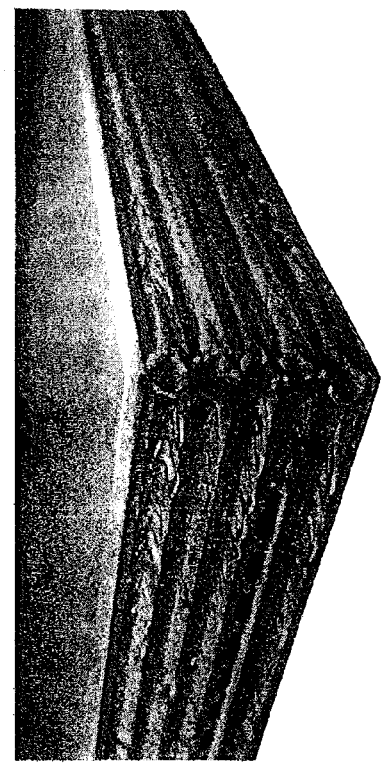
FIGS. 19 and 20 are photographs of a stack of plates forming the core of a microchannel reactor with the peripheral edge of each plate welded to the peripheral edge of the next adjacent plate to provide a perimeter seal for the stack.
Figure 19:
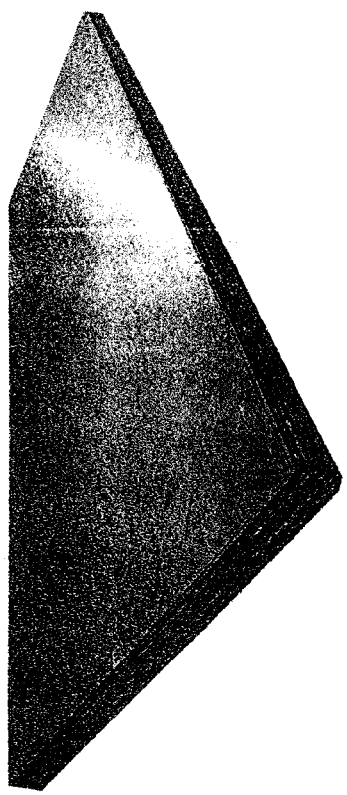

The assembled stack 100 with a perimeter seal on each side formed by welding the peripheral edges of the stack is shown in FIGS. 19 and 20. FIG. 20 shows openings in two of the side wall perimeter seals to allow fluid to flow into and out of the stack.

The catalyst layers may be directly washcoated on the interior walls of the microchannels, or grown on the walls from solution. The catalyst layers may be selectively sprayed on the walls of the microchannels with the use of a mask to keep the coating in only desired locations, e.g., within the flow channels and substantially out of the interfacial area between plates that are not a target flow path. An advantage of the invention is that the catalyst layers may be applied to the plates before the plates are stacked. Six different alternatives for the positioning of the catalysts are shown in FIGS. 7A-7F. The cross-sectional area of each catalyst may occupy from about 1 to about 99%, or from about 10 to about 95% of the cross-sectional area of the microchannels. The catalyst layers may have a surface area, as measured by BET, greater than about 0.5 $m^2/g$, or greater than about 2 $m^2/g$. The catalyst may have any surface area and is particularly advantageous in the range of about 10 $m^2/g$ to 1000 $m^2/g$, or from about 20 $m^2/g$ to about 200 $m^2/g$.

The catalyst layers may comprise an interfacial layer and a catalyst material deposited on or mixed with the interfacial layer. A buffer layer may be positioned between the microchannel surface and the interfacial layer. The buffer layer may be grown or deposited on the microchannel surface. The buffer layer may have a different composition and/or density than the interfacial layer. The buffer layer may comprise a metal oxide or metal carbide. The buffer layer may comprise $Al_2O_3$, $TiO_2$, $SiO_2$, $ZrO_2$, or combination thereof. The $Al_2O_3$ may be $\alpha\text{-}Al_2O_3$, $\gamma\text{-}Al_2O_3$ or a combination thereof. The buffer layer may be used to increase the adhesion of the interfacial layer to the microchannel. The interfacial layer may comprise nitrides, carbides, sulfides, halides, metal oxides, carbon, or a combination thereof. The interfacial layer may provide high surface area and/or a catalyst-support interaction for supported catalysts. The interfacial layer may comprise any material that may be used as a catalyst support. The interfacial layer may comprise a metal oxide. Examples of metal oxides that may be used may include $Al_2O_3$, $SiO_2$, $ZrO_2$, $TiO_2$, tungsten oxide, magnesium oxide, vanadium oxide, chromium oxide, manganese oxide, iron oxide, nickel oxide, cobalt oxide, copper oxide, zinc oxide, molybdenum oxide, tin oxide, calcium oxide, aluminum oxide, lanthanum series oxide(s), zeolite(s) and combinations thereof. The interfacial layer may serve as a catalytically active layer without any further catalytically active material deposited thereon. The interfacial layer may be used in combination with a catalytically active material or layer. The interfacial layer may also be formed of two or more compositionally different sublayers. The interfacial layer thickness may range from about 0.5 to about 100 μm, or from about 1 to about 50 μm. The catalyst material may be deposited on the interfacial layer. Alternatively, the catalyst material may be simultaneously deposited with the interfacial layer. The catalyst material may be intimately dispersed on and/or in the interfacial layer. That the catalyst material may be "dispersed on" or "deposited on" the interfacial layer includes the conventional understanding that microscopic catalyst particles may be dispersed: on the interfacial layer surface, in crevices of the interfacial layer, and/or in open pores in the interfacial layer.

Alternatively, one or more of the catalyst layers may comprise a fixed bed of particulate solids. The median particle diameter may be in the range from about 1 to about 1000 μm, or from about 10 to about 500 μm.

The catalyst layers may comprise a foam for retaining catalyst particles. The catalyst layers may comprise coated foams, including graphite foams, silicon carbide, metal (e.g., Fecralloy which is an alloy comprising Fe, Cr, Al and Y), ceramic, and/or internal coatings of grapheme for high thermal conductivity coatings.

The catalysts may be supported on porous support structures such as foams, felts, wads or a combination thereof. The term "foam" is used herein to refer to a structure with continuous walls that include pores positioned along the length or the structure or throughout the structure. The pores may be on the surface of the continuous walls and used for adhering catalyst material (e.g., catalyst metal particles) to the walls of the foam structure. The term "felt" is used herein to refer to a structure of fibers with interstitial spaces therebetween. The term "wad" is used herein to refer to a structure of tangled strands, like steel wool. The catalyst may be supported on a monolith, honeycomb structure, fin structure comprising one or more fins or a microgrooved support.

The catalyst layers may comprise graded catalysts. The graded catalysts may have varying turnover rates of catalytically active sites. The graded catalysts may have physical properties and/or a form that varies as a function of distance along the reaction path or location in the layer.

The stack 100 or repeat unit 110 may be assembled by stacking the plates one above another in the desired order. The stack may then be compressed to bring the plates into contact and reduce voids between plates. Compression may be applied with the use of a clamped fixture applying a load with a bolt assembly or through the use of an external press to apply a load to the stack. The plates may then be joined together by welding the peripheral edge of each plate to the peripheral edge of the next adjacent plate. This may be done on each of the four sides of the stack. In this manner a peripheral seal may be provided for the stack. The clamped feature or external press may be removed after the welding is completed. The thickness of each weld may be up to about 10 mm, or in the range from about 0.25 to about 10 mm, or in the range from about 0.25 to about 8 mm, or in the range from about 0.25 to about 6.5 mm, or from about 0.25 to about 5 mm, or from about 0.5 to about 3 mm, or from about 0.75 to about 3 mm, or from about 1 to about 2 mm, or from about 1 to about 1.5, or about 1.27 mm. It is advantageous to use welds that are as thin as possible to allow for refurbishment as many times as possible. The welding material, which may be in the form of a welding wire, may comprise any metal or metal alloy. The welding material may comprise steel (e.g., stainless steel, carbon steel, and the like); aluminum; titanium, nickel; platinum; rhodium; copper; chromium; alloys containing any of the foregoing metals; monel; inconel; brass; or a combination of two or more thereof. The welding material and the plates may be made of the same metal or metal alloy; or a different metal or metal alloy. The plates and the welding material may comprise Inconel 617, which is discussed below. The welding technique may comprise tungsten inert gas welding, metal inert gas welding, electron beam welding, laser welding, and the like. Laser welding may be especially advantageous.

The endothermic reaction may comprise a steam reforming reaction. The steam reforming reaction may involve the reaction of a hydrocarbon with steam in the presence of a steam reforming catalyst to produce a product comprising $H_2$. The hydrocarbon may comprise methane, ethane, propane, butane, pentane, isopentane, natural gas, gasoline, auto gas, diesel fuel, fuel oil, mixtures of two or more thereof, and the like. The endothermic reaction may involve the steam reforming of methane or natural gas, which may be referred to as a steam methane reforming (SMR) reaction. With the SMR reaction, methane or natural gas and steam are reacted in the presence of a SMR catalyst to form a mixture of carbon monoxide and hydrogen according to the following chemical equation:

$$CH_4+H_2O \rightarrow CO+3H_2$$

The reactant mixture may also include one or more of hydrogen, nitrogen, carbon monoxide, carbon dioxide, and the like. The product formed by this reaction may be referred to as synthesis gas or syn gas. The SMR reaction is an endothermic reaction which requires heating. The heat for the reaction may be supplied by a partial oxidation or combustion reaction conducted in the heat exchange layer.

The steam reforming catalyst may comprise any steam reforming catalyst. The SMR catalyst may comprise any SMR catalyst. The active catalyst material or element for the steam eforming or SMR catalyst may comprise Ni, Ru, Rh, Pd, Ir, Pt, or a mixture of two or more thereof. The active catalyst material or metal may be supported by $Al_2O_3$, MgO, $MgAl_2O_4$, $CeO_2$, $SiO_2$, $ZrO_2$, $TiO_2$, or a combination of two or more thereof.

The partial oxidation and combustion reactions may involve the reaction of an exothermic reactant with an oxygen source. The exothermic reactant may comprise hydrogen, methane, ethane, propane, butane, natural gas, a hydrocarbon fuel (e.g., diesel fuel, fuel oil, biodiesel, and the like), or a mixture of two or more thereof. The oxygen source may comprise oxygen, air, oxygen enriched air, or a gaseous mixture comprising oxygen and an inert gas (e.g., helium, argon, etc.).

The partial oxidation reaction may involve the reaction of an exothermic reactant, which may comprise a hydrocarbon, with an oxygen source in the presence of a partial oxidation catalyst to form $H_2$ and CO. Examples include the conversion of methane or natural gas to $H_2$ and CO. Other hydrocarbons that may undergo partial oxidation may include ethane, propane, butane, pentane, isopentane, gasoline, diesel fuel, fuel oil, biodiesel, mixture of two or more thereof, and the like.

The partial oxidation catalyst may comprise Rh, Pt, Ni, Cr, Ru, Pd, Os, Ir, or an oxide thereof, or a mixture of two or more thereof. Partial oxidation catalysts based on one or more of the foregoing are disclosed in U.S. Pat. Nos. 5,648,582 and 6,409,940 B1; U.S. Patent Application Publications 2002/0004450 A1, 2002/0012624 A1 and 2002/0115730 A1; PCT International Publication Nos. WO 99/48805, WO 01/80992 A2 and WO 02/066403 A1; and European Patent Application Publication Nos. 0640561 A1, EP 0725038 A1 and EP 0741107 A1. These catalysts may be in any of the forms or supported on any of the support structures discussed above.

The combustion reaction may involve the reaction of an exothermic reactant, which may be referred to as a fuel, with an oxygen source to form an exhaust gas plus heat. For example, the combustion of methane may produce carbon dioxide, water (or steam) plus heat. The combustion of hydrogen may produce water (or steam) plus heat. The reaction may be conducted in the heat exchange layer of the microchannel reactor and be used to heat the process layer of the microchannel reactor. The exothermic reactant may comprise hydrogen or a hydrocarbon. The hydrocarbon may comprise methane, ethane, propane, butane, pentane, isopentate, natural gas, gasoline, diesel fuel, autogas, fuel oil, mixtures of two or more thereof, and the like.

The combustion catalyst may comprise any combustion catalyst. The active catalyst material or element may comprise one or more noble metals such as Pt, Rh, Pd, Co, Cu, Mn, Fe, Ni; oxides of any of these metals, perovskites and/or aluminates. The combustion catalyst may be accompanied by an activity-enhancing promoter such as Ce, Tb or Pr, their oxides, or a combination of two or more thereof. The combustion active catalyst material or element may be supported by any suitable support. The support may comprise $Al_2O_3$, MgO, $MgAl_2O_4$, $SiO_2$, $ZrO_2$, $TiO_2$, or a combination of two or more thereof.

In addition to the foregoing catalysts, one or more of the following catalysts may be used: pre-reforming catalyst, ignition catalyst, clean-up catalyst and/or hydrogenolysis catalyst.

The pre-reforming catalyst may be used upstream of the microchannel reactor or in the process layer of the microchannel reactor to partially reform a hydrocarbon feed prior to undergoing a more comprehensive reforming reaction in the process layer of the microchannel reactor. For example, a hydrocarbon feed comprising methane or natural gas may be pre-reformed to form a pre-former gas product comprising $CH_4$, CO and $H_2$. Examples of the pre-reforming catalyst that may be used may include nickel, rhodium and/or ruthenium based catalysts.

The ignition catalyst may be used in the heat exchange layer to initiate combustion. The ignition catalyst may be referred to as a fuel rich combustion catalyst. The ignition catalyst may also be used as a clean-up catalyst. Examples of the ignition catalysts that may be used may include platinum, palladium and/or rhodium based catalysts.

The clean-up catalyst may be used in the heat exchange layer, exothermic reactant layer and/or exhaust layer. The clean-up catalyst may be referred to as a fuel lean combustion catalyst. The clean-up catalyst may be used to convert any remaining fuel or combustion products in the exhaust to $CO_2$ and $H_2O$. The reactions may include the oxidation of hydrocarbons (e.g., $CH_4$), and the conversion of CO to $CO_2$. The use of clean-up catalyst may be particularly advantageous during start-up since the combustion reactions may be conducted at relatively low temperatures resulting in the production of higher levels of emissions requiring clean up. Examples of the clean-up catalysts that may be used may include palladium based catalysts, platinum based catalysts, mixtures thereof, and the like.

The hydrogenolysis catalyst may be used to remove sulfur from sulfur containing fuels used in the heat exchange layer. The reaction typically involves converting the sulfur to gaseous $H_2S$. The catalyst may comprise molybdenum sulfide, and may further include cobalt and/or nickel.

When a catalyst is employed in the microchannels of the microchannel reactor, the microchannels may be characterized by having a bulk flow path. The term "bulk flow path" refers to an open path (contiguous bulk flow region) within the process microchannels. A contiguous bulk flow region allows rapid fluid flow through the microchannels without large pressure drops. In one embodiment, the flow of fluid in the bulk flow region may be laminar. In an alternate embodiment, the flow of fluid in the bulk flow region may be in transition or turbulent. In yet another embodiment, the flow may have two or more flow regimes throughout the flow circuit, whereby the flow in at least a portion of the flow path is in a transition flow regime as defined by a Reynolds number between about 2000 and about 5000. The bulk flow regions may comprise from about 5% to about 95%, and in one embodiment about 30% to about 80% of the cross-section of the microchannels that contain a catalyst.

The reactants may flow in the reaction sections of the process layer as well as the heat exchange layer in contact with the catalysts to produce a Reynolds number up to about 100000, or up to about 10000, or up to about 100. The Reynolds number may be in the range from about 200 to about 8000.

The microchannel reactor provides for advantages relating to enhanced levels of heat transfer. The heat flux for heat exchange in the microchannel reactor may range from about 0.01 to about 500 watts per square centimeter of surface area of the heat transfer walls ($W/cm^2$) in the microchannel reactor, or from about 0.1 to about 350 $W/cm^2$, or from about 1 to about 250 $W/cm^2$, or from about 1 to about 100 $W/cm^2$, or from about 1 to about 50 $W/cm^2$. The heat transfer walls may be the common walls positioned between the process layers and heat exchange layers of the microchannel reactor The contact time of the reactants with the catalyst in the process layers as well as the heat exchange layers may range from about 1 to about 2000 milliseconds (ms), or from 1 to about 1000 ms, or from about 1 to about 500 ms, or from about 1 to about 250 ms, or from about 1 to about 100 ms, or from about 1 to about 50 ms, or from about 2 to about 1000 ms, or from about 2 to about 500 ms, or from about 2 to about 250 ms, or from about 2 to about 100 ms, or from about 2 to about 50 ms.

The gas hourly space velocity (GHSV) for the flow of fluids in the microchannels may be in the range from about 500 to about 2,000,000 $hr^{-1}$.

The pressure drop for the fluids as they flow in the microchannels may range up to about 0.01 MPa per centimeter of length of the microchannel (MPa/cm), or up to about 0.1 MPa/cm, or up to about 1 MPa/cm, or up to about 10 MPa/cm.

The reactants may flow in the reaction sections of the process layer as well as the heat exchange layer in contact with one or more catalyst to produce a Reynolds Number up to about 100,000, up to about 10,000, or up to about 1000. The Reynolds Number may be in the range of about 200 to about 20,000.

The superficial velocity for fluid flowing in the microchannels may be at least about 10 meters per second (m/s), or in the range from about 10 to about 200 m/s, or in the range from about 20 to about 150 m/s, or in the range from about 30 to about 100 m/s, or in the range from about 50 to about 90 m/s.

The start-up procedure may comprise the following steps: (A) increasing the temperature in the process layer from ambient temperature to an intermediate temperature; (B) flowing a first process reactant in the process layer; (C) flowing a second process reactant in the process layer, the second process reactant comprising a hydrocarbon; (D) activating (or reducing) the catalyst by contacting the catalyst with the second process reactant; and (E) increasing the temperature in the process layer to a desired operating temperature. The first process reactant may comprise steam. The second process reactant may comprise methane, natural gas, a pre-reformer gas comprising $H_2$, CO and $CH_4$, or a mixture of two or more thereof. The catalyst in the process layer may comprise a steam reforming catalyst, e.g., a SMR catalyst.

The intermediate temperature may be in the range from about 150 to about 600° C., or about 150° C. to about 500° C., or about 200 to about 400° C., or about 200 to about 350° C. The intermediate temperature may be in the range from the dew point of steam at the pressure in the process layer up to about 600° C., or up to about 500° C., or up to about 400° C., or up to about 350° C. The desired operating temperature may be in the range from about 600 to about 1000° C., or about 650 to about 950° C., or about 650° C. to about 750° C., or about 800° C. to about 950° C.

During step (A) a fluid may flow in the heat exchange layer. This fluid may comprise one or more exothermic reactants, for example, a fuel and an oxygen source such as air.

During step (A) a fluid may flow in the process layer. This fluid may comprise an inert gas such as nitrogen.

An exothermic reaction may be conducted in the heat exchange layer to provide heat for heating the process layer. This may occur during each of steps (A) to (E). The exothermic reactants may flow in the heat exchange layer during step (A) to provide heat for heating the process layer to the intermediate temperature. The flow rate of the exothermic reactants in the heat exchange layer may be increased during steps (B), (C), (D) and/or (E) to provide additional heat for heating the process layer.

During steps (D) and/or step (E) the ratio of the first process reactant to the second process reactant may be adjusted to provide a desired ratio for operation subsequent to step (E). For a SMR reaction, the desired ratio of steam to carbon may be in the range from about 1.5 to about 6, or about 1.5 to about 4, or about 2 to about 3.

During step (B) of the process may comprise flowing nitrogen in the process layer and heating the process layer until the temperature in the process layer exceeds the dew point of steam at the pressure within the process layer. The nitrogen in the process layer may then be replaced with steam.

The exothermic reactants may comprise an oxygen source, wherein the oxygen source is heated to a temperature of at least about 200° C., or at least about 300°, before entering the heat exchange layer.

The exothermic reactants may comprise an oxygen source and a fuel. The oxygen source may be heated to a temperature of at least about 200° C., or at least about 300° C., to form a heated oxygen source, then the heated oxygen source may be mixed with the fuel.

The process steps (A), (B), (C), (D) and (E) may be conducted sequentially. Steps (A), (B) and, optionally (C), may be conducted concurrently. Steps (B) and (C) may be conducted concurrently. Steps (C) and (D) may be conducted concurrently.

EXAMPLE 1

Figure 2:
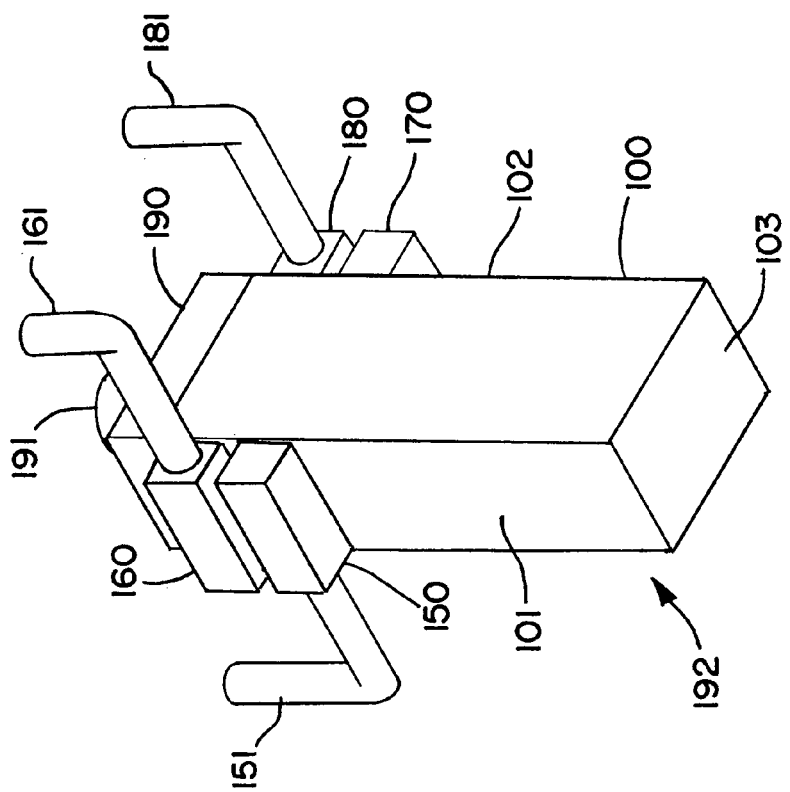
FIG. 2 is a schematic illustration showing the stack of plates from FIG. 1, in assembled form, and separate fluid manifolds to provide for the flow of process and heat exchange fluids into and out of the stack.
Figure 3:
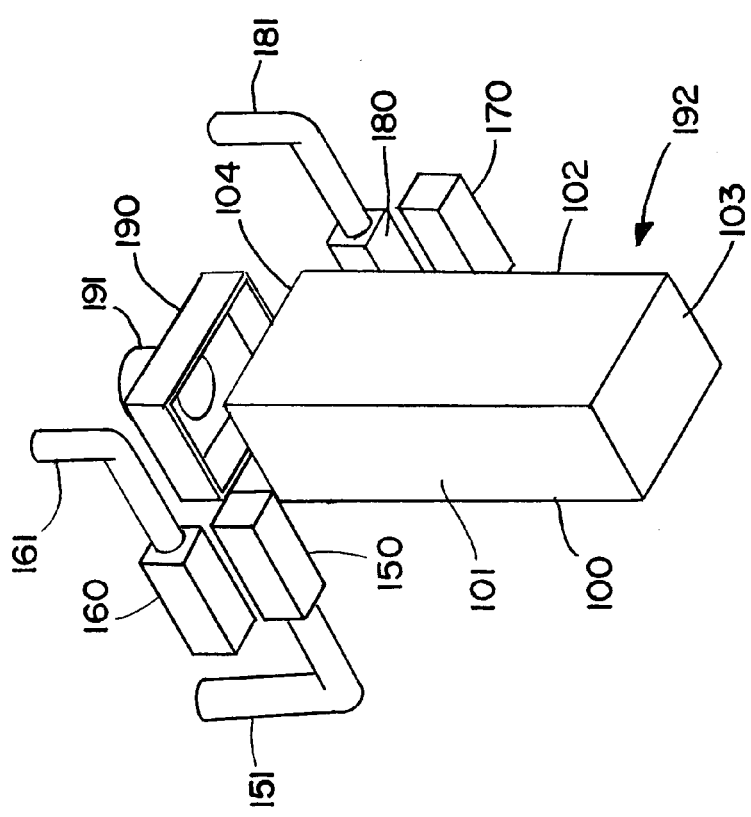
FIG. 3 is a schematic illustration of the stack of plates and fluid manifolds shown in FIG. 2, with the fluid manifolds welded to the stack to provide an assembled microchannel reactor.
Figure 5A:
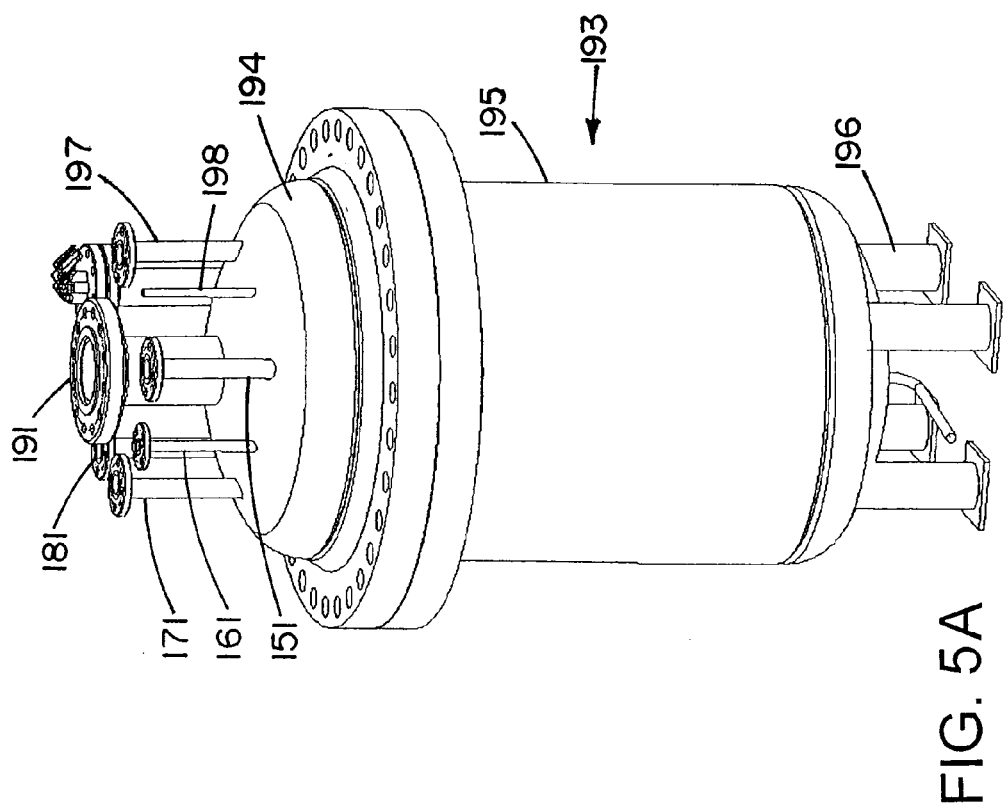
FIG. 5A is a schematic illustrations of a containment vessel used for housing the microchannel reactor.
Figure 4:
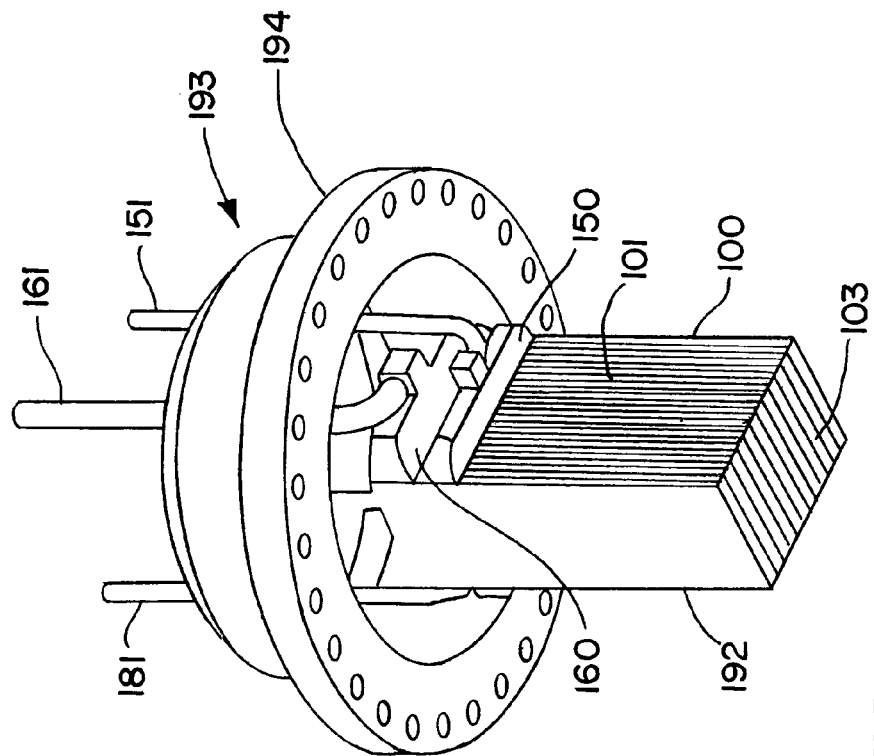
FIG. 4 is a schematic illustration of the assembled microchannel reactor from FIG. 3 mounted in the header of a containment vessel.
Figure 21:
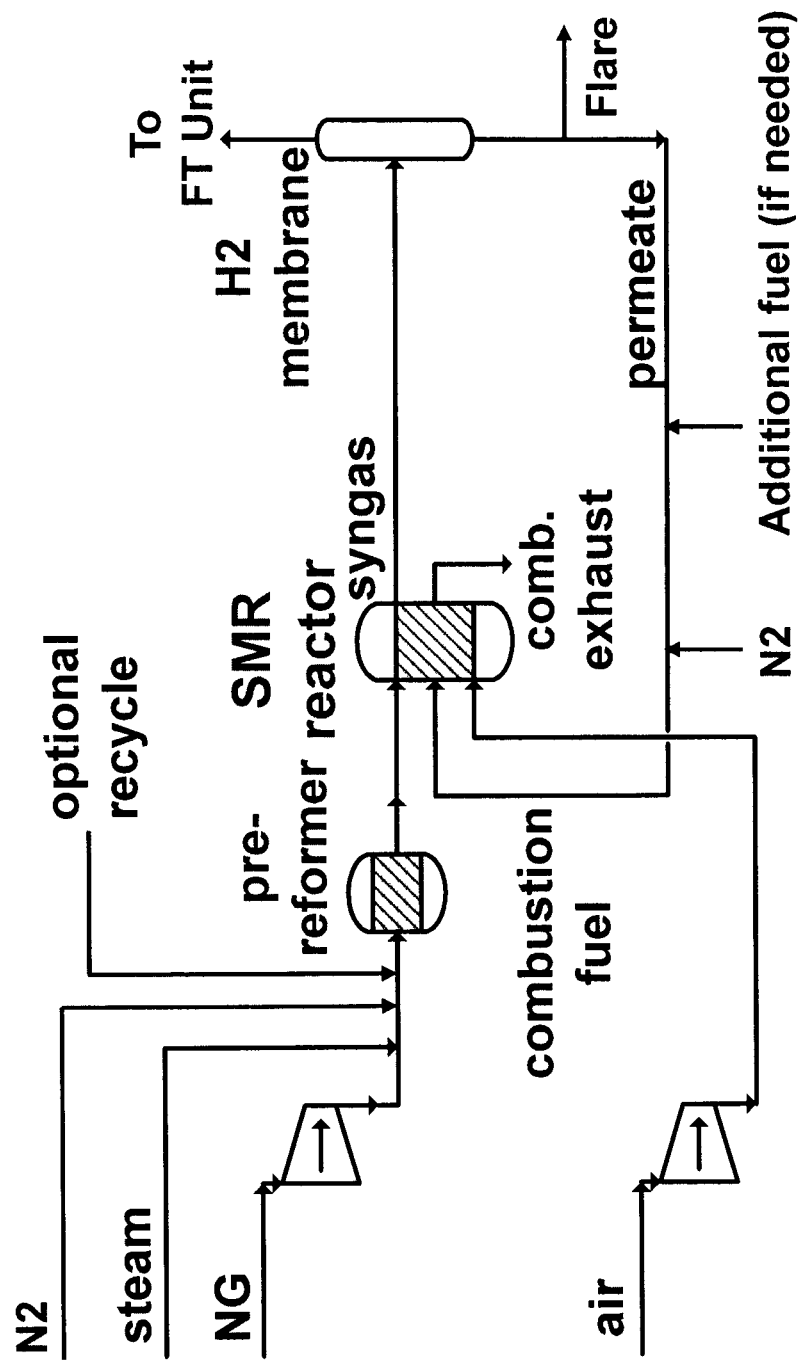
FIG. 21 is a flow sheet showing a SMR microchannel reactor connected to a pre-reformer and a membrane separator.

A start-up procedure for the microchannel reactor is conducted. A flow sheet for the process is shown in FIG. 21. The microchannel reactor is a SMR reactor. The reactor includes a process layer for conducting a SMR process, and a heat exchange layer for conducting a combustion reaction. The microchannel reactor is illustrated in FIGS. 2-4, and is positioned in the containment vessel shown in FIG. 5A. The process layer contains a plurality of process channels and a SMR catalyst. The heat exchange layer contains a plurality of heat exchange channels containing a combustion catalyst, a plurality of oxygen source (i.e., air) channels, and a plurality of exhaust channels. The microchannel reactor has the internal configuration shown in FIGS. 6A and 7B. The reactor is connected to a pre-reformer, steam generation system, and a hydrogen membrane separator. The reactor has a process inlet, process outlet, fuel inlet, air inlet, and exhaust outlet. The start-up procedure employs the following steps:

(1) The containment vessel is purged by pressurizing the vessel to 100 psig (689 kilopascals) with nitrogen gas and then depressurizing the vessel to remove reactant gases. This cycle is repeated until the $O_2$ content in the containment vessel is less than 2% by volume.

(2) The containment vessel is pressurized with nitrogen to provide a pressure within the containment vessel 380 psig (2620 kilopascals).

(3) The microchannel reactor is purged by flowing nitrogen gas through the process inlet at a flow rate of 100 SLPM (standard liters per minute), and through the fuel inlet at a flow rate of 20 SLPM, and flowing air through the air inlet at a flow rate of 100 SLPM. This procedure is continued for 60 minutes.

(4) The nitrogen gas pressure in the process inlet is increased to 72.5 psig (500 kilopascals).

(5) The flow rate of nitrogen gas in the process inlet is increased to 270 SLPM. The flow rate of air in the air inlet is increased to 625 SLPM. The flow rate of nitrogen gas in the fuel inlet is maintained at a rate of 20 SLPM.

(6) The temperature of the pre-reformer is increased to 420° C.

(7) The nitrogen flowing into the process inlet and the air flowing into the air inlet are heated to a temperature of 400° C., resulting in a process layer intermediate temperature of about 200 to 250° C.

(8) The water in the steam generation system is heated to a temperature of 375° C., to generate steam. The flow rate of the water in the steam generation system is increased to 149.1 ml/min. The generated steam flows through the pre-reformer and process inlet into the process layer while reducing and then stopping the flow of nitrogen gas in the process layer. The pressure in the process layer is maintained at 72.5 psig (500 kilopascals).

(9) The flow of natural gas (NG) is started and increased to a flow rate of 41 SLPM. The steam to natural gas flow rate ratio is adjusted to 4.5. The mixture of natural gas and steam flows through the pre-reformer.

(10) The temperature of air flowing into the air inlet is increased to 475° C., causing the SMR process layer to increase in temperature to about 230 to 250° C. This temperature is maintained for 16 hours to activate the catalyst.

(11) The SMR product outlet pressure of the reactor is increased from 72.5 psig (500 kilopascals), which is the desired catalyst activation pressure, to 175 psig (1207 kilopascals), which is the desired operating pressure.

(12) The hydrogen membrane separator is purged by flowing nitrogen through the separator at a flow rate of 140 SLPM for 5 minutes.

(13) The flow of SMR product outlet gas towards the hydrogen membrane separator is commenced and the nitrogen purge of the separator is turned off.

(14) An operating pressure of 140 psig (965 kilopascals) is established for the hydrogen membrane separator. Hydrogen is enriched relative to the SMR product in the hydrogen membrane separator permeate gas. The hydrogen enriched stream flows into the fuel inlet of the reactor. The initial flow rate of hydrogen into the fuel inlet is 6.6 SLPM.

(15) The temperature of the reactor is increased to an average temperature of 500° C. by increasing the flow rate of the membrane separator permeate to the fuel inlet. Although the methane in the hydrogen permeate from the membrane may not fully combust at temperatures below 500° C., the large excess of air maintains the concentration of methane in the dry exhaust gas at a safe levels of 3.2% or less.

(16) The flow rate of air into the air inlet is reduced while the flow rate of fuel from the hydrocarbon membrane separator is increased until 3% $O_2$ in the exhaust is achieved. During this step, the temperature of the process layer gradually increases, which in turn increases the ratio of hydrogen to hydrocarbon (i.e., methane) in the synthesis gas, which further increases the ratio of hydrogen to hydrocarbon in the hydrogen enriched permeate stream from the hydrogen membrane separator. Thus, even though the dilution of the exhaust by air is steadily decreased, because of decreases in air flow rate, the methane content in the exhaust gas is maintained at safe levels by increasing the flow of fuel to the heat exchange layer and thus increasing the SMR process layer temperature to offset the effect of decreased air dilution.

(17) The flow rates of natural gas and steam are adjusted to provide the desired steam:carbon ratio as shown below. The flow rate of air and fuel (from hydrogen membrane permeate) are adjusted to achieve and maintain a process layer operating temperature of about 810 to 830° C. The process operating temperature is taken as the average measured wall temperature near the outlet end of the SMR catalyst.

(18) After start-up, the reactor is operated under three sets of conditions as indicated below:

| Operational Parameter | Condition 1 | Condition 2 | Condition 3 |
| --- | --- | --- | --- |
| SMR Steam: Carbon ratio | 2.7:1 | 2.0:1 | 2.3:1 |
| Total SMR flow rate (SLPM) | 721 SLPM | 785 SLPM | 800 SLPM |
| SMR Outlet Pressure | 230 psig (1586 kilopascals) | 225 psig (1551 kilopascals) | 175 psig (1207 kilopascals) |
| Combustion fuel | Hydrogen membrane permeate | Hydrogen membrane permeate + 2% added methane | Hydrogen membrane permeate |
| Process layer operating temperature (° C.) | 827° C. | 815° C. | 814° C. |

EXAMPLE 2

A microchannel natural gas steam reformer pilot plant is used that comprises an adiabatic pre-reformer loaded with a high activity, high nickel catalyst and equipped with gas by-pass pipe-work and associated valves. The pilot plant includes a main microchannel methane steam reformer with forty channels that has steam reforming reactant channels coated with a steam reforming catalyst. The microchannel reactor has combustion channels running alongside the steam reforming channels in which fuel and air are reacted to heat the endothermic steam reforming reaction. The system is started using the following start-up procedure. Liquid water is pumped into a pre-heater/boiler upstream of the pre-reformer, initially at about 300 ml per minute and once air has been displaced from the system the rate of water being evaporated is increased to 400 ml per minute. Desulfurized natural gas (84 liter per minute) is then introduced into the pre-heater and mixed with the steam being produced. Over a period of five hours the flow rate of the natural gas is gradually increased to a rate of about 220 liters per minute, and during this time the combustion fuel rate is increased from an initial value of about 2.5 liters per minute to 30 liters per minute. During this period the reactor exit methane level is monitored and not allowed to be more than 10% on a dry gas basis by controlling the rate of the introduction of natural gas. When all of the gas flow rates and temperatures are stabilized and the plant is operating normally, the total reactant gas pressure is about 175 psig (1207 kilopascals), the steam to carbon ratio is about 2.3 to 1, and the maximum gas temperature in the reactant channels is 820° C. The dry gas exit methane levels indicate an approach to equilibrium of about 15° C. showing that the rapid catalyst activation procedure using steam and natural gas successfully reduces the catalyst and enables the plant to be operated at design conditions.

While the invention has been explained in relation to various embodiments, it is to be understood that various modifications thereof will become apparent to those skilled in the art upon reading the specification. Therefore, it is to be understood that the invention disclosed herein is intended to cover such modifications as fall within the scope of the appended claims.

The invention claimed is:

1. A process for conducting simultaneous endothermic and exothermic reactions in a microchannel reactor, the microchannel reactor comprising a process layer comprising a plurality of process microchannels and a heat exchange layer, the process microchannels containing a catalyst, the process including a start-up procedure comprising:
(A) increasing the temperature in the process layer from ambient temperature to an intermediate temperature;
(B) starting the flow of a first process reactant in the process microchannels, the first process reactant comprising steam;
(C) flowing a second process reactant in the process microchannels, the second process reactant comprising a hydrocarbon;
(D) activating the catalyst by contacting the catalyst with the second process reactant; and
(E) increasing the temperature in the process layer to a desired operating temperature;
wherein steps (A), (B), (C), (D) and (E) are conducted sequentially with the exception that step (B) is conducted prior to or concurrently with step (C); and
wherein the catalyst is not activated prior to step (A).

2. The process of claim 1 wherein the second process reactant comprises methane, natural gas, a pre-reformer gas comprising $H_2$, CO and $CH_4$, or a mixture of two or more thereof.

3. The process of claim 1 wherein the second process reactant comprises methane.

4. The process of claim 1 wherein a fluid flows in the heat exchange layer during step (A).

5. The process of claim 1 wherein an exothermic reaction is conducted in the heat exchange layer to provide heat for heating the process layer.

6. The process of claim 1 wherein exothermic reactants flow in the heat exchange layer during step (A) to provide heat for heating the process layer to the intermediate temperature, the flow rate of the exothermic reactants in the heat exchange layer being increased during steps (B), (C), (D) and/or (E) to provide additional heat for heating the process layer.

7. The process of claim 1 wherein during step (D) and/or step (E) the ratio of the first process reactant to the second process reactant is adjusted to provide a desired ratio for operation subsequent to step (E).

8. The process of claim 1 wherein exothermic reactants react in an exothermic reaction in the heat exchange layer, the exothermic reactants comprising an oxygen source, the oxygen source being heated to a temperature of at least about 200° C. before entering the heat exchange layer.

9. The process of claim 1 wherein exothermic reactants react in an exothermic reaction in the heat exchange layer, the exothermic reactants comprising an oxygen source and a fuel, the oxygen source being heated to a temperature of at least about 200° C. to form a heated oxygen source, the heated oxygen source being mixed with the fuel.

10. The process of claim 9 wherein the oxygen source comprises air, oxygen, oxygen enriched air, or a mixture of two or more thereof.

11. The process of claim 9 wherein the oxygen source comprises air.

12. The process of claim 1 wherein the intermediate temperature is in the range from about 150 to about 600° C.

13. The process of claim 1 wherein a mixture of the first reactant and the second reactant is formed, the intermediate temperature is in the range from the dew point of the mixture of the first reactant and the second reactant at the pressure in the process layer up to about 600° C.

14. The process of claim 1 wherein the desired operating temperature is in the range from about 600 to about 1000° C.

15. The process of claim 1 wherein subsequent to the start-up procedure, an endothermic reaction process is conducted in the process layer, and an exothermic reaction process is conducted in the heat exchange layer.

16. The process of claim 15 wherein the endothermic reaction comprises a steam reforming reaction, and the exothermic reaction comprises a combustion reaction or a partial oxidation reaction.

17. The process of claim 16 wherein the steam reforming reaction comprises a steam methane reforming reaction.

18. The process of claim 15 wherein the endothermic reaction comprises a steam methane reforming reaction, and the exothermic reaction comprises a combustion reaction.

19. The process of claim 15 wherein the exothermic reaction comprises the reaction of a fuel with an oxygen source.

20. The process of claim 19 wherein the fuel comprises hydrogen, natural gas, methane, a $C_2^+$ alkane, liquefied petroleum gas, an oxygenate, or a mixture of two or more thereof.

21. The process of claim 19 wherein the oxygen source comprises air, oxygen, oxygen enriched air, or a mixture of two or more thereof.

22. The process of claim 1 wherein the catalyst in the process microchannels is an endothermic reaction catalyst.

23. The process of claim 22 wherein the endothermic reaction catalyst comprises a steam reforming catalyst.

24. The process of claim 23 wherein the steam reforming catalyst comprises a SMR catalyst.

25. The process of claim 1 wherein a catalyst is positioned in the heat exchange layer.

26. The process of claim 25 wherein the catalyst positioned in the heat exchange layer comprises a combustion catalyst, partial oxidation catalyst, ignition catalyst, hydrogenolysis catalyst, clean-up catalyst, or a combination of two or more of these catalysts.

27. The process of claim 1 wherein the process layer comprises a process heat exchange section and a process reaction section, the process reaction section being downstream of the process heat exchange section.

28. The process of claim 27 wherein the catalyst in the process reaction section is an endothermic reaction catalyst.

29. The process of claim 1 wherein the heat exchange layer comprises a heat exchange layer heat exchange section and a heat exchange layer reaction section, the heat exchange layer reaction section being downstream of the heat exchange layer heat exchange section.

30. The process of claim 29 wherein a combustion catalyst, partial oxidation catalyst, ignition catalyst and/or clean-up catalyst is positioned in the heat exchange layer reaction section.

31. The process of claim 1 wherein subsequent to step (E), a steam methane reforming reaction is conducted in the process layer to form synthesis gas; and a combustion reaction is conducted in the heat exchange layer to provide heat for the process layer.

32. The process of claim 31 wherein the approach to equilibrium for the steam methane reforming reaction is at least about 80%, and the contact time for the steam methane reforming reaction is up to about one second.

33. The process of claim 31 wherein the microchannel reactor comprises a plurality of plates in a stack, the steam methane reforming reaction being conducted for at least about 2000 hours without metal dusting pits forming on surfaces of the plates.

34. The process of claim 31 wherein the pressure drop in the process layer after conducting the steam methane reforming reaction for at least about 2000 hours increases by less than about 20% of the pressure drop at the start of the process.

35. A process for conducting simultaneous endothermic and exothermic reactions in a microchannel reactor, the microchannel reactor comprising a process layer and a heat exchange layer, the process layer containing a catalyst, the process including a start-up procedure comprising:

(A) increasing the temperature in the process layer from ambient temperature to an intermediate temperature;
(B) flowing a first process reactant in the process layer;
(C) flowing a second process reactant in the process layer, the second process reactant comprising a hydrocarbon;
(D) activating the catalyst by contacting the catalyst with the second process reactant;

(E) increasing the temperature in the process layer to a desired operating temperature; and wherein a mixture of the first reactant and the second reactant is formed during step (C), and during step (B) the process comprises flowing nitrogen in the process layer and heating the process layer until the temperature in the process layer exceeds the dew point of the mixture of the first reactant and the second reactant in step (C) at the pressure within the process layer, then replacing the nitrogen in the process layer with steam.

36. A process for conducting simultaneous endothermic and exothermic reactions in a microchannel reactor, the microchannel reactor comprising a process layer and a heat exchange layer, the process layer containing a catalyst, the process including a start-up procedure comprising:
(A) increasing the temperature in the process layer from ambient temperature to an intermediate temperature;
(B) flowing a first process reactant in the process layer;
(C) flowing a second process reactant in the process layer, the second process reactant comprising a hydrocarbon;
(D) activating the catalyst by contacting the catalyst with the second process reactant;
(E) increasing the temperature in the process layer to a desired operating temperature; and
wherein steps (A), (B), (C), (D) and (E) are conducted sequentially.

37. A process for conducting simultaneous endothermic and exothermic reactions in a microchannel reactor, the microchannel reactor comprising a process layer and a heat exchange layer, the process layer containing a catalyst, the process including a start-up procedure comprising:
(A) increasing the temperature in the process layer from ambient temperature to an intermediate temperature;
(B) flowing a first process reactant in the process layer;
(C) flowing a second process reactant in the process layer, the second process reactant comprising a hydrocarbon;
(D) activating the catalyst by contacting the catalyst with the second process reactant;
(E) increasing the temperature in the process layer to a desired operating temperature; and
wherein step (C) is conducted prior to step (B), and the intermediate temperature is below about 300° C.

38. A process for conducting simultaneous steam reforming and oxidation reactions in a microchannel reactor, the microchannel reactor comprising a process layer and a heat exchange layer, the process being conducted in a facility where a hydrogen enriched stream comprising hydrogen and one or more hydrocarbons is produced downstream of the microchannel reactor, the process including a start-up procedure comprising:
(A) transferring heat from the heat exchange layer to the process layer to increase the temperature in the process layer;
(B) flowing one or more process reactants in the process layer and conducting a steam reforming reaction to provide a synthesis gas product comprising hydrogen;
(C) using at least a portion of the synthesis gas product and/or separating part of the hydrogen from the synthesis gas product downstream of the reactor to provide the hydrogen enriched stream;
(D) conducting an oxidation reaction in the heat exchange layer to produce heat using a heat exchange reactant mixture comprising an oxygen source and part or all of the hydrogen enriched stream;
(E) wherein the flow of hydrogen in the hydrogen enriched stream used in the oxidation reaction increases during the start-up procedure.

39. A process for conducting simultaneous endothermic and exothermic reactions in a microchannel reactor, the microchannel reactor comprising a process layer and a heat exchange layer, the process layer containing a catalyst, the process including a start-up procedure comprising:
(A) increasing the temperature in the process layer from ambient temperature to an intermediate temperature;
(B) flowing a first process reactant in the process layer;
(C) flowing a second process reactant in the process layer, the second process reactant comprising a hydrocarbon;
(D) activating the catalyst by contacting the catalyst with the second process reactant;
(E) increasing the temperature in the process layer to a desired operating temperature; and
wherein subsequent to the start-up procedure, an endothermic reaction process is conducted in the process layer, and an exothermic reaction process is conducted in the heat exchange layer; and
wherein a product is formed in the process layer, and part of the product formed in the process layer is used as an exothermic reactant in the heat exchange layer.

40. A process for conducting simultaneous endothermic and exothermic reactions in a microchannel reactor, the microchannel reactor comprising a process layer and a heat exchange layer, the process layer containing a catalyst, the process including a start-up procedure comprising:
(A) increasing the temperature in the process layer from ambient temperature to an intermediate temperature;
(B) flowing a first process reactant in the process layer;
(C) flowing a second process reactant in the process layer, the second process reactant comprising a hydrocarbon;
(D) activating the catalyst by contacting the catalyst with the second process reactant;
(E) increasing the temperature in the process layer to a desired operating temperature; and
wherein subsequent to the start-up procedure, an endothermic reaction process is conducted in the process layer, and an exothermic reaction process is conducted in the heat exchange layer; and
wherein synthesis gas is formed in the process layer, the synthesis gas comprising CO and $H_2$, part of the $H_2$ being separated from the synthesis gas, the separated $H_2$ flowing into the heat exchange layer as an exothermic reactant.

41. A process for conducting simultaneous endothermic and exothermic reactions in a microchannel reactor, the microchannel reactor comprising a process layer and a heat exchange layer, the process layer containing a catalyst, the process including a start-up procedure comprising:
(A) increasing the temperature in the process layer from ambient temperature to an intermediate temperature;
(B) flowing a first process reactant in the process layer;
(C) flowing a second process reactant in the process layer, the second process reactant comprising a hydrocarbon;
(D) activating the catalyst by contacting the catalyst with the second process reactant;
(E) increasing the temperature in the process layer to a desired operating temperature; and
wherein the process layer comprises a process heat exchange section and a process reaction section, the process reaction section being downstream of the process heat exchange section; and
wherein a pre-reforming catalyst is positioned in the process heat exchange section.

42. A process for conducting simultaneous endothermic and exothermic reactions in a microchannel reactor, the microchannel reactor comprising a process layer and a heat exchange layer, the process layer containing a catalyst, the process including a start-up procedure comprising:
- (A) increasing the temperature in the process layer from ambient temperature to an intermediate temperature;
- (B) flowing a first process reactant in the process layer;
- (C) flowing a second process reactant in the process layer, the second process reactant comprising a hydrocarbon;
- (D) activating the catalyst by contacting the catalyst with the second process reactant;
- (E) increasing the temperature in the process layer to a desired operating temperature; and
- wherein the heat exchange layer comprises a heat exchange layer heat exchange section and a heat exchange layer reaction section, the heat exchange layer reaction section being downstream of the heat exchange layer heat exchange section; and
- wherein a hydrogenolysis catalyst is positioned in the heat exchange layer heat exchange section.

43. A process for conducting simultaneous endothermic and exothermic reactions in a microchannel reactor, the microchannel reactor comprising a process layer and a heat exchange layer, the process layer containing a catalyst, the process including a start-up procedure comprising:
- (A) increasing the temperature in the process layer from ambient temperature to an intermediate temperature;
- (B) flowing a first process reactant in the process layer;
- (C) flowing a second process reactant in the process layer, the second process reactant comprising a hydrocarbon;
- (D) activating the catalyst by contacting the catalyst with the second process reactant;
- (E) increasing the temperature in the process layer to a desired operating temperature; and
- wherein an ignition catalyst and a clean-up catalyst are positioned in the heat exchange layer.

44. A process for conducting simultaneous endothermic and exothermic reactions in a microchannel reactor, the microchannel reactor comprising a process layer and a heat exchange layer, the process layer containing a catalyst, the process including a start-up procedure comprising:
- (A) increasing the temperature in the process layer from ambient temperature to an intermediate temperature;
- (B) flowing a first process reactant in the process layer;
- (C) flowing a second process reactant in the process layer, the second process reactant comprising a hydrocarbon;
- (D) activating the catalyst by contacting the catalyst with the second process reactant;
- (E) increasing the temperature in the process layer to a desired operating temperature; and
- wherein the process layer comprises a process reactant layer, a process product layer positioned adjacent to the process reactant layer, and a process u-turn positioned at an end of the process reactant layer and at an end of the process product layer to allow for the flow of fluid from the process reactant layer to the process product layer, the process heat exchange section and the process reaction section being positioned in the process reactant layer.

45. A process for conducting simultaneous endothermic and exothermic reactions in a microchannel reactor, the microchannel reactor comprising a process layer and a heat exchange layer, the process layer containing a catalyst, the process including a start-up procedure comprising:
- (A) increasing the temperature in the process layer from ambient temperature to an intermediate temperature;
- (B) flowing a first process reactant in the process layer;
- (C) flowing a second process reactant in the process layer, the second process reactant comprising a hydrocarbon;
- (D) activating the catalyst by contacting the catalyst with the second process reactant;
- (E) increasing the temperature in the process layer to a desired operating temperature; and
- wherein the heat exchange layer comprises an exothermic reactant layer, oxygen source layer, exhaust layer, and a heat exchange u-turn positioned at an end of the exothermic reactant layer and at an end of the exhaust layer to allow for the flow of fluid from the exothermic reactant layer to the exhaust layer, the exothermic reactant layer having a heat exchange section and a reaction section.

46. A process for conducting simultaneous endothermic and exothermic reactions in a microchannel reactor, the microchannel reactor comprising a process layer and a heat exchange layer, the process layer containing a catalyst, the process including a start-up procedure comprising:
- (A) increasing the temperature in the process layer from ambient temperature to an intermediate temperature;
- (B) flowing a first process reactant in the process layer;
- (C) flowing a second process reactant in the process layer, the second process reactant comprising a hydrocarbon;
- (D) activating the catalyst by contacting the catalyst with the second process reactant;
- (E) increasing the temperature in the process layer to a desired operating temperature; and
- wherein the heat exchange layer comprises a exothermic reactant layer, the exothermic reactant layer including an exothermic reactant rich section and an exothermic reactant lean section, the exothermic reactant rich section being upstream from the exothermic reactant lean section, and an ignition catalyst positioned in the exothermic reactant rich section.

47. The process of claim 44 wherein a clean up catalyst is positioned in the exothermic reactant lean section and/or downstream of the exothermic reactant lean section.

48. A process for conducting simultaneous endothermic and exothermic reactions in a microchannel reactor, the microchannel reactor comprising a process layer and a heat exchange layer, the process layer containing a catalyst, the process including a start-up procedure comprising:
- (A) increasing the temperature in the process layer from ambient temperature to an intermediate temperature;
- (B) flowing a first process reactant in the process layer;
- (C) flowing a second process reactant in the process layer, the second process reactant comprising a hydrocarbon;
- (D) activating the catalyst by contacting the catalyst with the second process reactant;
- (E) increasing the temperature in the process layer to a desired operating temperature; and
- wherein an exothermic reaction is conducted in the heat exchange layer to produce heat and a dry exhaust gas, the dry exhaust gas containing no more than about 5% by volume of methane or hydrogen.

49. A process for conducting simultaneous endothermic and exothermic reactions in a microchannel reactor, the microchannel reactor comprising a process layer and a heat exchange layer, the process layer containing a catalyst, the process including a start-up procedure comprising:
- (A) increasing the temperature in the process layer from ambient temperature to an intermediate temperature;
- (B) flowing a first process reactant in the process layer;
- (C) flowing a second process reactant in the process layer, the second process reactant comprising a hydrocarbon;
- (D) activating the catalyst by contacting the catalyst with the second process reactant;

(E) increasing the temperature in the process layer to a desired operating temperature; and wherein an exothermic reaction is conducted in the heat exchange layer, the exothermic reaction comprising the reaction of a fuel with an oxygen source, an exhaust gas being produced, the amount of oxygen in the exhaust gas while operating at the intermediate temperature being in the range from about 10% to about 21% by volume.

50. A process for conducting simultaneous endothermic and exothermic reactions in a microchannel reactor, the microchannel reactor comprising a process layer and a heat exchange layer, the process layer containing a catalyst, the process including a start-up procedure comprising:

(A) increasing the temperature in the process layer from ambient temperature to an intermediate temperature;

(B) flowing a first process reactant in the process layer;

(C) flowing a second process reactant in the process layer, the second process reactant comprising a hydrocarbon;

(D) activating the catalyst by contacting the catalyst with the second process reactant;

(E) increasing the temperature in the process layer to a desired operating temperature; and wherein an exothermic reaction is conducted in the heat exchange layer, the exothermic reaction comprising the reaction of a fuel with an oxygen source, an exhaust gas being produced, the amount of oxygen in the exhaust gas while operating at the desired operating temperature is in the range from about 2% to about 10% by volume.

* * * * *